(12) United States Patent
Liu et al.

(10) Patent No.: US 9,605,088 B2
(45) Date of Patent: *Mar. 28, 2017

(54) CATALYST COMPOSITIONS AND THEIR USE FOR HYDROGENATION OF NITRILE RUBBER

(71) Applicant: ARLANXEO DEUTSCHLAND GMBH, Dormagen (DE)

(72) Inventors: Qingchun Liu, Shandong (CN); Zhenli Wei, Shandong (CN)

(73) Assignee: ARLANXEO Deutschland GmbH, Dormagen (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/352,077

(22) PCT Filed: Oct. 19, 2012

(86) PCT No.: PCT/EP2012/070811
§ 371 (c)(1),
(2) Date: Apr. 16, 2014

(87) PCT Pub. No.: WO2013/057285
PCT Pub. Date: Apr. 25, 2013

(65) Prior Publication Data
US 2014/0249277 A1    Sep. 4, 2014

(30) Foreign Application Priority Data
Oct. 21, 2011 (WO) ................ PCT/CN2011/081097

(51) Int. Cl.
C08C 19/02 (2006.01)
B01J 31/22 (2006.01)
C08L 15/00 (2006.01)

(52) U.S. Cl.
CPC .......... *C08C 19/02* (2013.01); *B01J 31/2265* (2013.01); *B01J 31/2273* (2013.01); *B01J 31/2278* (2013.01); *C08L 15/005* (2013.01); *B01J 2231/645* (2013.01); *B01J 2531/0241* (2013.01); *B01J 2531/821* (2013.01); *B01J 2531/825* (2013.01)

(58) Field of Classification Search
None
See application file for complete search history.

(56) References Cited

U.S. PATENT DOCUMENTS

| | | | |
|---|---|---|---|
| 3,700,637 A | 10/1972 | Finch, Jr | |
| 4,464,515 A | 8/1984 | Rempel et al. | |
| 4,503,196 A | 3/1985 | Rempel et al. | |
| 4,581,417 A | 4/1986 | Buding et al. | |
| 4,631,315 A | 12/1986 | Buding et al. | |
| 4,746,707 A | 5/1988 | Fiedler et al. | |
| 4,795,788 A | 1/1989 | Himmler et al. | |
| 4,816,525 A | 3/1989 | Rempel et al. | |
| RE34,548 E | 2/1994 | Fiedler et al. | |
| 6,268,501 B1 | 7/2001 | Kiel | |
| 6,838,489 B2 | 1/2005 | Bell et al. | |
| 6,908,970 B2 | 6/2005 | Tsunogae et al. | |
| 7,585,920 B2 | 9/2009 | Guerin | |
| 7,846,995 B2 | 12/2010 | Ong et al. | |
| 8,062,573 B2 | 11/2011 | Kwon | |
| 9,079,979 B2 | 7/2015 | Ong et al. | |
| 9,150,669 B2 | 10/2015 | Ong et al. | |
| 2002/0107138 A1 | 8/2002 | Hoveyda et al. | |
| 2007/0004970 A1 | 1/2007 | Tice | |
| 2008/0064882 A1 | 3/2008 | Huber-Dirr et al. | |
| 2009/0054597 A1 | 2/2009 | Ong et al. | |
| 2009/0069516 A1 | 3/2009 | Obrecht et al. | |
| 2009/0227444 A1 | 9/2009 | Ong et al. | |
| 2010/0087600 A1 | 4/2010 | Muller et al. | |
| 2010/0093931 A1* | 4/2010 | Rempel ................. | C08L 15/005 525/52 |
| 2010/0093944 A1 | 4/2010 | Muller et al. | |
| 2010/0113795 A1 | 5/2010 | Arlt et al. | |
| 2012/0016093 A1 | 1/2012 | Zhan | |
| 2012/0329941 A1 | 12/2012 | Ong et al. | |
| 2012/0329952 A1 | 12/2012 | Ong et al. | |
| 2013/0005916 A1 | 1/2013 | Ong et al. | |
| 2013/0116458 A1* | 5/2013 | Couturier .............. | C07C 227/04 554/114 |
| 2013/0211096 A1 | 8/2013 | Arlt et al. | |

FOREIGN PATENT DOCUMENTS

| | | | |
|---|---|---|---|
| DE | 2539132 A1 | | 3/1977 |
| EP | 0471250 A1 | | 2/1992 |
| WO | 2004035596 A1 | | 4/2004 |
| WO | WO 2011/029732 | * | 3/2011 |
| WO | 2011079799 A1 | | 7/2011 |
| WO | 2011138051 A1 | | 11/2011 |
| WO | WO 2011/138051 | * | 11/2011 |

OTHER PUBLICATIONS

Sanford, M.S., "Mechanism and Activity of Ruthenium Olefin Metathesis Catalysts", J.Am.Chem. Soc. 2001, 123, p. 6543-6554.
Su, H.L. "Polyisobutylene Phase-Anchored Ruthenium Complexes", Macromol. Symp. 2010, 297, p. 25-32.
Grela, K., "A Highly Effiicient Ruthenium Catalyst for Metathesis Reactions", Angew. Chem. Int. Ed. 2002, 41, No. 21, p. 4038-4040.
Liu, W. "Di(ethylene glycol) vinyl ether: a highly efficient deactivating reagent for olefin metathesis catalysts", Tetrahedron Letters 50 (2009), p. 6103-6105.
Schrock, R.R. "Molybdenum and Tungsten Imido Alkylidene Complexes as Efficient Olefin-Metathesis Catalysts", Angew. Chem. Int. Ed. 2003, 42, p. 4592-4633.

(Continued)

*Primary Examiner* — Robert C Boyle

(57) ABSTRACT

This invention relates to novel catalyst compositions based on Ruthenium- or Osmium-based complex catalysts and to a process for selectively hydrogenating nitrile rubbers in the presence of such catalyst compositions.

15 Claims, 3 Drawing Sheets

(56) References Cited

OTHER PUBLICATIONS

Grela, K., "A Good Bargain: An Inexpensive, Air-Stable Ruthenium Metathesis Catalyst Derived from a-Asarone", Eur. J. Org. Chem., 2003, p. 963-966.
Bujok, R. "Ortho-and Para-Substituted Hoveyda-Grubbs Carbenes. An Improved Synthesis of Highly Efficient Metathesis Initiators", J. Org. Chem., 2004, 69, p. 6894-6896.
Krause, J.O., "Synthesis and Reactivity of Homogeneous and Heterogeneous Ruthenium-Based Metathesis Catalysts Containing Electron-Withdrawing Ligands", Chem. Eur. J., 2004, 10, p. 777-784.
Parent, J.S., "OsHCl(CO) (Ox)(PCy3)2—Catalyzed Hydrogenation of Acrylonitrile-Butadiene Copolymers", Ind. Eng. Chem. Res., 1998, 37, p. 4253-4261.
Martin, P. "A detailed study of the hydrogenation of nitrile-butadiene rubber and other substrates catalyzed by Ru(II) complexes", Journal of Molecular Catalysis A: Chemical 126 (1997) p. 115-131.
Drouin, S. D. "Multiple Tandem Catalysis: Facile Cycling between Hydrogenation and Metathesis Chemistry", Organometallics, vol. 20, No. 26, Dec. 24, 2001, p. 5495-5497.
Camm, K.D., "Tandem ROMP-Hydrogenation with a Third-Generation Grubbs Catalyst", J.Am. Chem. Soc., 2007, 129, p. 4168-4169.
Drouin, S.D. "Hydrogenolysis of a Ruthenium Carbene Complex to Yield Dihydride-Dihydrogen Tautomers: Mechanistic Implications for Tandem ROMP-Hydrogenation Catalysis", Inorg. Chem. 2000, 39, p. 5412-5414.
International Search Report from co-pending Application EP2012070811 dated Feb. 8, 2013, 3 pages.

\* cited by examiner

Figures:
Figure 1/6: FT-IR spectra of (H)NBR samples during hydrogenation in Example 1
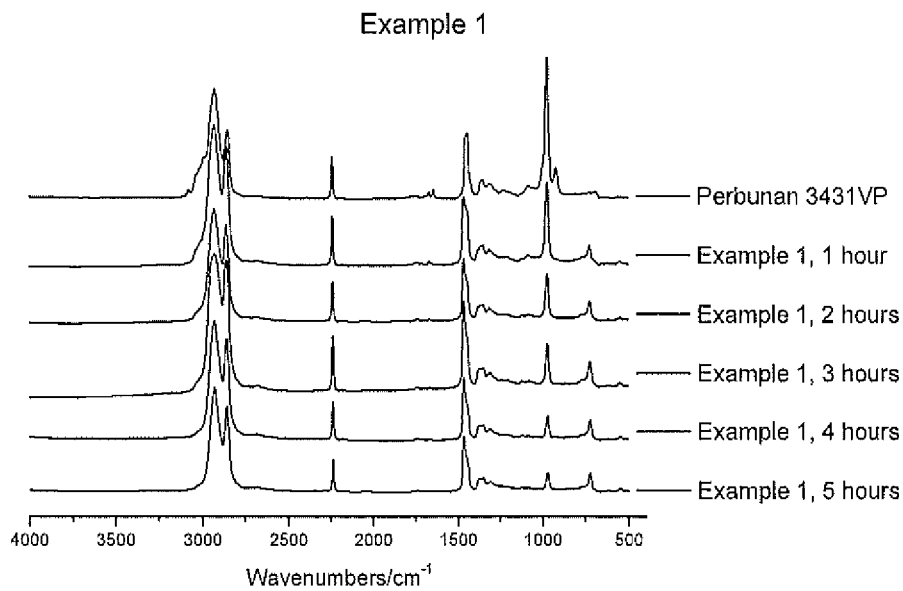
Figure 2/6: FT-IR spectra of (H)NBR samples during hydrogenation in Example 2
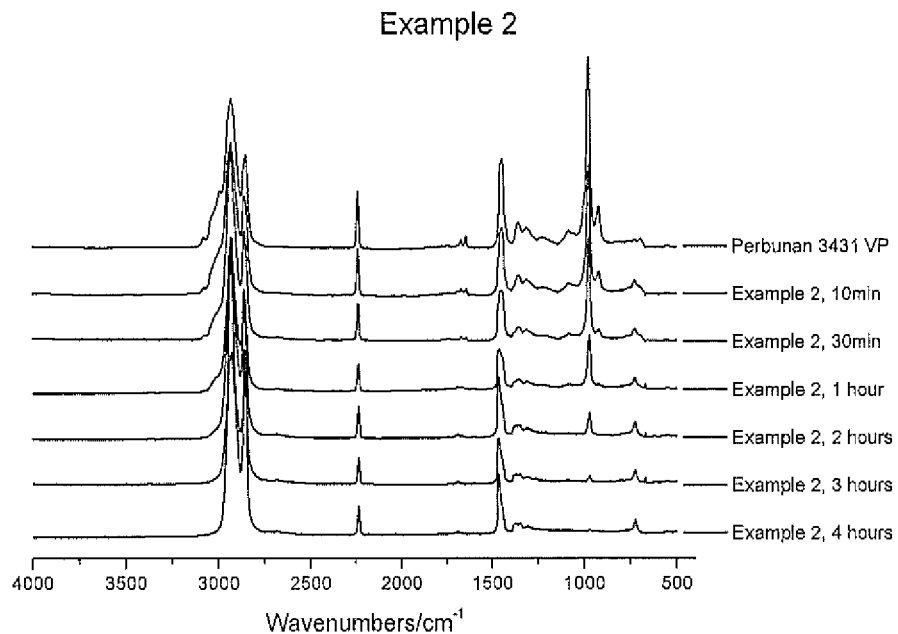
Figure 3/6: FT-IR spectra of (H)NBR samples during the hydrogenation in Example 3

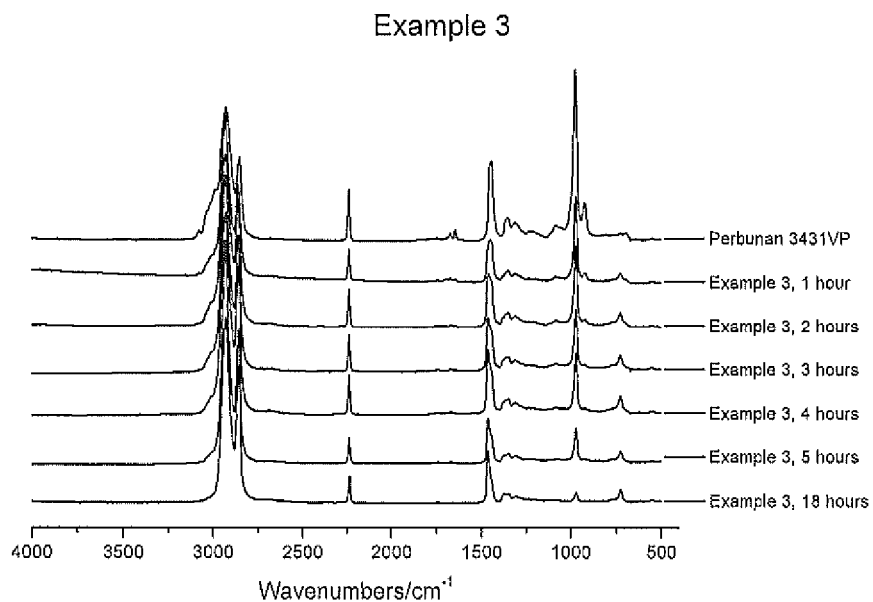
Figure 4/6: The hydrogenation degree of the (H)NBR samples during the hydrogenation process in Example 1-3.
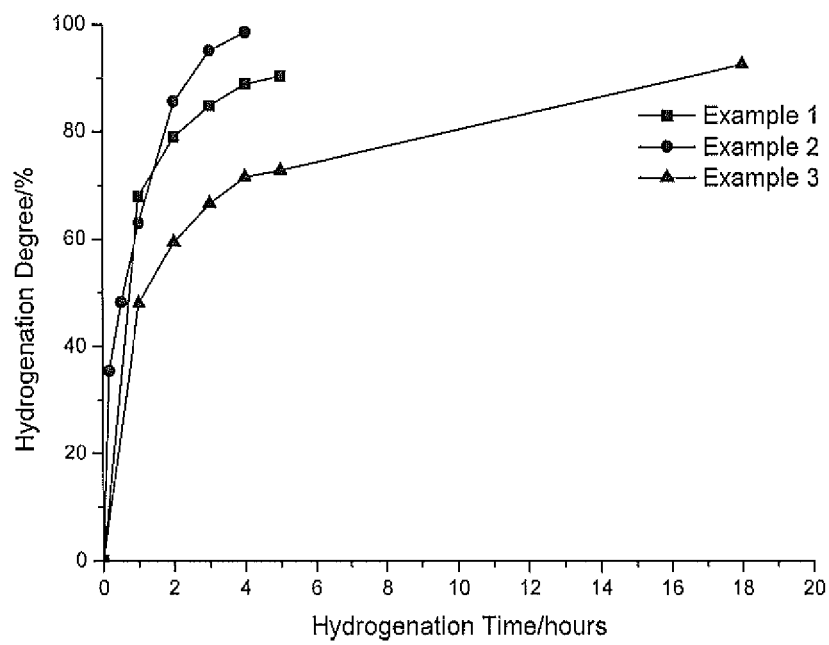
Figure 5/6: FT-IR spectra of HNBR samples after hydrogenation in Example 4 and 5

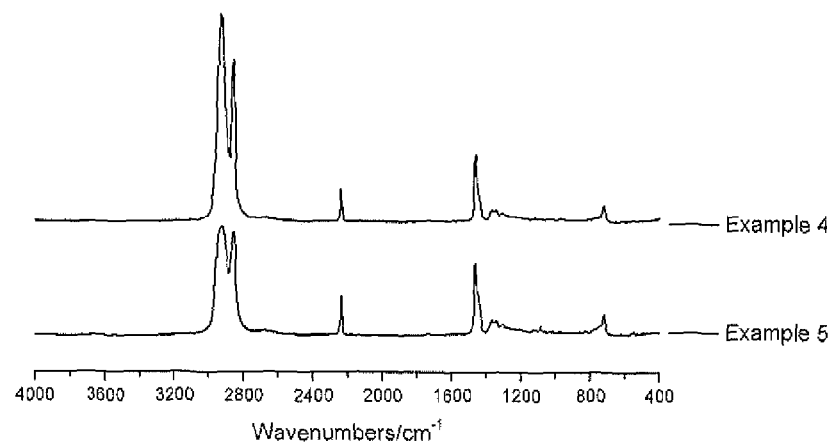
Figure 6/6: The hydrogenation degree of the (H)NBR samples during the hydrogenation in Example 3 and 5
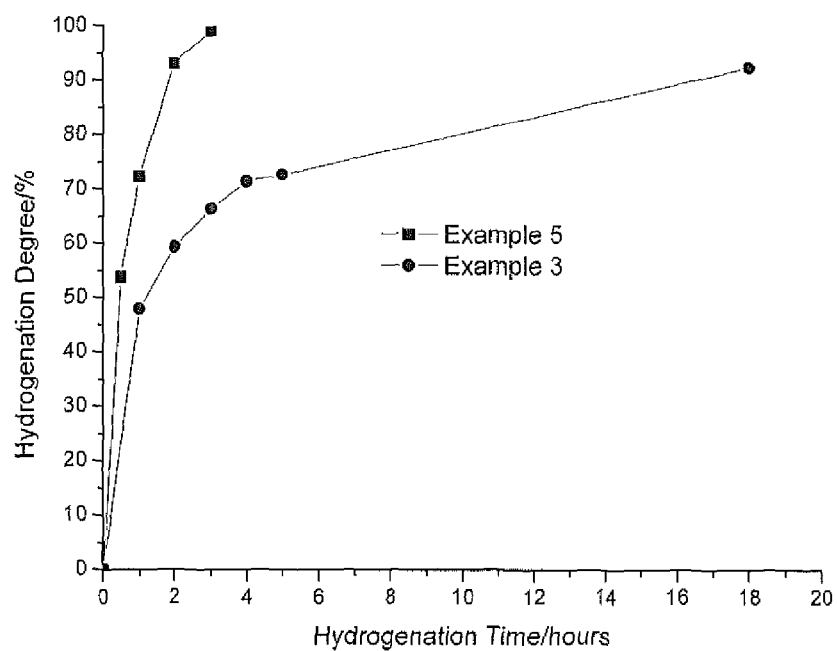

CATALYST COMPOSITIONS AND THEIR USE FOR HYDROGENATION OF NITRILE RUBBER

FIELD OF THE INVENTION

This invention relates to novel catalyst compositions based on Ruthenium- or Osmium-based complex catalysts and to a process for selectively hydrogenating nitrile rubbers in the presence of such catalyst compositions.

BACKGROUND OF THE INVENTION

The term "acrylonitrile-butadiene rubber" or "nitrile rubber", also named as "NBR" for short, shall be interpreted broadly and refers to rubbers which are copolymers or terpolymers of at least one α,β-unsaturated nitrile, at least one conjugated diene and, if desired, one or more further copolymerizable monomers.

Hydrogenated NBR, also referred to as "HNBR" for short, is produced commercially by hydrogenation of NBR. Accordingly, the selective hydrogenation of the carbon-carbon double bonds in the diene-based polymer must be conducted without affecting the nitrile groups and other functional groups (such as carboxyl groups when other copolymerizable monomers were introduced into the polymer chains) in the polymer chains.

HNBR is a specialty rubber which has very good heat resistance, an excellent resistance to ozone and chemicals and also an excellent oil resistance. The abovementioned physical and chemical properties of HNBR are associated with very good mechanical properties, in particular a high abrasion resistance. For this reason, HNBR has found wide use in a variety of applications. HNBR is used, for example, for seals, hoses, belts and damping elements in the automobile sector, also for stators, oil well seals and valve seals in the field of oil exploration and also for numerous parts in the aircraft industry, the electronics industry, mechanical engineering and shipbuilding. A hydrogenation conversion higher than 95%, or a residual double bond (RDB) content <5%, without cross-linking during the hydrogenation reaction and a gel level of less than about 2.5% in the resultant HNBR is a threshold that ensures high-performance applications of HNBR in these areas and guarantees excellent processability of the final product.

The degree of hydrogenation of the copolymerized diene units in HNBR may vary in the range from 50 to 100%, however, the desired hydrogenation degree is from about 80 to about 100%, preferably from about 90 to about 99.9%. Commercial grades of HNBR typically have a remaining level of unsaturation below 18% and a content of acrylonitrile of roughly up to about 50%.

It is possible to carry out the hydrogenation of NBR either with homogeneous or with heterogeneous hydrogenation catalysts. The catalysts used are usually based on rhodium, ruthenium or palladium, but it is also possible to use platinum, iridium, rhenium, osmium, cobalt or copper either as metal or preferably in the form of metal compounds (see e.g. U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. No. 4,464,515 and U.S. Pat. No. 4,503,196). Suitable catalysts and solvents for a hydrogenation in the homogeneous phase are known from DE-A-25 39 132 and EP-A-0 471 250.

Also for commercial purposes the production of HNBR by hydrogenation of NBR is performed in organic solvents by using either a heterogeneous or a homogeneous transition metal catalyst often based on rhodium or palladium. Such processes suffer from drawbacks such as high prices for the catalyst metals and the cost involved in catalyst metal removal/recycle. This has led to research and development of alternative catalysts based on cheaper noble metals, such as osmium and ruthenium.

Alternative NBR hydrogenation processes can be performed using Os-based catalysts. One catalyst excellently suited for NBR hydrogenation is $OsHCl(CO)(O_2)(PCy_3)_2$ as described in Ind. Eng. Chem. Res., 1998, 37(11), 4253-4261). The rates of hydrogenation using this catalyst are superior to those produced by Wilkinson's catalyst ($RhCl(PPh_3)_3$) over the entire range of reaction conditions studied.

Ru-based complexes are also good catalysts for polymer solution hydrogenation, and the price for Ru metal is even cheaper. $Ru$—$PPh_3$ complexes and $RuHCl(CO)L_2$ (L is a bulky phosphine) catalyst systems lead to quantitative hydrogenation of NBR as disclosed in Journal of Molecular Catalysis A: Chemical, 1997, 126(2-3), 115-131). During such hydrogenation it is not necessary to add a free phosphine ligand to maintain the catalyst activity. However, they are prone to gel formation and may cause a certain degree of cross-linking during hydrogenation.

However, these above mentioned Os or Ru catalysts are active catalysts for hydrogenation only, not for metathesis reactions. Therefore, these types of Os or Ru catalysts can not be used for NBR metathesis/degradation to produce NBR with reduced molecular weight.

Another problem of the HNBR production is that HNBR with a low Mooney viscosity is difficult to manufacture by the direct hydrogenation of commercially available NBR. The relatively high Mooney viscosity places restrictions on the processability of HNBR. Many applications would ideally use HNBR grades with a lower molecular weight and a lower Mooney viscosity. This would give a decisive improvement in processability.

For a long time, it has not been possible to produce HNBR on a large scale having a low molar mass corresponding to a Mooney viscosity (ML1+4 at 100° C.) in the range below 55 or with a weight average molecular weight of about Mw<200,000 g/mol by means of the established direct NBR hydrogenation processes mainly for two reasons: Firstly a sharp increase in the Mooney viscosity occurs during hydrogenation of NBR which means that a HNBR polymer with substantially increased Mooney viscosity is obtained. The Mooney Increase Ratio (MIR) is generally around 2 or even above, depending upon the NBR grade, hydrogenation level and nature of the NBR feedstock. Thus, the Mooney viscosity range of marketed HNBR is limited by the lower limit of the Mooney viscosity of the NBR starting material. Secondly, the molar mass of the NBR feedstock to be used for the hydrogenation cannot be reduced at will since otherwise work-up in the NBR industrial plants available is no longer possible because the rubber becomes too sticky. The lowest Mooney viscosity of an NBR feedstock which can be worked up without difficulties in an established industrial plant is in a range of about 30 Mooney units (ML1+4 at 100° C.). The Mooney viscosity of the hydrogenated nitrile rubber obtained using such an NBR feedstock is in the order of 55 Mooney units (ML1+4 at 100° C.). The Mooney viscosity is determined in accordance with ASTM standard D 1646.

In the more recent prior art, this problem is solved by reducing the molecular weight of the nitrite rubber before hydrogenation by degradation to a Mooney viscosity (ML1+4 at 100° C.) of less than 30 Mooney units or a weight average molecular weight of Mw<200,000 g/mol. The reduction in the molecular weight is achieved by metathesis of the NBR in the presence of metathesis catalysts. WO-A-02/100905 and WO-A-02/100941 describe for example a process which comprises degradation of nitrile rubber starting polymers by olefin metathesis and subsequent hydrogenation. A nitrite rubber is reacted in a first step in the presence of a coolefine and a specific catalyst based on osmium, ruthenium, molybdenum or tungsten complexes and hydrogenated in a second step. The hydrogenated nitrile rubbers obtained may have a weight average molecular weight (Mw) in the range from 30 000 to 250 000, a Mooney viscosity (ML 1+4 at 100° C.) in the range from 3 to 50 and a polydispersity index PDI of less than 2.5. The metathesis reaction is advantageously carried out in the same solvent as the subsequent hydrogenation so that the degraded nitrile rubber does not have to be necessarily isolated from the solvent after the degradation reaction is complete, Well-known for metathesis of nitrile rubber are a number of Ru-based metathesis catalysts like e.g. Grubbs I (benzylidene bis(tricyclohexylphosphine) dichloro ruthenium), Grubbs II (benzylidene[1,3-bis(2,4,6-trimethylphenyl)-2-imidazolidinyliden]tricyclohexylphosphin dichloro ruthenium), Grubbs III (benzylidene[1,3-bis(2,4,6-trimethylphenyl)-2-imidazolidinylidene]dichloro-bis(3-bromopyridine) ruthenium), Hoveyda-Grubbs II ([1,3-bis-(2,4,6-trimethylphenyl)-2-imidazolidinyliden]dichloro(o-isopropoxyphenylmethylen) ruthenium) (see e.g. US-A-2008/0064882) and a number of fluorenyliden-based complex catalysts (see e.g. US-A-2009/0076226)

EP-A-1 905 777 discloses ruthenium complex catalysts having the general structure

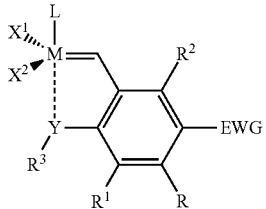

wherein
M is ruthenium,
$X^1$ and $X^2$ are each chloro or RCOO with R in such RCOO being $C_1$-$C_{20}$ alkyl or a derivative thereof,
L is an electron donating complex ligand, which could be linked or not linked with $X^1$ to form a cyclic structure
Y is oxygen, sulfur, nitrogen or phosphorus;
R is H, halogen atom, nitro, cyano, $C_1$-$C_{20}$ alkyl, $C_1$-$C_{20}$ alkoxy, $C_1$-$C_{20}$ alkylthio, $C_1$-$C_{20}$ silanyl, $C_1$-$C_{20}$ silanyloxy, $C_6$-$C_{20}$ aryl, $C_6$-$C_{20}$ aryloxy, $C_2$-$C_{20}$ heterocyclic, $C_2$-$C_{20}$ heterocyclic aryl, sulfinyl, sulfonyl, formyl, $C_1$-$C_{20}$ carbonyl, $C_1$-$C_{20}$ ester, $C_1$-$C_{20}$ amido, $C_1$-$C_{20}$ uramido or derivatives or $C_1$-$C_{20}$ sulfonamido group;
$R^1$ and $R^2$ are each H, bromo (Br), iodo (I), $C_1$-$C_{20}$ alkyl or derivatives, $C_1$-$C_{20}$ alkoxy, $C_1$-$C_{20}$ alkylthio, $C_1$-$C_{20}$ silanyloxy, $C_6$-$C_{20}$ aryloxy, $C_6$-$C_{20}$ aryl, $C_2$-$C_{20}$ heterocyclic, $C_2$-$C_{20}$ heterocyclic aryl, $C_1$-$C_{20}$ ester, $C_1$-$C_{20}$ amido, $C_1$-$C_{20}$ uramido or derivatives or $C_1$-$C_{20}$ sulfonamido group;
$R^3$ is H, $C_1$-$C_{20}$ alkyl or derivatives, $C_1$-$C_{20}$ alkoxy, alkylthio, $C_1$-$C_{20}$ silanyl, $C_1$-$C_{20}$ silanyloxy, $C_6$-$C_{20}$ aryl, $C_6$-$C_{20}$ aryloxy. $C_2$-$C_{20}$ heterocyclic, $C_2$-$C_{20}$ heterocyclic aryl, sulfinyl, sulfonyl, $C_1$-$C_{20}$ carbonyl, $C_1$-$C_{20}$ ester, $C_1$-$C_{20}$ amido, $C_1$-$C_{20}$ uramido or derivatives or $C_1$-$C_{20}$ sulfonamido group; and
EWG is $C_1$-$C_{20}$ aminosulfonyl ($SO_2NR_2$), formyl, $C_1$-$C_{20}$ carbonyl, $C_1$-$C_{20}$ ester, $C_1$-$C_{20}$ aminocarbonyl ($CONR_2$), amido, chloro, fluoro, $C_1$-$C_{20}$ uramido or derivatives or $C_1$-$C_{20}$ sulfonamido group.

EP-A-1 905 777 further states that these catalysts can be used in olefin metathesis reactions including ring-closing olefin metathesis reactions, intermolecular olefin metathesis reactions, and olefin metathesis polymerization reactions. The examples show the preparation of low molecular weight substances by intramolecular ring closing metathesis in the presence of certain of the generally disclosed catalysts. EP-A-1 905 777 does neither provide any disclosure that these catalysts can be used to degrade the molecular weight of polymers, in particular nitrile rubbers nor that they show any hydrogenation activity.

Furtheron processes for simultaneous metathesis and hydrogenation are known from prior art. In WO-A-2005/080456 the preparation of hydrogenated nitrile rubber polymers having low molecular weights and narrower molecular weight distributions than those known in the art is carried out by simultaneously subjecting the nitrile rubber to a metathesis reaction and a hydrogenation reaction. The reaction takes place in the presence of a Ruthenium- or Osmium-based pentacoordinated complex catalyst, in particular 1,3-bis(2,4,6-trimethylphenyl)-2-imidazolidinylidene) (tricyclohexylphosphine) ruthenium (phenylmethyl-lene) dichloride (also called Grubbs $2^{nd}$ generation catalyst). However, WO-A-2005/080456 does not provide any disclosure or teaching how to influence the two simultaneously occurring reactions, i.e. metathesis and hydrogenation or how to control the activity of the respective catalysts regarding metathesis and hydrogenation.

WO-A-2011/023788 also discloses a process for subjecting a nitrile rubber in the presence of hydrogen to a combined and simultaneous metathesis and hydrogenation reaction in the presence of specifically defined hexacoordinated Ruthenium-oder Osmium based catalysts in order to prepare hydrogenated nitrile rubbers having lower molecular weights and narrower molecular weight distributions than those known in the art. Such process is performed by using at least one catalyst of general formula (I) to (III)

   (I)

   (II)

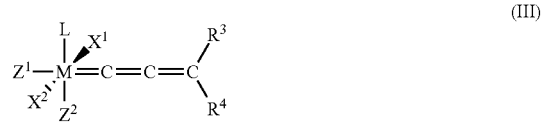   (III)

where
M is ruthenium or osmium,
$X^1$ and $X^2$ are identical or different ligands, preferably anionic ligands, $Z^1$ and $Z^2$ are identical or different and neutral electron donor ligands, $R^3$ and $R^4$ are each independently H or a substituent selected from the group consisting of alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl and alkylsulphinyl radical, each of which may optionally be substituted by one or more alkyl, halogen, alkoxy, aryl or heteroaryl moities, and L is a ligand.

WO-A-2011/029732 also discloses an alternative process for subjecting a nitrile rubber in the presence of hydrogen to a combined and simultaneous metathesis and hydrogenation reaction in the presence of specifically defined pentacoordinated Ruthenium- or Osmium based catalysts in order to prepare hydrogenated nitrile rubbers having low molecular weights and a narrow molecular weight distribution. Such process is performed in the presence of at least one compound of the general formula (I),

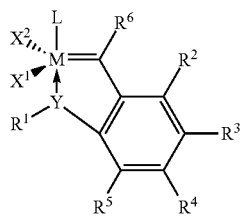

(I)

where

M is ruthenium or osmium,

Y is oxygen (O), sulphur (S), an N—$R^1$ radical or a P—$R^1$ radical, $X^1$ and $X^2$ are identical or different ligands, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl, $CR^{13}C(O)R^4$ or alkylsulphinyl moiety, each of which may optionally be substituted by one or more alkyl, halogen, alkoxy, aryl or heteroaryl moiety, $R^{13}$ is hydrogen or alkyl, cycloalkyl, alkenyl, alkynyl, aryl, alkoxy, alkenyloxy, alkynyloxy, aryloxy, alkoxycarbonyl, alkylamino, alkylthlo, arylthio, alkylsulphonyl or alkylsulphinyl moiety, each of which may optionally be substituted by one or more alkyl, halogen, alkoxy, aryl or heteroaryl moiety;

$R^{14}$ is alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl moiety, each of which may optionally be substituted by one or more alkyl, halogen, alkoxy, aryl or heteroaryl moiety;

$R^2$, $R^3$, $R^4$ and $R^5$ are identical or different and are each H, organic or inorganic radicals, $R^6$ is H or an alkyl, alkenyl, alkynyl or aryl radical and L is a ligand.

However, neither WO-A-2011/023788 nor WO-A-2011/029732 provide any disclosure or teaching how to influence the two simultaneously occurring reactions, i.e. metathesis and hydrogenation or how to control the two-fold activity of the respective catalysts for metathesis and hydrogenation.

WO-A-2011/079799 discloses a broad variety of catalysts the general structure of which is shown hereinafter

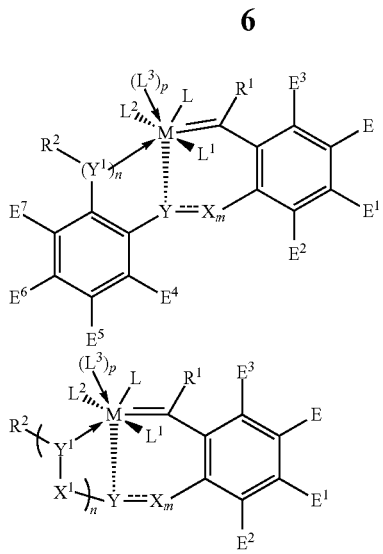

It is stated that such catalysts can be used to provide modified nitrile butadiene rubber (NBR) or styrene-butadiene rubber (SBR) by depolymerisation. It is further stated that the catalysts can be used in a method of making a depolymerized HNBR or styreno-butadiene rubber by adding one or more of those catalysts first to carry out depolymerisation of NBR, followed by adding hydrogen into the reactor under high pressure for hydrogenation. In another embodiment it is disclosed to prepare HNBR by adding hydrogen under high pressure first, then followed by adding one or more of the above catalysts. However, WO-A-2011/079799 does not provide any disclosure or teaching how to influence the different catalytic activities of the catalysts for depolymerisation (metathesis) and hydrogenation. It is accepted that while hydrogenation takes place simultaneously metathesis leads to a degradation of the molecular weight in uncontrolled manner.

A number of references describe the use of metathesis catalysts in two step reactions starting with a ring-opening metathesis polymerisation (ROMP) first which is followed by a hydrogenation reaction (so called "tandem polymerization/hydrogenation reactions").

According to Organometallles, 2001, 20(26), 5495-5497 the metathesis catalyst Grubbs I can be used for ROMP of cyclooctene or a norbornene derivative first, then followed by a hydrogenation of the polymers. It is reported that the addition of a base like $NEt_3$ increases the catalytic activity in the hydrogenation reaction.

J. Am. Chem. Soc 2007, 129, 4168-9 also relates to tandem ROMP-hydrogenation reactions starting from functionalized norbornenes and compares the use of three Ruthenium-based catalysts, i.e. Grubbs I, Grubbs II and Grubbs III catalysts in such tandem reactions. It is described that the Ruthenium-based catalyst on the end of the polymer backbone is liberated and transformed into a hydrogenation-active species through reaction with $H_2$, base ($NEt_3$), and methanol.

EP-A-1 197 509 discloses a process for preparing a hydrogenated polymer by polymerizing a cycloolefine in the presence of an organo ruthenium or osmium compound and subsequently subjecting the unsaturated polymer obtained during polymerization to a hydrogenation under addition of a hydrogenation catalyst. EP-A-1 197 509 does not describe any cross-metathesis and does not relate to any degradation of the polymer via metathesis Inorg. Chem. 2000, 39, 5412-14 also explores tandem ROMP polymerization/hydrogenation reactions. The focus lies on the mechanism of the hydrogenolysis of the ruthenium-based metathesis catalyst Grubbs I. It is shown that such catalyst is transformed into dihydride, dihydrogen and hydride species under conditions relevant to hydrogenation chemistry. However, there is no disclosure at all about polymer degradation via metathesis or hydrogenation of unsaturated polymers.

In further references the quenching of metathesis reactions with vinyl compounds is described:

Numerous patent applications like US-A-2007/0049700, US-A-2008/0064882, US-A-2007/0208206, US-A-2008/0076881, US-A-2009/054597, US-A-2009/0069516, US-A-2009/0076227, US-A-2009/0076226, US-A-2010/0087600, US-A-2010/0093944, and two not yet published patent applications with the serial number EP 11153437.6 and PCT/EP2011/063570 referring to the molecular weight degradation of nitrile rubbers by a methathesis reaction contain experiments in which the reaction mixture is treated with vinylethylether after the metathesis reaction in order to destroy the metathesis catalyst. The molar ratio of vinylethylether to the metathesis catalysts used is very high in order to efficiently stop the metathesis reaction by deactivation of the catalyst. In the aforementioned applications such molar ratio lies in a range of from 567:1 to more than 17.000:1. None of those patent applications provides any disclosure or hint that by choosing lower ratios of the deactivating reagent to the metathesis catalyst a catalyst composition is obtained which is excellently suited for a selective hydrogenation, i.e. without continuing to catalyse the metathetic degradation.

In J. Am, Chem. Soc. 2001, 123, 6543-54 the mechanism of ruthenium based catalysts for olefin metathesis is disclosed. Furtheron it is described that the reaction of ruthenium carbenes with ethylvinylether can be utilized as a method for quenching ring opening metathesis polymerization. As shown in the following scheme a so-called Fischer-carbene complex is reported to be built.

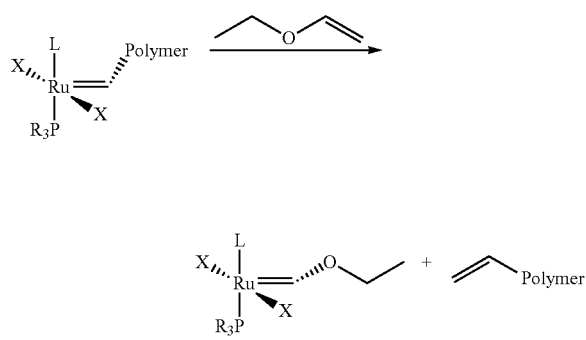

In Tetrahedron Letters 50 (2009), 6103-5 it is disclosed that di (ethylene glycol) vinyl ether and amine derivatives thereof can also be used as deactivating reagents for olefin metathesis catalysts. It is experimentally shown that the use of 4 equivalents of di (ethylene glycol) vinyl ether based on the metathesis catalyst are sufficient to efficiently deactivate the metathesis catalyst. Even 2 equivalents are reported to be sufficient. However, this reference does not deal with hydrogenation processes subsequently to olefin metathesis at all.

In Macromol. Symp. 2010, 297, 25-32 it is shown that polyisobutylene ("PIB") terminally functionalized with a vinyl ether group may serve to sequester a complex catalyst by conversion of a reactive ruthenium alkylidene complex into a phase-immobilized Fischer carbene complex. Additionally kinetic studies are presented on the reaction of 2 equivalents PIB vinyl ether and 6 as well as 15 equivalents of ethyl vinyl ether with Grubbs II catalyst.

It can be seen from the above that:

(1) up to now, hydrogenation catalysts which are very active for the selective hydrogenation of nitrile rubbers are known and Rh- and Pd-based catalysts are already used in industrial hydrogenation processes; however, cheaper Ru-based hydrogenation catalysts are still facing the gel formation problem when used for NBR hydrogenation. Most importantly, only HNBR with high molecular weight can be produced by using these catalysts which can only catalyse the NBR hydrogenation. The molecular weight of the final HNBR is determined by the molecular weight of the raw NBR, not by the hydrogenation catalysts;

(2) the degradation of nitrile rubber by metathesis is known using ruthenium- or osmium-based metathesis catalysts followed by a hydrogenation of the degraded nitrile rubber to afford hydrogenated nitrile rubber, if the same catalyst is used for metathesis and for hydrogenation, such catalysts are highly active for NBR metathesis while not so active for NBR hydrogenation; and (3) catalysts which possess catalytic activity for both, i.e. metathesis and hydrogenation, cannot be used in a controlled manner.

Therefore, in current commercial production processes, a separate hydrogenation catalyst is added into the reaction system for the NBR hydrogenation after the NBR metathesis step. In this way, HNBR with controlled molecular weight can be produced, but two catalysts (one for metathesis and one for hydrogenation) are required to achieve high reaction efficiency.

However, hitherto there is not a single literature reporting the preparation of hydrogenated nitrile rubber with controlled molecular weight and therefore controllable Mooney viscosity only using a ruthenium- or osmium-based catalyst which is otherwise known for its metathetic activity. Also, up to now, there is no hydrogenation catalyst which can be used at a very low concentration for NBR hydrogenation to high conversion. So far a catalyst removal or recycle step is required after the hydrogenation.

Accordingly it was the object of the present invention to provide an improved catalyst composition allowing a selective hydrogenation of nitrile rubber at low catalyst concentrations and short times.

SUMMARY OF THE INVENTION

The present invention relates to a process of hydrogenating a nitrile rubber comprising a) contacting a complex catalyst with hydrogen in the absence of a nitrile rubber at a temperature in the range of from 75° C. to 200° C. to form a catalyst composition and thereafter b) hydrogenating the nitrile rubber in the presence of the catalyst composition formed in step a), wherein the complex catalyst used in step a) has the general formula (A)

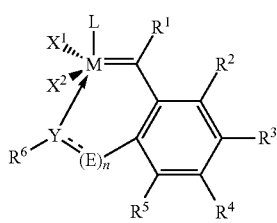

(A)

where

M is ruthenium or osmium, $X^1$ and $X^2$ are identical or different ligands,

L is an electron donating ligand, which can be linked or not linked with $X^1$ to form a cyclic structure, $R^1$ is hydrogen, alkyl, cycloalkyl, alkenyl, alkynyl, aryl or heteroaryl and $R^2$, $R^3$, $R^4$ and $R^5$ are identical or different and are each hydrogen or an organic or inorganic substituent, $R^6$ is H, alkyl, cycloalkyl, alkenyl, alkynyl, aryl, heteroaryl, —C(=O)R, —C(=O)OR, —C(=O)N(R)$_2$, —C(=S)R, —C(=S)SR, —C(=S)OR, —C(=S)N(R)$_2$, —S(=O)$_2$N(R)$_2$, —S(=O)R, —S(=O)R or a group containing either a C=O or a C=S structural element adjacent to a carbon atom which is bound to Y, n is 0 or 1, wherein if n=1, then the element

shall mean that Y and (E)$_n$ are linked either by a single bond or by a double bond, wherein (i) if Y and (E)$_n$ are linked by a single bond, then
 Y is oxygen (O), sulphur (S), N—R or P—R and
 E is CH$_2$ or (ii) if Y and (E)$_n$ are linked by a double bond, then
 Y is N or P
 E is CH, wherein if n=0, then Y is oxygen (O), sulphur (S), N—R or P—R and directly linked by a single bond to the phenyl moiety depicted above in formula (A)

and wherein in all above occurrences of general formula (A) R s hydrogen or alkyl, cycloalkyl, alkenyl, alkynyl, aryl or heteroaryl.

The present invention further relates to a novel catalyst composition which is obtainable by contacting a complex catalyst based on ruthenium or osmium and bearing at least one ligand which is bound to ruthenium or osmium in a carbene-like fashion with hydrogen in the absence of nitrile rubber at a temperature in the range of from 75° C. to 200° C.

While the above described prior art like e.g. WO-A-2011/023788 and WO-A-2011/029732 always disclosed simultaneous and competing metathesis when a catalyst with metathesis activity was used for hydrogenation of nitrile rubbers, the novel process advantageously allows for the first time to perform a hydrogenation of nitrile rubber without a simultaneous metathetic degradation of the nitrile rubber, if a catalyst composition is used which has been obtained by treating a metathesis catalyst with hydrogen first. Hence, the present process allows a hydrogenation of nitrile rubbers in a controlled manner, i.e. under formation of hydrogenated nitrile rubber with a tailormade molecular weight in a commercially attractive fashion. It is possible to keep the molecular weight of the nitrile rubber constant during hydrogenation. In the alternative it is also possible to adjust and regulate the molecular weight of the nitrile rubber in a desired manner by controlling the pretreatment of the metathesis catalyst with hydrogen when preparing the novel catalyst composition. Additionally the hydrogenation process of the present invention allows to use the ruthenium- or osmium-based catalyst in a very low concentration so that there is no need to remove or recycle the catalyst after the hydrogenation.

The catalyst composition prepared and used according to the present invention is characterized by its high hydrogenation activity. High hydrogenation degrees may be achieved in short reaction times. In particular the hydrogenation activity of the novel catalyst composition is higher than the hydrogenation activity of the corresponding ruthenium- or osmium-based catalyst only used as such for NBR hydrogenation.

BRIEF DESCRIPTION OF THE FIGURES

The above and other aspects, features and advantages of the invention will become apparent from the following detailed description in conjunction with the accompanying drawings showing the following:

FIG. 1: FT-IR spectra of the (H)NBR samples during the hydrogenation in Example 1.

FIG. 2: FT-IR spectra of the (H)NBR samples during the hydrogenation in Example 2.

FIG. 3: FT-IR spectra of the (H)NBR samples during the hydrogenation in Example 3.

FIG. 4: Hydrogenation degree of the (H)NBR samples during the hydrogenation process in Example 1-3.

FIG. 5: FT-IR spectra of HNBR samples after hydrogenation in Example 4 and 5

FIG. 6: Hydrogenation degree of the (H)NBR samples during the hydrogenation in Examples 3 and 5.

DETAILED DESCRIPTION OF THE INVENTION

The term "substituted" used for the purposes of the present patent application means that a hydrogen atom on an indicated radical or atom has been replaced by one of the groups indicated in each case, with the proviso that the valency of the atom indicated is not exceeded and the substitution leads to a stable compound.

For the purposes of the present patent application and invention, all the definitions of moities, parameters or explanations given above or below in general terms or in preferred ranges can be combined with one another in any way, i.e. including combinations of the respective ranges and preferred ranges.

Catalysts:

The catalyst compositions according to the invention are obtained by using a catalyst of the general formula (A),

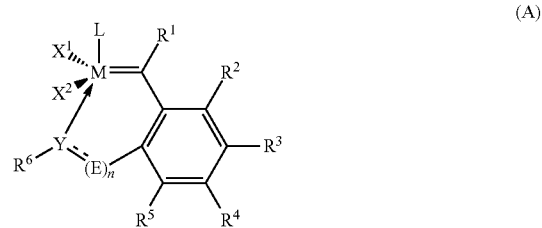

(A)

where

M is ruthenium or osmium, $X^1$ and $X^2$ are identical or different ligands,

L is an electron donating ligand, which can be linked or not linked with $X^1$ to form a cyclic structure, $R^1$ is hydrogen, alkyl, cycloalkyl, alkenyl, alkynyl, aryl or heteroaryl and $R^2$, $R^3$, $R^4$ and $R^5$ are identical or different and are each hydrogen or an organic or inorganic substituent, $R^6$ is H, alkyl, cycloalkyl, alkenyl, alkynyl, aryl, heteroaryl, —C(O)R, —C(O)OR, —C(=O)N(R)$_2$, —C(=S)R, —C(=S)SR, —C(=S)OR, —C(=S)N(R)$_2$, —S(=O)$_2$N(R)$_2$, —S(=O)$_2$R, —S(=O)R or a group containing either a C=O or a C—S structural element adjacent to a carbon atom which is bound to Y, n is 0 or 1, wherein if n=1, then the element

shall mean that Y and (E)$_n$ are linked either by a single bond or by a double bond, wherein (i) if Y and (E)$_n$ are linked by a single bond, then
Y is oxygen (O), sulfur (S), N—R or P—R and
E is CH$_2$ or (ii) if Y and (E)$_n$ are linked by a double bond, then
Y is N or P
E is CH wherein if n=0, then Y is oxygen (O), sulfur (S), N—R or P—R and directly linked by a single bond to the phenyl moiety depicted above in formula (A)

and wherein in all above occurrences of general formula (A) R is hydrogen or alkyl, cycloalkyl, alkenyl, alkynyl, aryl or heteroaryl.

In all the above mentioned and further down defined preferred, more preferred and most preferred embodiments of the catalysts according to general formula (A) the alkyl, cycloalkyl, alkenyl, alkynyl, aryl, or heteroaryl moieties in the respective moieties may optionally be further substituted by one or more $C_1$-$C_6$-alkyl, $C_5$-$C_6$-cycloalkyl, $C_1$-$C_6$-alkoxy, $C_2$-$C_6$-alkenyl, $C_2$-$C_6$-alkynyl, halogen, aryl, preferably phenyl, heteroaryl, preferably pyridinyl, imidazolyl, or triazolyl substituents. All aforementioned substltuents, in particular the alkyl, alkenyl and/or alkynyl moieties can be straight-chain or branched to the extent chemically plausible.

The catalysts of the general formula (A) are known in principle. Representatives of this class of compounds are e.g. the catalysts described by Hoveyda et al. in US 2002/0107138 A1 and Angew Chem. Int. Ed. 2003, 42, 4592, and the catalysts described by Grela in WO-A-2004/035596, Eur. J. Org. Chem. 2003, 963-966 and Angew. Chem. Int. Ed. 2002, 41, 4038 and also in J. Org. Chem. 2004, 69, 6894-96 and Chem. Eur. J. 2004, 10, 777-784. Further representatives of this class of catalysts am the catalysts described in EP-A-1 905 777. These catalysts are either commercially available or can be prepared as described in the literature references cited.

To the extent any of the following general, preferred, more preferred or most preferred definitions of the catalyst according to general formula (A) mention the meaning "$C_1$-$C_{20}$ heterocyclic" and "$C_2$-$C_{20}$ heteroaryl" this shall always imply that the respective heterocyclic ring or heteroaryl ring contains besides the number of carbon atoms given such an additional number of hetero atoms that a stable heterocyclic or heteroaryl structure is formed: A stable "$C_2$ heterocyclic" would e.g. be a triazolyl moiety comprising two carbon atoms in the ring and three nitrogen atoms.

Definition of L

In the general formula (A), L is an electron donating ligand. In one embodiment of the catalysts of general formula (A) L is a phosphine, sulfonated phosphine, phosphate, phosphinite, phosphonite, arsine, stibine, ether, amine, amide, sulfonate, sulfoxide, carboxyl, nitrosyl, pyridine, thioether, imidazoline or imidazolidine ligand (the latter two also being jointly referred to as "Im" ligand(s)).

The term "phosphinite" includes, for example, phenyl diphenylphosphinite, cyclohexyl dicyclohexylphosphinite, isopropyl diisopropylphosphinite and methyl diphenylphosphinite.

The term "phosphite" includes, for example, triphenyl phosphite, tricyclohexyl phosphite, tri-tert-butyl phosphite, triisopropyl phosphite and methyl diphenyl phosphite.

The term "stibine" includes, for example, triphenylstibine, tricyclohexylstibine and trimethylstibine.

The term "sulfonate" includes, for example, trifluoromethanesulfonate, tosylate and mesylate.

The term "sulfoxide" includes, for example, (CH$_3$)$_2$S(=O) and (CsHs)$_2$S=O.

The term "thioether" Includes, for example, CH$_3$SCH$_3$, C$_6$HsSCH$_3$, CH$_3$OCH$_2$CH$_2$SCH$_3$ and tetrahydrothiophene.

For the purposes of the present application, the term "pyridine" is used as a collective term for all nitrogen-containing ligands as are mentioned by, for example, Grubbs in WO-A-03/011455. Examples are: pyridine, picolines (including α-, β- and γ-picoline), lutidines (including 2,3-, 2,4-, 2,5-, 2,6-, 3,4- and 3,5-lutidine), collidine (2,4,6-trimethylpyridine), trifluoromethylpyridine, phenylpyridine, 4-(dimethylamino)pyridine, chloropyridines, bromopyridines, nitropyridines, quinoline, pyrimidine, pyrrole, imidazole and phenylimidazole.

In a preferred embodiment catalysts of general formula (A) are used in which one or both of ligands L represent an imidazoline or imidazolidine ligand (also jointly referred to as "Im"—ligand in this application unless indicated otherwise), having a structure of general formulae (IIa) or (IIb), wherein the meaning of L can be identical or different in case both ligands L have a structure according to (IIa) or (IIb),

where $R^8$, $R^9$, $R^{10}$ and $R^{11}$ are identical or different and represent hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_7$-$C_{25}$-alkaryl, $C_2$-$C_{20}$ heteroaryl, $C_2$-$C_{20}$ heterocyclyl, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, —Si(R)$_3$, —O—Si(R)$_3$, —O—C(=O)R, C(=O)R, —C(=O)N(R)$_2$, —NR—C(=O)—N(R)$_2$, —SO$_2$N(R)$_2$—S(=O)R, —S(=O)R, —O—S(=O)$_2$R, halogen, nitro or cyano; wherein in all above occurrences relating to the meanings of $R^8$, $R^9$, $R^{10}$ and $R^{11}$ the group R is identical or different and represents hydrogen, alkyl, cycloalkyl, alkenyl, alkynyl, aryl or heteroaryl.

If appropriate, one or more of $R^8$, $R^9$, $R^{10}$, and $R^{11}$ can independently of one another, be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, $C_2$-$C_{20}$ heteroaryl, $C_2$-$C_{20}$ heterocyclic, and a functional group selected from the group consisting of hydroxy, thiol, thioether, ketone, aldehyde, ester, ether, amine, imine, amide, nitro, carboxylic acid, disulphide, carbonate, isocyanate, carbodilmide, carboalkoxy, carbamate and halogen, where these abovementioned substituents, to the extent chemically possible, may in turn be substituted by one or more substituents, preferably selected from the group consisting of halogen, in particular chlorine or bromine, $C_1$-$C_5$-alkyl, $C_1$-$C_5$-alkoxy and phenyl.

Merely in the interest of clarity, it may be added that the structures of the imidazoline and imidazolidine ligand depicted in the general formulae (IIa) and (IIb) in the present patent application are equivalent to the structures (IIa') and (IIb') which are frequently also found in the literature for this imidazoline and imidazolidine ligand, respectively, and emphasize the carbene character of the imidazoline and imidazolidine. This applies analogously to the associated preferred structures (IIIa)-(IIIu) depicted below.

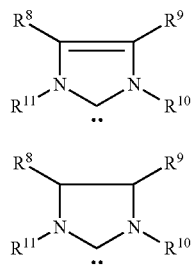

(IIa')

(IIb')

If L is an imidazoline or imidazolidine ligand in the catalysts of the general formula (A)

$R^8$ and $R^9$ are identical or different and preferably represent hydrogen, $C_6$-$C_{24}$-aryl, straight-chain or branched $C_1$-$C_{10}$-alkyl, or form a cycloalkyl or aryl structure together with the carbon atoms to which they are bound.

More preferably $R^8$ and $R^9$ are identical and are selected from the group consisting of hydrogen, methyl, propyl, butyl and phenyl.

The preferred and more preferred meanings of $R^8$ and $R^9$ may be substituted by one or more further substituents selected from the group consisting of straight-chain or branched $C_1$-$C_{10}$-alkyl or $C_1$-$C_{10}$-alkoxy, $C_3$-$C_8$-cycloalkyl, $C_6$-$C_{24}$-aryl, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherein all these substituents may in turn be substituted by one or more substituents, preferably selected from the group consisting of halogen, in particular chlorine or bromine, $C_1$-$C_5$-alkyl, $C_1$-$C_5$-alkoxy and phenyl.

If L is an imidazolilne or Imidazolidine ligand in the catalysts of the general formula (A)

$R^{10}$ and $R^{11}$ are identical or different and preferably represent straight-chain or branched $C_1$-$C_{10}$-alkyl, $C_3$-$C_{10}$-cycloalkyl, $C_6$-$C_{24}$-aryl, particularly preferably phenyl, $C_1$-$C_{10}$-alkylsulfonate, $C_6$-$C_{10}$-arylsulfonate.

More preferably $R^{10}$ and $R^{11}$ are identical and are selected from the group consisting of i-propyl, neopentyl, adamantyl, phenyl, 2,6-dlisopropylphenyl, 2,6-dimethylphenyl, or 2,4,6-trimethylphenyl.

These preferred meanings of $R_{10}$ and $R_{11}$ may be substituted by one or more further substituents selected from the group consisting of straight-chain or branched $C_1$-$C_{10}$-alkyl or $C_1$-$C_{10}$-alkoxy, $C_3$-$C_8$-cycloalkyl, $C_6$-$C_{24}$-aryl, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherein all these substituents may in turn be substituted by one or more substituents, preferably selected from the group consisting of halogen, in particular chlorine or bromine, $C_1$-$C_5$-alkyl, $C_1$-$C_5$-alkoxy and phenyl.

Particularly preferred imidazoline and imidazolidine ligands have the following structures (IIIa) to (IIIu), where "Ph" means in each case phenyl, "Bu" means butyl, "Mes" represents in each case 2,4,6-trimethylphenyl, "Dipp" means in all cases 2,6-diisopropylphenyl and "Dimp" means 2,6-dimethylphenyl.

(IIIa)

(IIIb)

(IIIc)

(IIId)

(IIIe)

(IIIf)

-continued

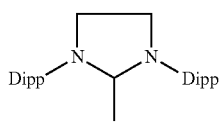 (IIIg)

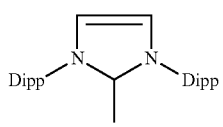 (IIIh)

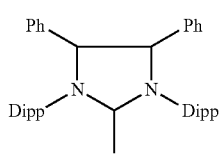 (IIIj)

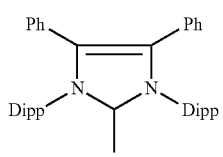 (IIIk)

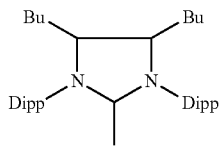 (IIIm)

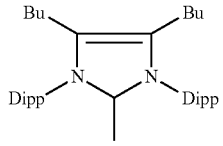 (IIIn)

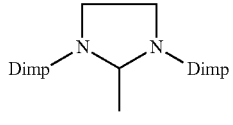 (IIIp)

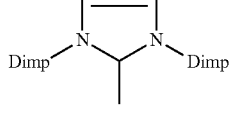 (IIIq)

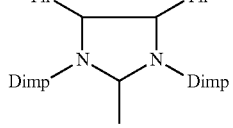 (IIIr)

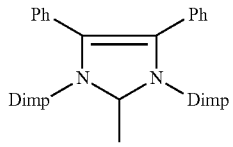 (IIIs)

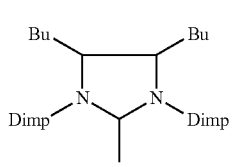 (IIIt)

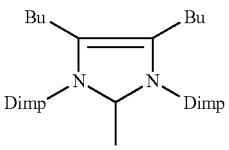 (IIIu)

In a further preferred embodiment L may have the general formula (IIc) and (IId)

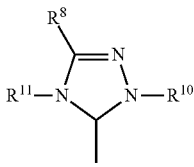 (IIc)

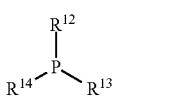 (IId)

wherein $R^8$, $R^9$ and $R^{10}$ may have all general, preferred, more preferred and most preferred meanings as defined above in relation to general formulae (IIa) and (IIb), and $R^{12}$, $R^{13}$ and $R^{14}$ are identical or different and may represent alkyl, cycloalkyl, alkoxy, aryl, aryloxy, or a heterocyclic group.

In general formulae (IIc) and (IId) $R^8$, $R^9$, $R^{10}$, $R^{12}$, $R^{13}$ and $R^{14}$ may be substituted also by one or more further substituents selected from the group consisting of straight-chain or branched $C_1$-$C_5$-alkyl, in particular methyl, $C_1$-$C_5$-alkoxy, aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In a more preferred embodiment the ligand L has the general formula (IId) wherein $R^{12}$, $R^{13}$ and $R^{14}$ are identical or different, even more preferably identical, and can represent $C_1$-$C_{20}$ alkyl, $C_3$-$C_8$-cycloalkyl, $C_1$-$C_{20}$ alkoxy, $C_6$-$C_{20}$ aryl, $C_6$-$C_{20}$ aryloxy, $C_2$-$C_{20}$ heteroaryl or a $C_2$-$C_{20}$ heterocyclic group;

In an even more preferred embodiment the ligand L has the general formula (IId) wherein $R^{12}$, $R^{13}$ and $R^{14}$ are identical and each selected from the group consisting of methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, neophenyl, cyclopropyl, cyclobutyl, cyclopentyl, cyclohexyl, cycloheptyl cyclooctyl, phenyl, biphenyl, naphthyl, phenanthrenyl, anthracenyl, tolyl, 2,6-dimethylphenyl, and trifluoromethyl.

In case the ligand L possesses general formula (IId) it most preferably represents $PPh_3$, $P(p\text{-Tol})_3$, $P(o\text{-Tol})_3$, $PPh(CH_3)_2$, $P(CF_3)_3$, $P(p\text{-FC}_6H_4)_3$, $P(p\text{-CF}_3C_6H_4)_3$, $P(C_6H_4\text{—SO}_3Na)_3$, $P(CH_2C_6H_4\text{—SO}_3Na)_3$, $P(\text{isopropyl})_3$, $P(CHCH_3(CH_2CH_3))_3$, $P(\text{cyclopentyl})_3$, $P(\text{cyclohexyl})_3$, $P(\text{neopentyl})_3$ or $P(\text{neophenyl})_3$.

Definition of $X^1$ and $X^1$

In the catalysts of the general formula (A), $X^1$ and $X^2$ are identical or different ligands, preferably anionic ligands.

In one embodiment of the catalysts of general formula (A), $X^1$ and $X^2$ are identical or different and represent hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulfonate, $C_6$-$C_{24}$-ararylsulfonate, $C_1$-$C_{20}$-alkylthiol, $C_6$-$C_{24}$-arylthiol, $C_1$-$C_{20}$-alkylsulfonyl or $C_1$-$C_{20}$-alkylsulfinyl.

The abovementioned moieties listed as meanings for $X^1$ and $X^2$ can also be substituted by one or more further substituents, for example by halogen, preferably fluorine, $C_1$-$C_{10}$-alkyl, $C_1$-$C_{10}$-alkoxy or $C_6$-$C_{24}$-aryl, where these groups, too, may in turn also be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulfonate.

In a particularly preferred embodiment, $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3XCH_3)_2CO$, PhO (phenoxy), MeO (methoxy), EtO (ethoxy), tosylate (p-$CH_3$—$CH_4$—$SO_3$), mesylate ($CH_3SO_3$) or trifluoromethanesulfonate ($CF_3SO_3$).

Definition of $R^1$

In the general formula (A), $R^1$ shall mean hydrogen, alkyl, alkenyl, alkynyl or aryl. $R^1$ preferably represents hydrogen, $C_1$-$C_{30}$-alkyl, $C_2$-$C_{20}$-alkenyl, $C_2$-$C_{20}$-alkynyl or $C_6$-$C_{24}$-aryl. $R^6$ is particularly preferably hydrogen.

Definition of $R^6$

In the general formula (A) $R^6$ shall mean H, alkyl, cycloalkyl, alkenyl, alkynyl, aryl, hetero-aryl, —C(=O)R, —C(=O)OR, —C(=O)N(R)$_2$, —C(=S)R, —C(=S)SR, —C(=S)OR, —C(=S)N(R)$_2$, —S(=O)$_2$N(R)$_2$, —S(=O)$_2$R, —S(=O)R or a group containing either a C=O or a C=S structural element adjacent to a carbon atom which is bound to Y in formula (A), wherein R in all occurrences is identical or different and represents hydrogen, alkyl, cycloalkyl, alkenyl, alkynyl, aryl or heteroaryl. The meanings given for $R^6$ as well as R may in each case optionally be substituted by one or more alkyl, halogen, alkoxy, aryl or heteroaryl substituents.

$R^6$ is typically $C_1$-$C_{30}$-alkyl, $C_2$-$C_{20}$-cycloalkyl, $C_2$-$C_{20}$-alkenyl, $C_2$-$C_{20}$-alkynyl, $C_6$-$C_{24}$-aryl, $C_2$-$C_{20}$ heteroaryl, —C(=O)R, —C(=O)OR, —C(=O)N(R)$_2$, —C(=S)R, —C(=S)SR, —C(=S)OR, —C(=S)N(R)$_2$, S(=O)$_2$N(R)$_2$, —S(=O)$_2$R, —S(=O)R, —CH($R^{61}$)—C(=O)($R^{62}$) or —CH($R^{61}$)—C(=S)($R^2$), wherein $R^{61}$ and $R^{62}$ are identical or different and represent alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl, or wherein $R^{61}$ may represent in the alternative also hydrogen, or where in the alternative $R^{61}$ and $R^{62}$ can form a saturated or unsaturated cyclic structure together with the carbon atoms to which they are bound, and wherein in all occurrences R is identical or different and represents hydrogen, alkyl, cycloalkyl, alkenyl, alkynyl, aryl or heteroaryl.

The preferred meanings given for $R^6$, R, $R^{61}$ and $R^{62}$ may in each case optionally be substituted by one or more $C_1$-$C_{30}$ alkyl, fluoro, chloro, $C_1$-$C_{20}$ alkoxy, $C_6$-$C_{24}$ aryl or $C_2$-$C_{20}$ heteroaryl substituents.

In one preferred embodiment $R^6$ is selected from the group consisting of
$C_3$-$C_8$-cyloalkyl,
$C_6$-$C_{24}$-aryl,
straight-chain or branched $C_1$-$C_{12}$-alkyl, with the latter being able, if appropriate, to be interrupted by one or more double or triple bonds or one or more heteroatoms, preferably oxygen or N—R with R as defined above for formula (A), and
—CH($R^{61}$)—C(=O)($R^{62}$), or —CH($R^{61}$)—C(=S)($R^{62}$), wherein $R^{61}$ and $R^{62}$ are identical or different and represent alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl, each of which may optionally be substituted by one or more alkyl, halogen, alkoxy, aryl or heteroaryl substituents, wherein $R^{61}$ may represent in the alternative also hydrogen or where in the alternative $R^{61}$ and $R^{62}$ can form a cyclic structure together with the carbon atoms to which they are bound.

$C_3$-$C_8$-cycloalkyl encompasses cyclopropyl, cyclobutyl, cyclopentyl, cyclohexyl, cycloheptyl and cyclooctyl.

$C_6$-$C_{24}$-aryl shall mean an aromatic moiety having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

$C_1$-$C_{12}$-alkyl can be, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, n-heptyl, n-octyl, n-decyl or n-dodecyl.

$R^6$ is particularly preferably straight-chain or branched $C_1$-$C_{12}$-alkyl, most preferably methyl or isopropyl.

Definition of $R^2$, $R^3$, $R^4$ and $R^5$

In the general formula (B) $R^2$, $R^3$, $R^4$ and $R^5$ are identical or different and can each be hydrogen or an organic or inorganic moiety.

In an appropriate embodiment, $R^2$, $R^3$, $R^4$, $R^5$ are identical or different and are each hydrogen, halogen, nitro, cyano, alkyl, cycloalkyl, alkenyl, alkynyl, aryl, heterocyclyl, heteroaryl, alkoxy, alkenyloxy, alkynyloxy, aryloxy, alkoxycarbonyl, alkylthio, arylthio, —N(R)$_2$, —Si(R)$_3$, —O—Si(R)$_3$, —C(=O)R, —C(=O)OR, —C(=O)N(R)$_2$, —C(=S)R, —C(=S)SR, —C(=S)OR, —C(=S)N(R)$_2$, —S(=O)$_2$N(R)$_2$, —S(=O)R, or —S(O)$_2$R wherein R is identical or different and represents hydrogen, alkyl, cycloalkyl, alkenyl, alkynyl, aryl or heteroaryl or if two substituents R are bound to the same atom, such two substituents R may also form a saturated or unsaturated cyclic structure together with the atoms to which they are bound. These meanings given for $R^2$, $R^3$, $R^4$, $R^5$ may be in each case optionally be substituted by one or more alkyl, alkoxy, halogen, aryl or heteroaryl moieties.

In a preferred embodiment $R^1$, $R^3$, $R^4$, $R^5$ are identical or different and may represent hydrogen, fluorine, chlorine, bromine, iodine, nitro, cyano, $C_1$-$C_{20}$-alkyl, $C_3$-$C_{10}$-cycloalkyl, $C_2$-$C_{20}$-alkenyl, $C_2$-$C_{20}$-alkynyl, $C_6$-$C_{24}$-aryl, $C_2$-$C_{20}$ heterocyclyl, $C_2$-$C_{20}$ heteroaryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $CC_1$-$C_{20}$-alkylthio, $C_6$-$C_{24}$-arylthio, —N(R)$_2$, —Si(R)$_3$, —O—Si(R)$_3$, —C(=O)R, —C(=O)OR, —C(=O)N(R)$_2$, —C(=S)R, —C(=S)SR, —C(=S)OR, —C(=S)N(R)$_2$, —S(=O)$_2$N(R)$_2$, —S(=O) R, or —S(=O)$_2$R wherein R is identical or different and shall mean H, $C_1$-$C_{20}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_2$-$C_{24}$-heteroaryl, or if two substituents R are bound to the same atom, such two substituents R may also form a saturated or unsaturated cyclic structure together with the atoms to which they are bound. These preferred meanings given for $R^2$, $R^3$, $R^4$, $R^5$ may in each case optionally be substituted by one or more $C_1$-$C_{30}$-alkyl, $C_1$-$C_{20}$-alkoxy, halogen, $C_6$-$C_{24}$-aryl or heteroaryl moieties.

In a particularly preferred embodiment, $R^2$, $R^3$, $R^4$, $R^5$ are identical or different and are each nitro, straight-chain or branched $C_1$-$C_{10}$-alkyl, $C_5$-$C_8$-cycloalkyl, straight-chain or branched $C_1$-$C_{10}$-alkoxy or $C_6$-$C_{24}$-aryl, most preferably phenyl or naphthyl. The $C_1$-$C_{10}$-alkyl and $C_1$-$C_{10}$-alkoxy moieties may optionally be interrupted by one or more double or triple bonds and/or one or more heteroatoms, preferably oxygen or —N(R)— with R being as defined above.

Furthermore, two or more of $R^2$, $R^3$, $R^4$ or $R^5$ can also be bridged via aliphatic or aromatic structures. For example, $R^3$ and $R^4$ together with the carbon atoms to which they are bound in the phenyl ring of the formula (B) can form a fused-on phenyl ring so that, overall, a naphthyl structure results.

Suitable catalyst compositions are also obtained using a catalyst of general formula (A1),

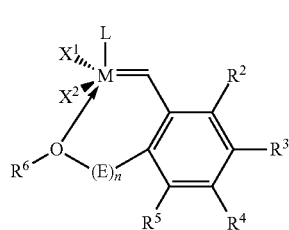

(A1)

where M, L, $X^1$, $X^2$, $R^2$, $R^3$, $R^4$, $R^5$, $R^6$, n and E can have the general, preferred and particularly preferred meanings mentioned for the general formula (A).

The catalysts of the general formula (A1) are known in principle from e.g., US 2002/0107138 A1 (Hoveyda et al.) and can be obtained by preparative methods indicated there.

Particular preference is given to catalyst systems comprising catalysts of the general formula (A1) in which M is ruthenium, $X^1$ and $X^2$ are both halogen, in particular both chlorine, $R^6$ is a straight-chain or branched $C_1$-$C_{12}$-alkyl radical, $R^2$, $R^3$, $R^4$, $R^5$ have the general, preferred and more preferred meanings mentioned for the general formula (A), L has the general, preferred and more preferred meanings mentioned for the general formula (A)

E is $CH_2$ and n is 0 or 1, more preferably 0.

Special preference is given to catalyst systems comprising catalysts of general formula (A1) in which M is ruthenium, $X^1$ and $X^2$ are both chlorine, $R^6$ is an isopropyl radical, $R^2$, $R^3$, $R^4$, $R^5$ are all hydrogen, L is a substituted or unsubstituted imidazoline or imidazolidine ligand of the formula (IIa) or (IIb),

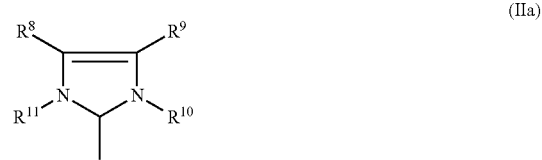

(IIa)

(IIb)

where $R^8$, $R^9$, $R^{10}$, $R^{11}$ are identical or different and represent hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_7$-$C_{25}$-alkaryl, $C_2$-$C_{20}$ heteroaryl, $C_2$-$C_{20}$ heterocyclyl, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, —Si(R)$_3$, —Si(R)$_3$, —O—C(=O)R, C(=O)R, —C(=O)N(R)$_2$, —SO$_2$N(R)$_2$, —S(=O)R, —S(=O)$_2$R, —O—S(=O)$_2$ R, halogen, nitro or cyano, and E is $CH_2$ and n is 0 or 1, more preferably 0.

Such meanings of $R^8$, $R^9$, $R^{10}$, and $R^{11}$ in the specifically preferred catalysts of Formula (A1) may in each case be substituted by one or more further substituent(s), preferably straight-chain or branched $C_1$-$C_{10}$-alkyl, $C_3$-$C_8$-cycloalkyl, $C_1$-$C_{10}$-alkoxy or $C_6$-$C_{24}$-aryl, and these abovementioned substituents may in turn be substituted by one or more moieties, preferably selected from the group consisting of halogen, in particular chlorine or bromine, $C_1$-$C_5$-alkyl, $C_1$-$C_5$-alkoxy and phenyl.

Very particular preference is given to a catalyst system obtainable by using a catalyst which comes under the general formula (A1) and has the following structure, where Mes is 2,4,6-trimethylphenyl.

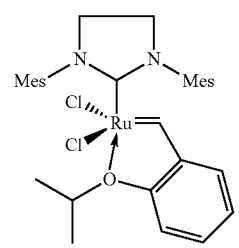

This catalyst is also referred to as "Hoveyda catalyst" in the literature.

Further suitable catalysts which come under the general formula (A1) have the following formulae, where Mes is in each case 2,4,6-trimethylphenyl.

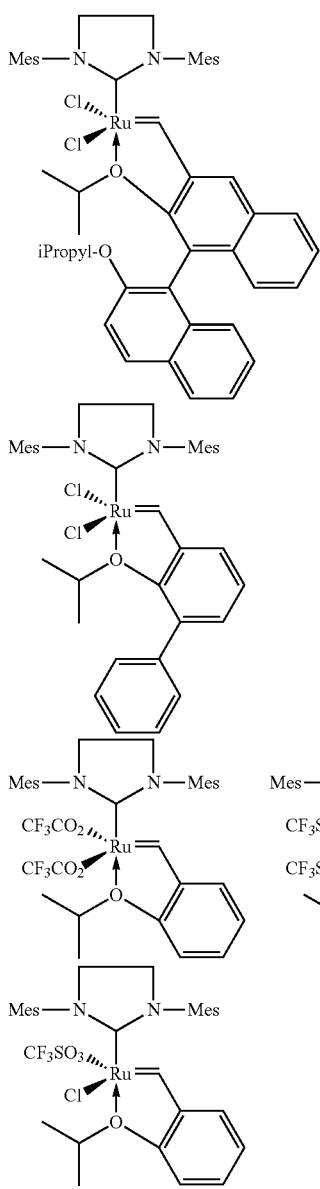

A further catalyst system according to the invention is obtainable using a catalyst of the general formula (A2),

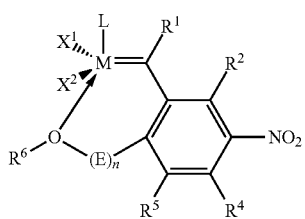

(A2)

where M, L, $X^1$, $X^2$, $R^1$, $R^2$, $R^4$, $R^5$, $R^6$, n and E have the general and preferred meanings mentioned for the formula (A).

The catalysts of the general formula (A2) are known in principle from, for example, WO-A-2004/035596 (Grela) and can be obtained by preparative methods indicated there.

Particular preference is given to catalyst systems obtainable using a catalyst of the general formula (A2) in which M is ruthenium, $X^1$ and $X^2$ are both halogen, in particular both chlorine, R is hydrogen $R^6$ is straight-chain or branched $C_1$-$C_{12}$-alkyl, $R^2$, $R^4$, and $R^5$ have the general and preferred meanings mentioned for the formula (A), L has the meanings mentioned for the general formula (A), E is $CH_2$ and n is 0 or 1, more preferably 0.

Very particular preference is given to catalyst systems obtainable by using a catalyst of the general formula (A2) in which M is ruthenium, $X^1$ and $X^2$ are both chlorine, $R^6$ is isopropyl, L is a substituted or unsubstituted imidazol or imidazolidine ligand of the formulae (IIa) or (IIb), where $R^8$, $R^9$, $R^{10}$, $R^{11}$ are identical or different and have the meanings mentioned for the very particularly preferred catalysts of the general formula (A1), E is $CH_2$ and n is 0 or 1, more preferably 0.

Particularly useful catalysts falling under general formula (A2) have the following structures, where Mes is in each case 2,4,6-trimethylphenyl.

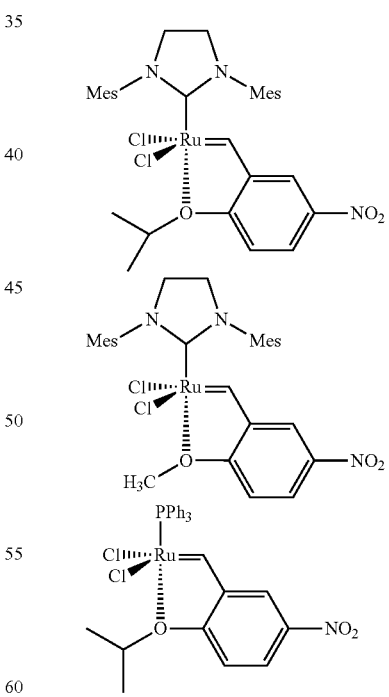

The catalyst depicted on the left is also known as "Grela catalyst" in the literature.

In an alternative embodiment catalysts of the general formula (A3) can be used in the process of the present invention, (A3)

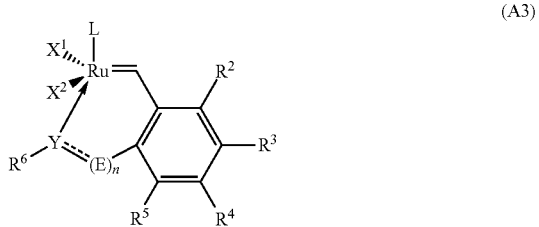

wherein
$X^1$ and $X^2$ are identical or different and shall mean hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthiol, $C_6$-$C_{24}$-arylthiol, $C_1$-$C_{20}$-alkylsulfonyl or $C_1$-$C_{20}$-alkylsulfinyl, L is an electron donating ligand, which can be linked or not linked with $X^1$ to form a cyclic structure, $R^3$ is chloro, fluoro, bromo, —C(=O)R, —C(=O)OR, —OC(=O)R, —C(=O)N(R)$_2$, —C(=S)R, —C(=S)SR, —C(=S)OR, —C(=S)N(R)$_2$, —S(=O)N(R)$_2$, —S(=O)$_2$R, or —S(=O)R, $R^4$ is H, halogen, nitro, cyano, $C_1$-$C_{20}$ alkyl, $C_1$-$C_{20}$ alkoxy, $C_1$-$C_{20}$ alkylthio, —Si(R)$_3$, —O—Si(R)$_3$, $C_6$-$C_{20}$ aryl, $C_6$-$C_{20}$ aryloxy, $C_2$-$C_{20}$ heterocyclic, $C_2$-$C_{20}$ heteroaryl, —C(=O)R, —C(=O)OR, —C(=O)N(R)$_2$, —C(=S)R, —C(=S)SR, —C(=S)OR, —C(=S)N(R)$_2$, —S(=O)$_2$N(R)$_2$, —S(=O)$_2$R or —S(=O)R, $R^2$ and $R^5$ are each H, bromo (Br), iodo (I), $C_1$-$C_{20}$ alkyl, $C_1$-$C_{20}$ alkoxy, $C_1$-$C_{20}$ alkylthio, —Si(R)$_3$, —O—Si(R)$_3$, $C_6$-$C_{20}$ aryloxy, $C_6$-$C_{20}$ aryl, $C_2$-$C_{20}$ heterocyclic, $C_2$-$C_{20}$ heteroaryl, —C(=O)OR, —C(=O)N(R)$_2$, or —SO$_2$N(R)$_2$, $R^6$ is H, $C_1$-$C_{20}$ alkyl, $C_6$-$C_{20}$ aryl, $C_2$-$C_{20}$ heterocyclic, $C_2$-$C_{20}$ heteroaryl, —C(=O)R, —C(=O)OR, —C(=O)N(R)$_2$, —SO$_2$N(R)$_2$, or —N(SO$_2$—R)$_2$, —S(=O)R, or —S(=O)$_2$R, n is 0 or 1 wherein if n=1, then the element

shall mean that Y and (E)$_n$ are linked either by a single bond or by a double bond, wherein
(i) if Y and (E)$_n$ are linked by a single bond, then Y is oxygen (O), sulfur (S), N—R or P—R and E is CH$_2$ or
(ii) if Y and (E)$_n$ are linked by a double bond, then Y is N or P
E is CH, wherein if n=0, then
Y is oxygen (O), sulfur (S), N—R or P—R and directly linked by a single bond to the phenyl moiety depicted above in formula (A3)

and wherein in all above occurrences in formula (A3)
R is identical or different and shall mean H, $C_1$-$C_{20}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_2$-$C_{24}$-heteroaryl, or if two substituents R are bound to the same atom, such two substituents R may also form a saturated or unsaturated cyclic structure together with the atoms to which they are bound.

To the extent the general, preferred, more preferred or most preferred definitions of the catalyst according to general formula (A3) mentions "$C_2$-$C_{20}$ heterocyclic" and "$C_2$-$C_{20}$ heteroaryl" this shall always imply that the respective heterocyclic ring contains besides the number of carbon atoms such a number of hetero atoms that a stable heterocyclic structure is formed: A stable "$C_2$ heteroaryl" would e.g. be an triazolyl moiety comprising two carbon atoms in the ring and three nitrogen atoms.

Definition of $X^1$ and $X^2$ for General Formula (A3)

In the above depicted formula (A3) the moieties listed as meanings for $X^1$ and $X^2$ can also be substituted by one or more further groups, for example by halogen, preferably fluorine, $C_1$-$C_{10}$-alkyl, $C_1$-$C_{10}$-alkoxy or $C_6$-$C_{24}$-aryl, where these groups, too, may once again be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate.

In a particularly preferred embodiment, $X^1$ and $X^2$ are identical and are each halogen, in particular chlorine, CF$_3$COO, CH$_3$COO, CFH$_2$COO, (CH$_3$)$_3$CO, (CF$_3$)$_2$(CH$_3$)CO, (CF$_3$)(CH$_3$)$_2$CO, PhO (phenoxy), MeO (methoxy), EtO (ethoxy), tosylate (p-CH$_3$—C$_6$H$_4$—SO$_3$), mesylate (CHsSO$_3$) or trifluoromethanesulphonate (CFSO$_3$).

In a preferred embodiment of the present invention complex catalysts having the general structure (A3) are suited for obtaining the novel catalyst compositions wherein Y is oxygen or sulfur;

$X^1$ and $X^2$ are identical and are each chloro, CF$_3$COO, CH$_3$COO, CFH$_2$COO, (CH$_3$)$_3$CO, (CF$_3$)$_2$(CH$_3$)CO, (CF$_3$)(CH$_3$)$_2$CO, PhO (phenoxy), MeO (methoxy), EtO (ethoxy), tosylate (p-CH—C$_6$H$_4$—SO$_3$), mesylate (CH$_3$SO$_3$) or trifluoromethanesulphonate (CF$_3$SOS), $R^3$ —C(=O)R, —C(=O)OR, —OC(=O)R, —C(=O)N(R)$_2$, chloro, fluoro, bromo, —NR—C(=O)—N(R)$_2$, or —SO$_2$N(R)$_2$, $R^4$ is hydrogen, halogen, nitro, cyano, $C_1$-$C_{14}$ alkyl, $C_1$-$C_{14}$ alkoxy, $C_1$-$C_{14}$ alkylthio, —Si(R)$_3$, —O—Si(R)$_3$, $C_6$-$C_{14}$ aryl, $C_6$-$C_{14}$ aryloxy, $C_2$-$C_{14}$ heterocyclic, $C_2$-$C_{14}$ heteroaryl, —C(=O)R, —C(=O)OR, —C(=O)N(R)$_2$, —NR—C(=O)—N(R)$_2$, —SO$_2$N(R)$_2$, or —N(SO$_2$R)$_2$, —S(=O)R, or —S(=O)$_2$R $R^2$ and $R^5$ are each hydrogen, bromo (Br), iodo (1), $C_1$-$C_{14}$ alkyl, $C_1$-$C_{14}$ alkoxy, $C_1$-$C_{14}$ alkylthio, —Si(R)$_3$, —O—Si(R)$_3$, $C_6$-$C_{14}$ aryloxy, $C_6$-$C_{14}$ aryl, $C_2$-$C_{14}$ heterocyclic, $C_2$-$C_{14}$ heteroaryl, —C(=O)OR, —C(=O)N(R)$_2$, —NR—C(=O)—N(R)$_2$, —SO$_2$N(R)$_2$, or —N(SO$_2$—R)$_2$, $R^6$ is H, $C_1$-$C_{14}$ alkyl, $C_1$-$C_{14}$ alkoxy, $C_1$-$C_{14}$ alkylthio, —Si(R)$_3$, —O—Si(R)$_3$, $C_6$-$C_{14}$ aryl, $C_6$-$C_{14}$ aryloxy, $C_2$-$C_{14}$ heterocyclic, $C_2$-$C_{14}$ heteroaryl, —C(=O)OR, —C(=O)N(R)$_2$, —NR—C(=O)—N(R)$_2$, —SO$_2$N(R)$_2$, or —N(SO$_2$R)$_2$, n is 0 or 1

E is CH$_2$ wherein if n=1, then Y is linked to E by a single bond, wherein if n=0, then Y is directly linked to the phenyl moiety depicted in formula (A3) and wherein in all above occurrences of this preferred embodiment R is identical or different and shall mean H, $C_1$-$C_8$-alkyl, $C_5$-$C_6$-cycloalkyl, $C_2$-$C_8$-alkenyl, $C_2$-$C_8$-alkynyl, $C_6$-$C_{14}$-aryl, or $C_2$-$C_{14}$-heteroaryl.

In an even more preferred embodiment complex catalysts having the general structure (A3) are suited for obtaining the novel catalyst compositions wherein Y is oxygen, $X^1$ and $X^2$ are identical and each chloro or each R'COO with R' being $C_1$-$C_3$ alkyl, $R^3$ —C(=O)R, —C(=O)OR, —OC(=O)R, —C(=O)N(R)$_2$, chloro, fluoro, bromo, —NR—C(=O)—N(R)$_2$, —SO$_2$N(R)$_2$ or —N(SO$_2$R)$_2$, $R^2$ and $R^5$ are each hydrogen, $R^4$ is H, chloro, fluoro, —C(=O)R, —C(=O)OR, —C(=O)N(R)$_2$, —NR—C(=O)—N(R)$_2$, —SO$_2$N(R)$_2$ or —N(SO$_2$R)$_2$, $R^6$ is $C_1$-$C_6$ alkyl, particularly isopropyl or isobutyl, n is 0 or 1

E is CH$_2$ wherein if n=1, then Y is linked to E by a single bond, wherein if n=0, then Y is directly linked to the phenyl moiety depicted in formula (A3) and wherein in all above occurrences in formula (A3)

R is identical or different and shall mean H, $C_1$-$C_8$-alkyl, $C_5$-$C_6$-cycloalkyl, $C_2$-$C_8$-alkenyl, $C_2$-$C_8$-alkynyl, phenyl, imidazolyl, triazolyl, or pyridinyl moieties.

In another preferred embodiment of the present invention ruthenium complex catalysts having the general structure (A3) are suited for obtaining the novel catalyst compositions, wherein L can be selected from following structures (IIa), (IIb), (IIc) and (IId),

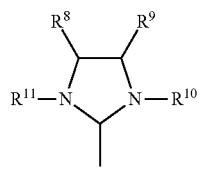

(IIa)

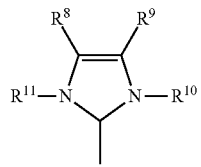

(IIb)

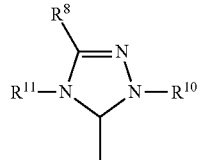

(IIc)

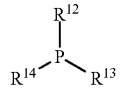

(IId)

wherein $R^{10}$ and $R^{11}$ are each $C_1$-$C_{20}$ alkyl, $C_6$-$C_{20}$ aryl, $C_7$-$C_{25}$ alkaryl, $C_2$-$C_{20}$ heteroaryl, $C_1$-$C_{20}$ heterocyclic, —C(=O)R, —C(=O)N(R)$_2$, —NR—C(=O)—N(R)$_2$, or —SO$_2$N(R)$_2$ $R^8$ and $R^9$ are each hydrogen, $C_1$-$C_{20}$ alkyl, $C_1$-$C_{20}$ alkoxy, $C_1$-$C_{20}$ alkylthio, —Si(R)$_3$, —O—Si(R)$_3$, $C_6$-$C_{20}$ aryl, $C_6$-$C_{20}$ aryloxy, $C_2$-$C_{20}$ heteroaryl, $C_2$-$C_{20}$ heterocyclic, C(=O)R, —C(=O)N(R)$_2$, —NR—C(=O)—N(R)$_2$, or —SO$_2$N(R)$_2$, —S(=O)R, —S(=O)$_2$R or —O—S(=O)$_2$R, halogen, nitro or cyano group;

$R^{12}$, $R^{13}$ and $R^{14}$ are each $C_1$-$C_{20}$ alkyl, $C_1$-$C_{20}$ alkoxy, $C_6$-$C_{20}$ aryl, $C_6$-$C_{20}$ aryloxy, $C_2$-$C_{20}$ heteroaryl or $C_2$-$C_{20}$ heterocyclic group;

wherein in all above occurrences regarding structures (IIa), (IIb), (IIc) and (IId), R is identical or different and shall mean H, $C_1$-$C_{20}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_6$-$C_{24}$-heteroaryl.

In an even more preferred embodiment complex catalysts having the general structure (A3) are suited for obtaining the novel catalyst compositions, in which the ligand L has the structure (IIa) or (IIb) wherein $R^{10}$ and $R^{11}$ are each an aryl group, more preferably each a substituted phenyl group, most preferably each 2,4,6-trimethylphenyl and $R^8$ and $R^9$ are each hydrogen, respectively.

In another preferred embodiment complex catalysts having the general structure (A3) are suited for obtaining the novel catalyst compositions, in which the ligand L has the structure (IId) wherein $R^{12}$, $R^{13}$ and $R^{14}$ are each cyclohexyl, respectively.

In another preferred embodiment of the present invention ruthenium complex catalysts having the general structure (A3) are suited for obtaining the novel catalyst compositions, wherein $X^1$ and $X^2$ are each chloro;

L has the general structure (IIa) or (IIb) as defined above;

Y is oxygen;

$R^3$ —C(=O)R, —C(=O)OR, —OC(=O)R, —C(=O)N(R)$_2$, chloro, fluoro, bromo, —NR—C(=O)—N(R)$_2$, or —SO$_2$N(R)$_2$, $R^4$ is H, halogen, nitro, cyano, $C_1$-$C_{14}$ alkyl, $C_1$-$C_{14}$ alkoxy, $C_1$-$C_{14}$ alkylthio, —Si(R)$_3$, —O—Si(R)$_3$, $C_6$-$C_{14}$ aryl, $C_6$-$C_{14}$ aryloxy, $C_2$-$C_{14}$ heterocyclic, $C_2$-$C_{14}$ heteroaryl, —C(=O)R, —C(=O)OR, —C(=O)N(R)$_2$, —S(=O)$_2$R, —S(=O)R or —SO$_2$N(R)$_2$, $R^2$ and $R^5$ are each H, bromo (Br), iodo (I), $C_1$-$C_{14}$ alkyl, $C_1$-$C_{14}$ alkoxy, $C_1$-$C_{14}$ alkylthio, —O—Si(R)$_3$, $C_6$-$C_{14}$ aryloxy, $C_6$-$C_{14}$ aryl, $C_2$-$C_{14}$ heterocyclic, $C_2$-$C_{14}$ heteroaryl, —C(=O)OR, —C(=O)N(R) or —SO$_2$N(R)$_2$, $R^6$ is H, $C_1$-$C_{14}$ alkyl $C_1$-$C_{14}$ alkoxy, $C_1$-$C_{14}$ alkylthio, —Si(R)$_3$, —O—Si(R)$_3$, $C_6$-$C_{12}$ aryl, $C_6$-$C_{12}$ aryloxy, $C_6$-$C_{12}$ heterocyclic, $C_2$-$C_{12}$ heteroaryl, —C(=O)R, —C(=O)N(R)$_2$, —NR—C(=O)—N(R)$_2$, —SO$_2$N(R)$_2$, or —N(SO$_2$—R)$_2$, wherein in all above occurrences R is identical or different and shall mean H, $C_1$-$C_8$-alkyl, $C_5$-$C_6$-cycloalkyl, $C_2$-$C_8$-alkenyl, $C_2$-$C_8$-alkynyl, phenyl, imidazolyl, triazolyl, or pyridinyl moieties.

In an even more preferred embodiment of the present invention complex catalysts having the general structure (A3) are suited for obtaining the novel catalyst compositions, wherein $X^1$ and $X^2$ are each chloro, L has the general structure (IIa) or (IIb), Y is oxygen, $R^3$ chloro, fluoro, —C(=O)R, —C(=O)OR, —C(=O)N(R)$_2$, or —SO$_2$N(R)$_2$, $R^4$ is H, chloro, fluoro, —C(O)R, —C(=O)OR, —OC(=O)R, —C(=O)N(R)$_2$, or —SO$_2$N(R)$_2$, $R^2$ and $R^5$ are each hydrogen, $R^6$ is $C_1$-$C_6$ alkyl, particularly isopropyl or isobutyl, wherein in all above occurrences R is identical or different and shall mean H, $C_1$-$C_6$-alkyl, $C_5$-$C_6$-cycloalkyl, $C_2$-$C_6$-alkenyl, $C_2$-$C_6$-alkynyl, phenyl, imidazolyl, triazolyl, or pyridinyl moieties.

In a particularly preferred embodiment of the present invention a catalyst is used for the preparation of the novel catalyst compositions which is chosen from the following structures:
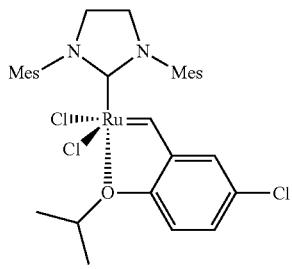
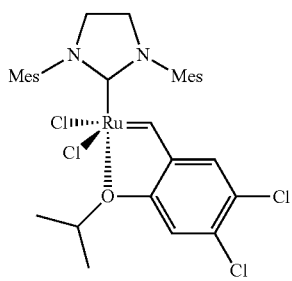
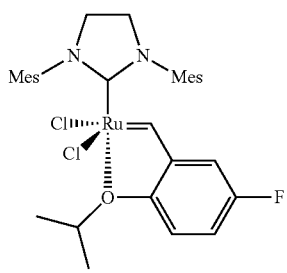
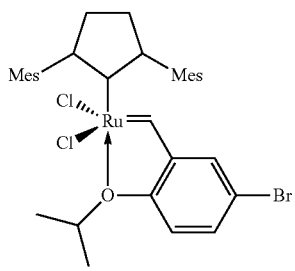
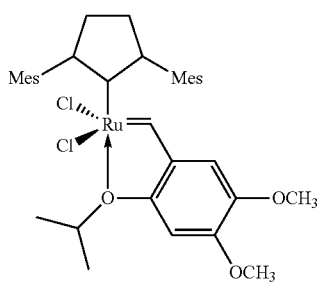
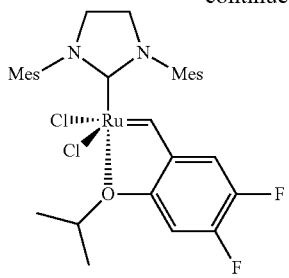
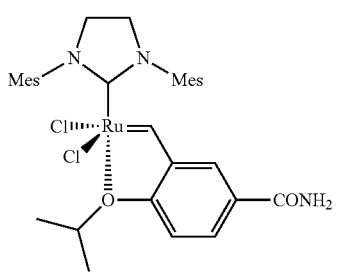
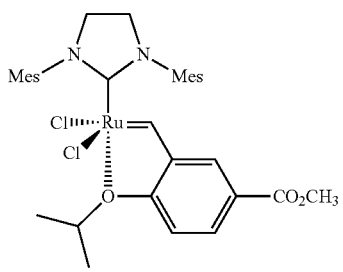
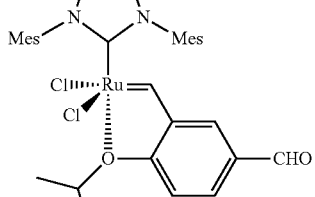
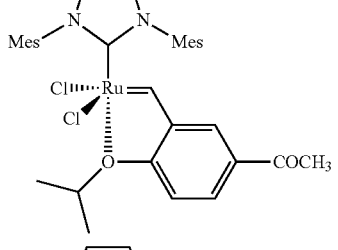
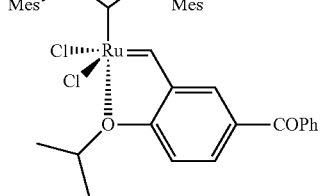

29
-continued
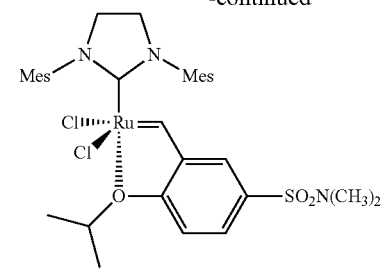
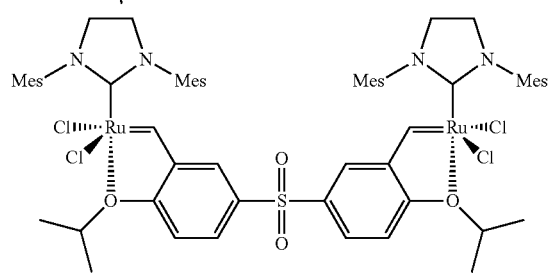
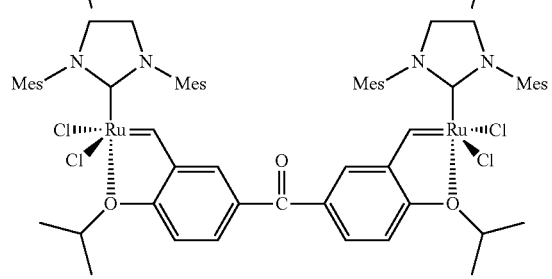
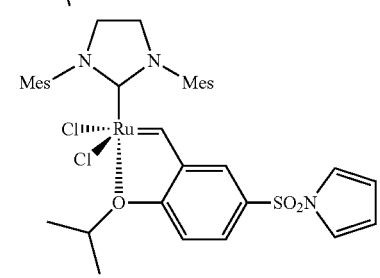
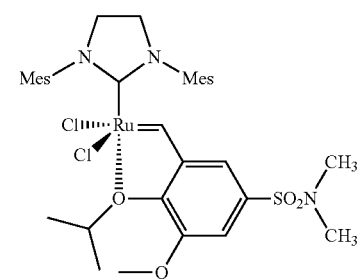
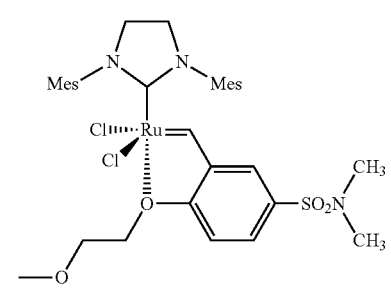
30
-continued
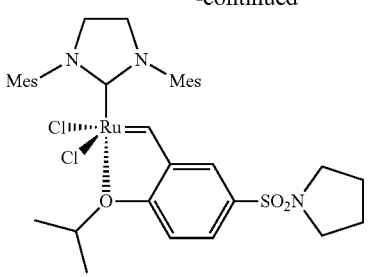
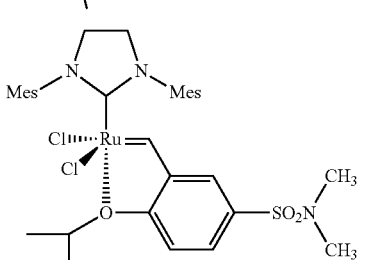
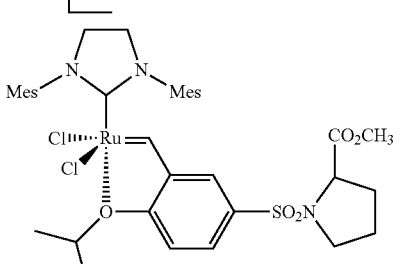
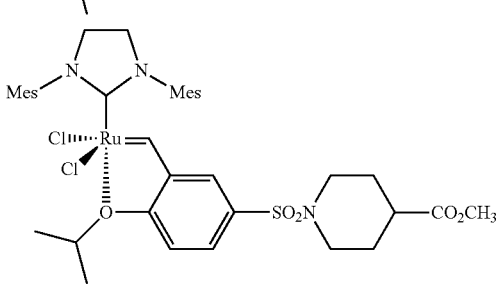
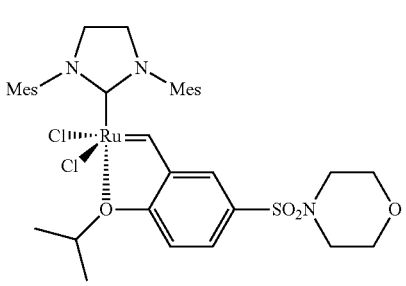
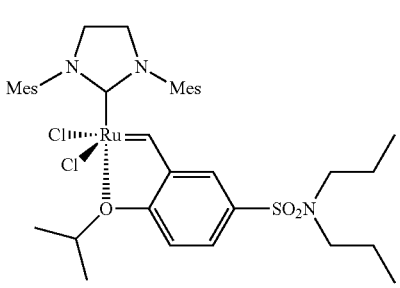

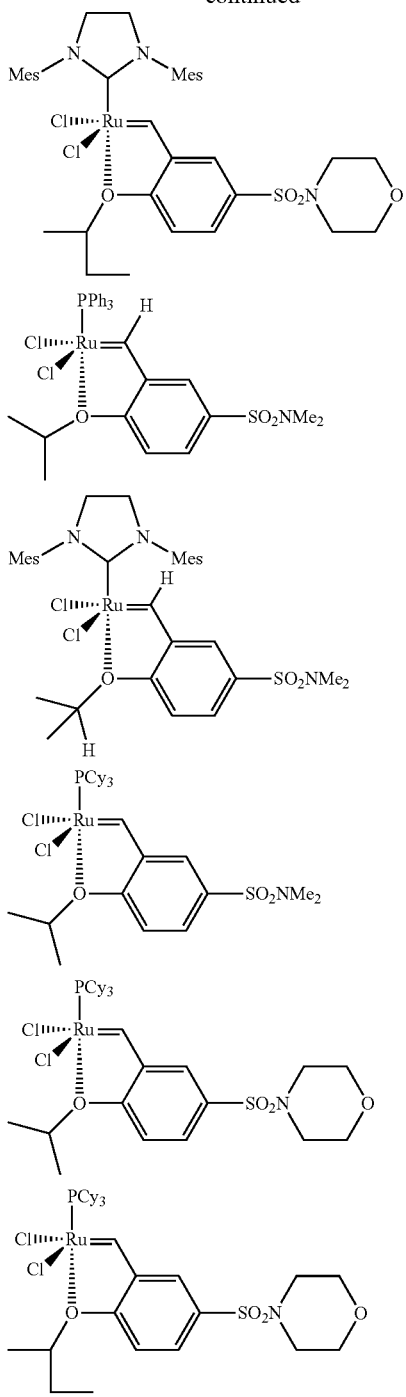
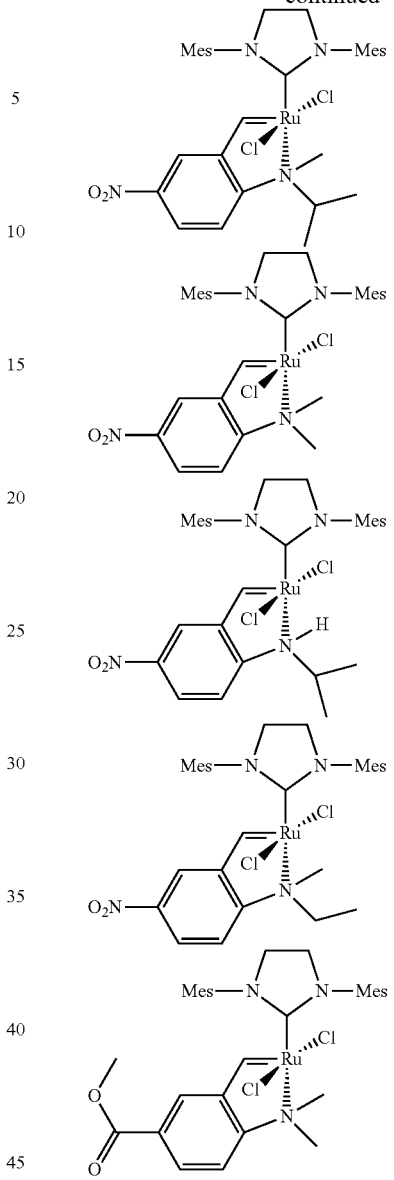
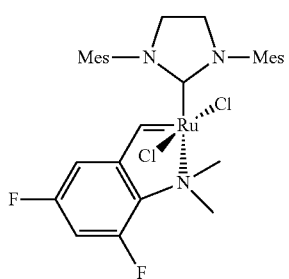
The above described catalysts of general formula (A3) with its preferred, more preferred, particularly preferred and most preferred embodiments may be prepared in accordance with the preparation methods described in EP-A-1 905 777.
In one embodiment of the present invention catalysts of general formula (A4) can be used coming under general formula (I) with n being 1.
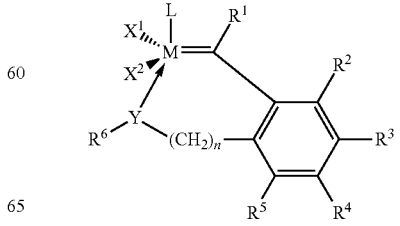
(A4)

wherein M, L, Y, $X^1$, $X^2$, $R^1$, $R^2$, $R^3$, $R^4$, $R^5$, $R^6$ and n have all general, preferred, more preferred and particularly preferred meanings as given for general formula (A).

General formula (A4) therefore covers catalysts according to general formula (A4-1) (with n=0) and (A4-2) (with n=1) which can both be used for preparing the catalyst compositions of the present invention

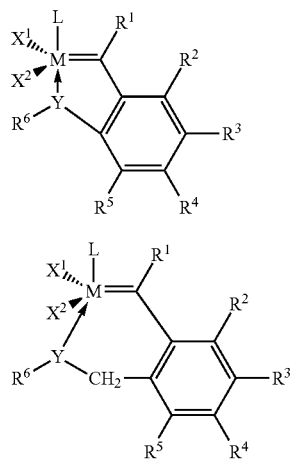

(A4-1)

(A4-2)

wherein M, L, Y, $X^1$, $X^2$, $R^1$, $R^2$, $R^3$, $R^4$, $R^5$, and $R^6$ have all general, preferred, more preferred and particularly preferred meanings as given for general formula (A).

In preferred catalysts to be used for preparing the catalyst compositions according to the invention M is Ruthenium and Y is oxygen or NH with L, $X^1$, $X^2$, $R^1$, $R^2$, $R^3$, $R^4$, $R^5$, $R^6$ and n having all general, preferred, more preferred and particularly preferred meanings as given for general formula (A).

Suitable catalysts falling under general formula (A4) and in particular under general formula (A4-2) have the following structures:

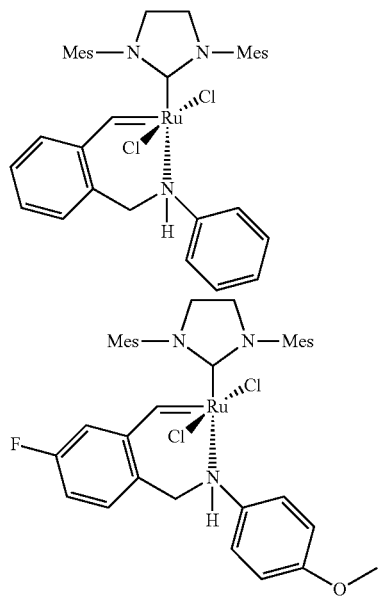

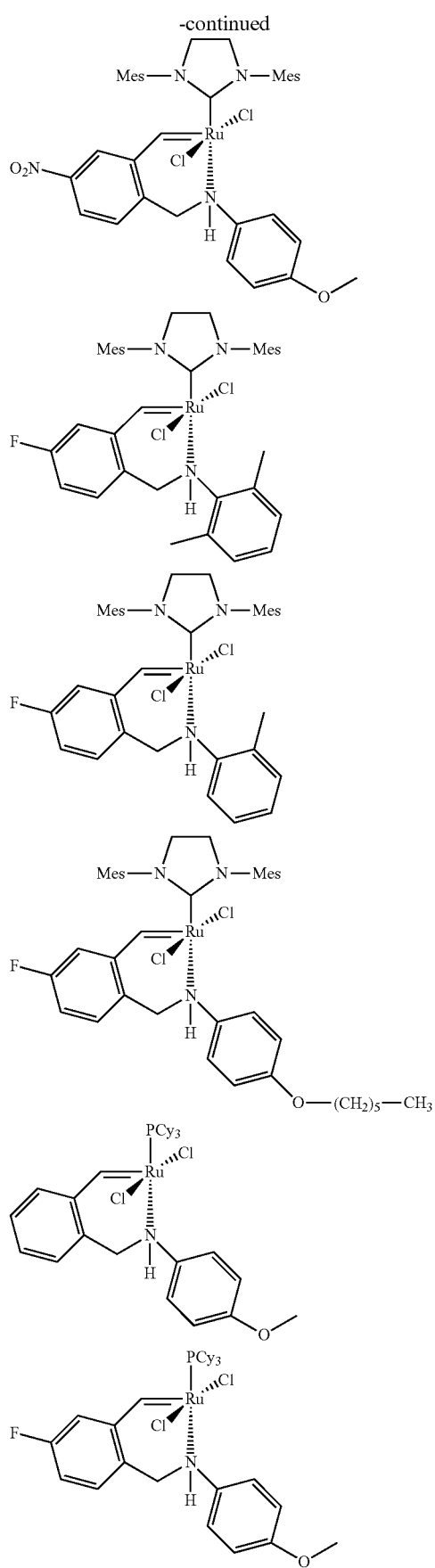

-continued
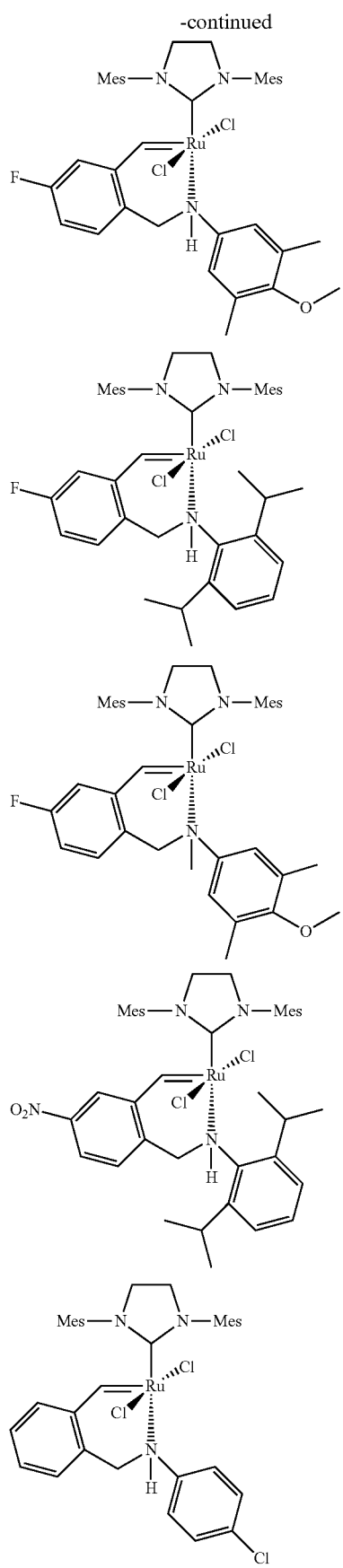
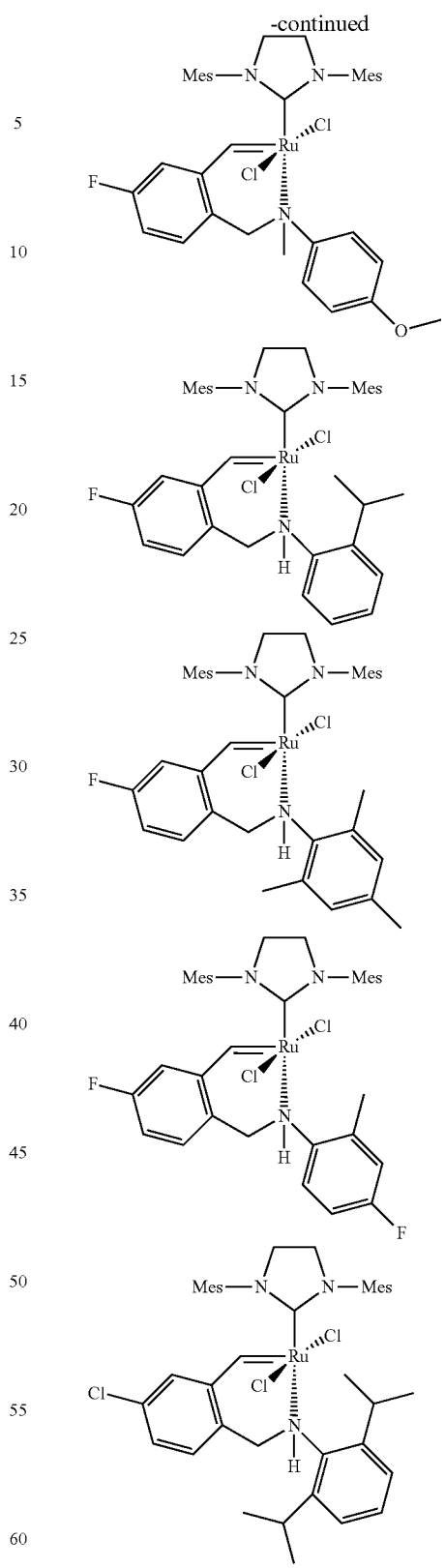
In a specific embodiment of the present invention catalysts of general formula (A4) may be used wherein
$R^6$ means either an aryl group, preferably phenyl group substituted in 2-position with $C_1$-$C_{10}$-alkoxy or —N(R)$_2$, with R being identical or different and representing hydrogen or straight chain or branched $C_1$-$C_6$ alkyl and
wherein M, L, Y, $X^1$, $X^1$, $R^1$, $R^2$, $R^3$, $R^4$, and $R^5$ have the same meanings as given for general formula (A4).

In such specific embodiment the substituent $R^6$ may then coordinate to the metal of the complex catalyst via the oxygen in the alkoxy group, or the nitrogen in the $N(R)_2$ substituent. Hence, such specific catalysts then have the general formula (A5)

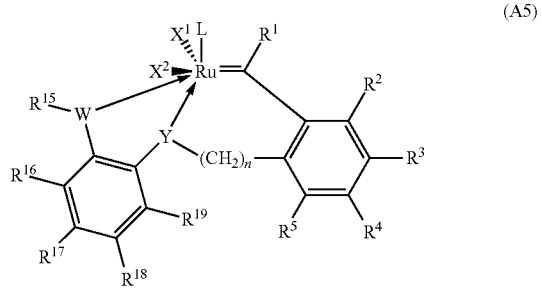

(A5)

wherein
Y is oxygen (O) or —NR with R representing hydrogen, alkyl, cycloalkyl, alkenyl, alkynyl, aryl or heteroaryl,
W is oxygen (O) or $NR^7$ with $R^7$ being hydrogen or straight chain or branched $C_1$-$C_{10}$ alkyl,
$R^{15}$ represents straight chain or branched alkyl,
$R^{16}$, $R^{17}$, $R^{18}$ and $R^{19}$ are identical or different and represent hydrogen, halogen, alkyl, cycloalkyl, alkoxy, alkenyl, alkynyl, aryl or heteroaryl, and
L, $R^1$, $R^2$, $R^3$, $R^4$, $R^5$ shall have the general, preferred and more preferred meanings given for general formula A.

General formula (A5) covers catalysts according to general formula (A5-1) (with n=0) and (A5-2) (with n=1) which can both be used for preparing the catalyst compositions of the present invention,

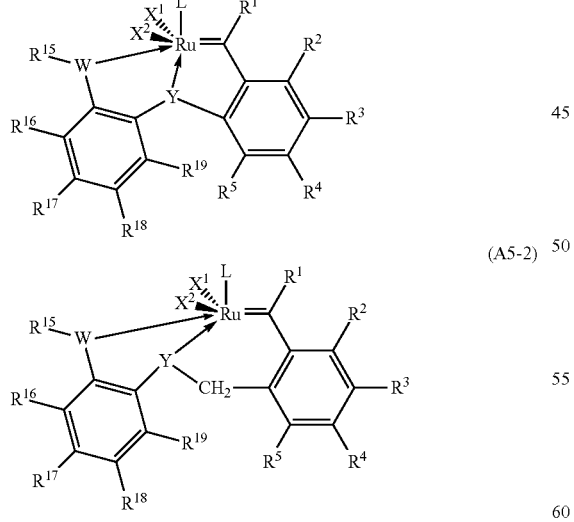

(A5-1)

(A5-2)

wherein L, Y, $X^1$, $X^2$, $R^1$, $R^2$, $R^3$, $R^4$, $R^5$, $R^{15}$, $R^{16}$, $R^{17}$, $R^{18}$ and $R^{19}$ have the same meanings as given for general formula (A5).

In preferred catalysts of general formula (A5) to be used for preparing the catalyst compositions according to the invention Y is oxygen (O) or —NR with R representing hydrogen, $C_1$-$C_{10}$ alkyl, $C_5$-$C_8$ cycloalkyl, $C_2$-$C_{20}$ alkenyl, $C_2$-$C_{20}$ alkynyl, $C_6$-$C_{24}$ aryl or $C_2$-$C_{20}$ heteroaryl,
W is oxygen (O) or —$NR^7$ with $R^7$ being hydrogen or straight chain or branched $C_1$-$C_4$ alkyl,
$R^{15}$ represents straight chain or branched $C_1$-$C_{10}$ alkyl
$R^{16}$, $R^{17}$, $R^{18}$ and $R^{19}$ are identical or different and represent hydrogen, halogen, straight chain or branched $C_1$-$C_{10}$ alkyl, $C_5$-$C_8$ cycloalkyl, straight chain or branched $C_1$-$C_{10}$ alkoxy, $C_2$-$C_{20}$ alkenyl, $C_2$-$C_{20}$ alkynyl, $C_6$-$C_{24}$ aryl or $C_2$-$C_{20}$ heteroaryl,
L, $R^1$, $R^2$, $R^3$, $R^4$, $R^5$ shall have the general, preferred and more preferred meanings given for general formula A, and
n being 0 or 1.

More preferably catalysts of general formula (A5) can be used wherein
Y is oxygen (O) or —NR with R representing hydrogen or $C_1$-$C_4$ alkyl,
W is oxygen (O) or —$NR^7$ with $R^7$ being hydrogen or straight chain or branched $C_1$-$C_4$ alkyl,
$R^{15}$ represents straight chain or branched $C_1$-$C_4$ alkyl,
$R^{16}$, $R^{17}$, $R^{18}$ and $R^{19}$ are identical or different and represent hydrogen, chloro, straight chain or branched $C_1$-$C_{10}$ alkyl, or straight chain or branched $C_1$-$C_{10}$ alkoxy and
n being 0 or 1.

Suitable catalysts falling under general formula (A5) have the following structures:

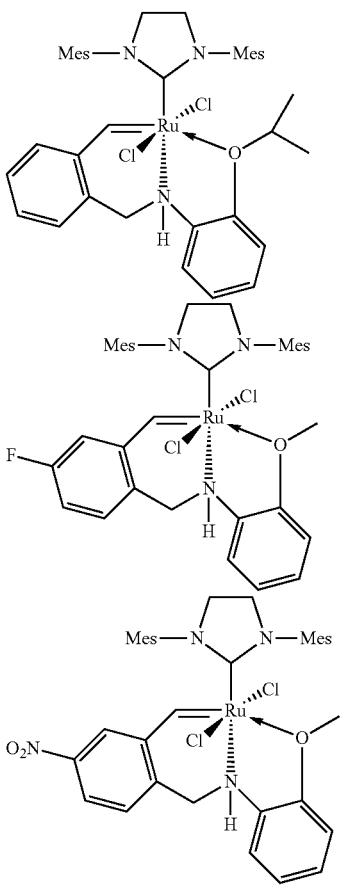

-continued
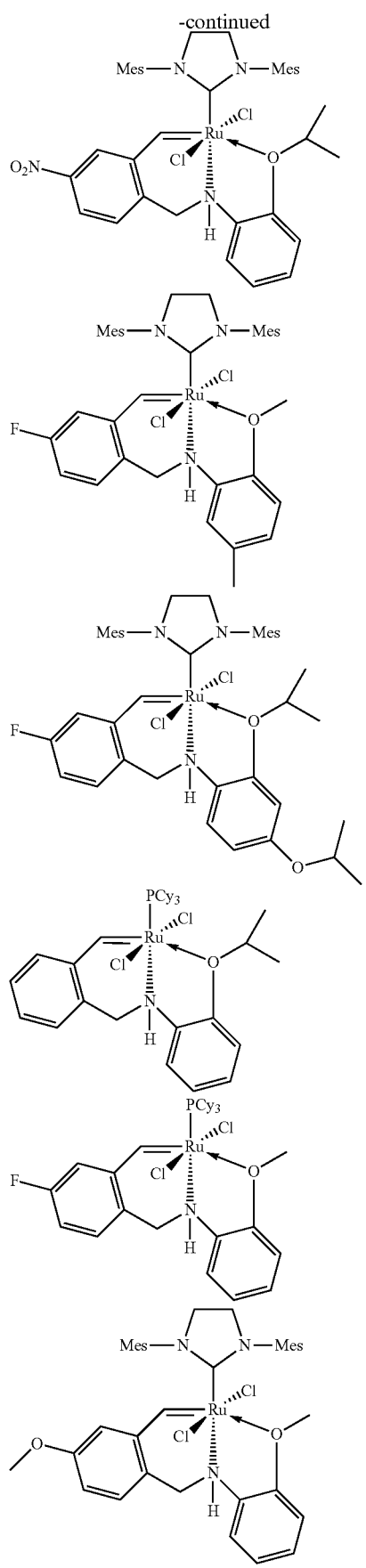
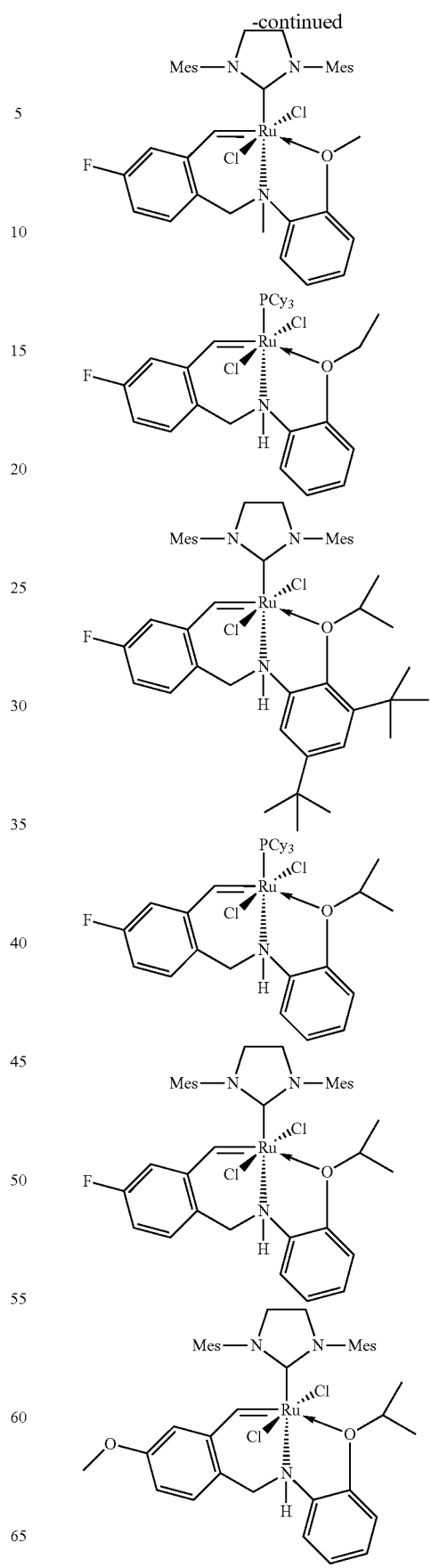

41
-continued
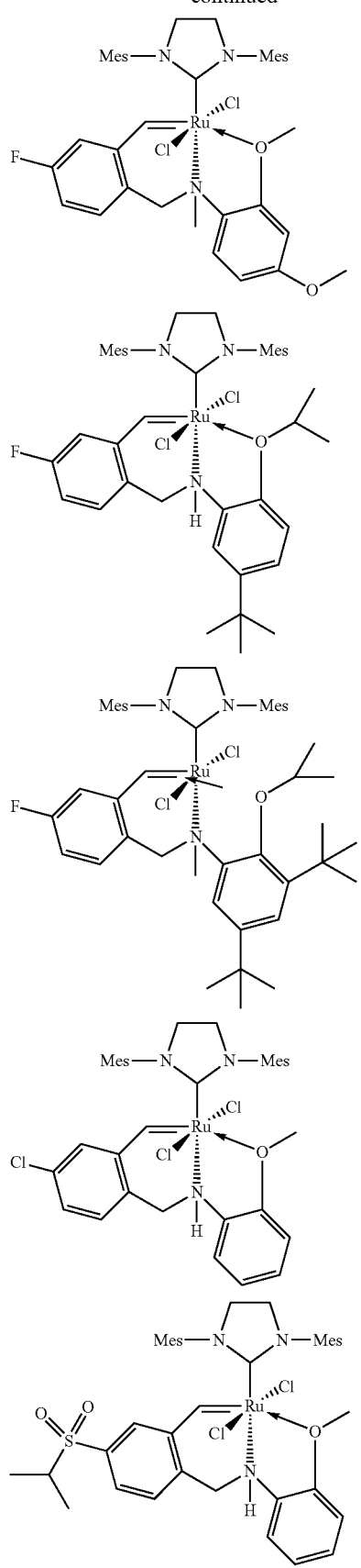
42
-continued
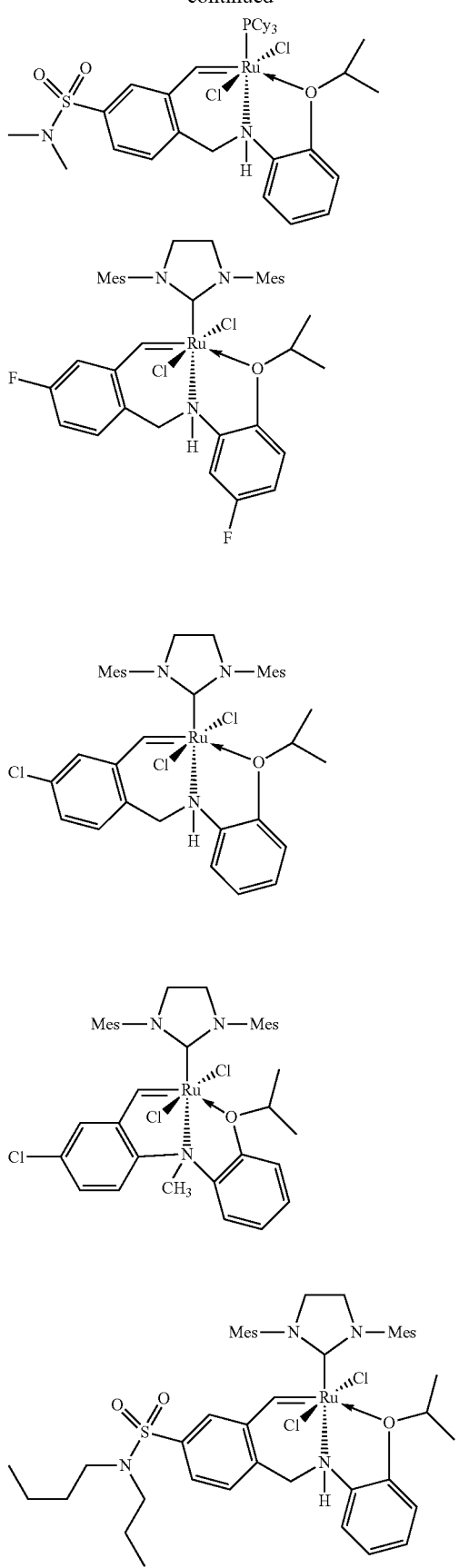

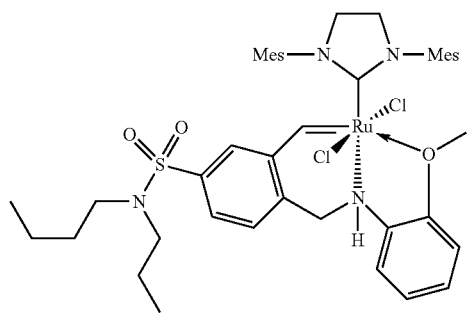
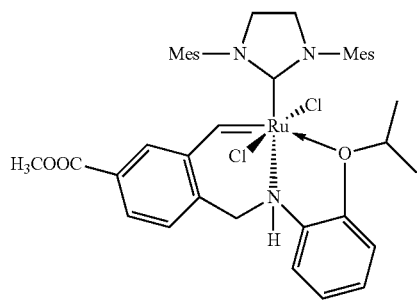
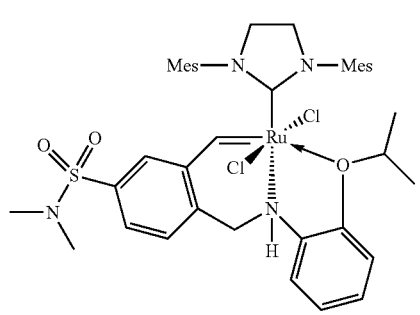
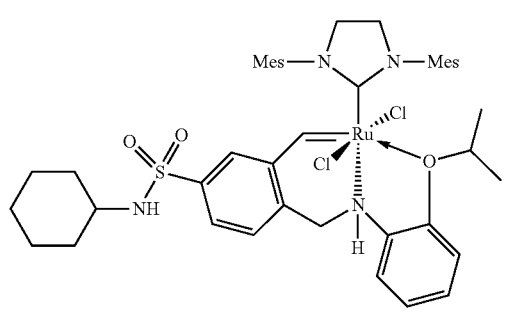
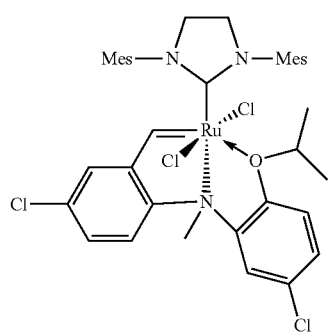

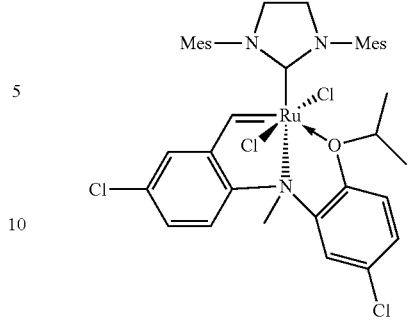
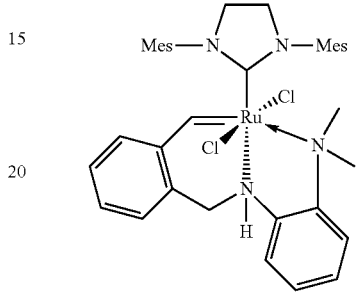

A further alternative embodiment provides a catalyst system according to the invention obtainable by using a catalyst of the general formula (A6)

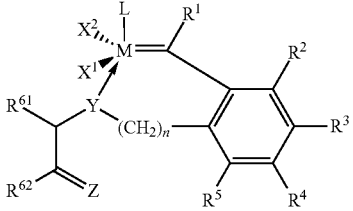

(A6)

where

M is ruthenium or osmium, preferably ruthenium,

Z is oxygen (O) or sulfur (S),

Y is oxygen (O), sulfur (S), N—$R^7$ or P—$R^7$, where $R^7$ has the meanings indicated below, $X^1$ and $X^2$ are identical or different ligands, $R^1$ is H, alkyl, alkenyl, alkynyl or aryl, $R^2$, $R^3$, $R^4$ and $R^5$ are identical or different and are each hydrogen, organic or inorganic substituents, $R^{61}$ is H, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl, each of which may optionally be substituted by one or more alkyl, halogen, alkoxy, aryl or heteroaryl substituents, $R^{62}$ is alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl, each of which may optionally be substituted by one or more alkyl, halogen, alkoxy, aryl or heteroaryl substituents, or where in the alternative $R^{61}$ and $R^{62}$ may form a cyclic structure together with the two adjacent carbon atoms to which they are bound, L is a ligand, and R⁷ is alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl which may each be optionally substituted by one or more alkyl, halogen, alkoxy, aryl or heteroaryl substituents, and n is 0 or 1.

The catalysts of the general formula (A6) are known in principle. Representatives of this class of compounds are the catalysts described by Arlt et al. in WO-A1-2008/034552 and by Zhan in WO-A-2011/079799. The catalysts are commercially available or can be prepared as described in the references cited.

General formula (A6) covers catalysts according to general formula (A6-1) (with n=0) and (A6-2) (with n=1) which can both be used for preparing the catalyst compositions of the present invention,

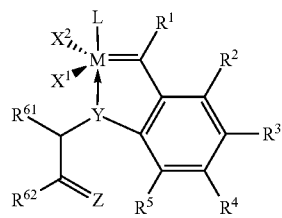

(A6-1)

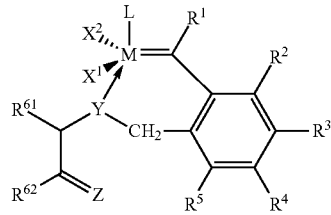

(A6-2)

wherein L, M, $X^1$, $X^2$, $R^1$, $R^2$, $R^3$, $R^4$, $R^5$, Y, $R^{61}$ and $R^{62}$ have the same meanings as given for general formula (A6).

In the catalysts of the general formula (A6) as well as (A6-1) and (A6-2) L is a ligand, usually a ligand having an electron donor function. L can have all meanings as described above relating to general formula (A). It can in particular represent a $P(X^1)_3$ ligand, where $X^3$ are each, independently of one another, $C_1$-$C_6$-alkyl, $C_3$-$C_8$-cycloalkyl or aryl or L is a substituted or unsubstituted imidazoline or imidazolidine ligand as defined in general formulae (IIa), (IIb), and (IIIa) to (IIIn) further above with regard to the catalyst of the general formula (A).

Alkyl in general formulae (A6) as well as (A6-1) and (A6-2) preferably means $C_1$-$C_6$-Alkyl which is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl or n-hexyl.

Cycloalkyl in general formulae (A6) as well as (A6-1) and (A6-2) preferably means $C_3$-$C_8$-Cycloalkyl which encompasses cyclopropyl, cyclobutyl, cyclopentyl, cyclohexyl, cycloheptyl and cyclooctyl.

Aryl in general formulae (A6) as well as (A6-1) and (A6-2) encompasses an aromatic radical having from 6 to 24 skeletal carbon atoms. Preferred monocyclic, bicyclic or tricyclic carbocyclic aromatic radicals having from 6 to 10 skeletal carbon atoms are, for example, phenyl, biphenyl, naphthyl, phenanthrenyl and anthracenyl.

In the catalysts of the general formula (A6) as well as (A6-1) and (A6-2) $X^1$ and $X^2$ are identical or different ligands and can be, for example, hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl.

In the catalysts of the general formula (A6) as well as (A6-1) and (A6-2) the abovementioned ligands $X^1$ and $X^2$ can also be substituted by one or more further substituents, e.g., by halogen, preferably fluorine, $C_1$-$C_{10}$-alkyl, $C_1$-$C_{10}$-alkoxy or $C_6$-$C_{24}$-aryl, where these substituents may optionally also in turn be substituted by one or more substituents selected from the group consisting of halogen, preferably fluorine, $C_1$-$C_5$-alkyl, $C_1$-$C_5$-alkoxy and phenyl.

In a preferred embodiment of catalyst (A6) as well as (A6-1) and (A6-2) $X^1$ and $X^2$ are identical or different and are each halogen, in particular fluorine, chlorine or bromine, benzoate, $C_1$-$C_5$-carboxylate, $C_1$-$C_5$-alkyl, phenoxy, $C_1$-$C_5$-alkoxy, $C_1$-$C_5$-alkylthiol, $C_5$-$C_{24}$-arylthiol, $C_6$-$C_{24}$-aryl or $C_1$-$C_5$-alkylsulphonate.

In a particularly preferred embodiment of catalyst (A6) as well as (A6-1) and (A6-2) $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

In the catalysts of general formula (A6) as well as (A6-1) and (A6-2) $R^{61}$ and $R^{62}$ are identical or different and represent alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl, each of which may optionally be substituted by one or more alkyl, halogen, alkoxy, aryl or heteroaryl substituents, however, $R^{61}$ may also represent hydrogen in the alternative.

In the preferred catalyst of general formula (A6) $R^{61}$ and $R^{62}$ are identical or different and preferably represent $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulfonyl or $C_1$-$C_{20}$-alkylsulfinyl, each of which may optionally be substituted by one or more alkyl, alkoxy, aryl or heteroaryl substituents, however, $R^{61}$ may also represent hydrogen in the alternative, or wherein or where in the alternative $R^{61}$ and $R^{62}$ may form a cyclic structure together with the two adjacent carbon atoms to which they are bound.

More preferably $R^{61}$ is hydrogen and $R^{62}$ is $C_3$-$C_{20}$-cycloalkyl, $C_6$-$C_{24}$-aryl or straight-chain or branched $C_1$-$C_{12}$-alkyl, with the latter optionally being able to be interrupted by one or more double or triple bonds or one or more heteroatoms, preferably oxygen or nitrogen, or where in the alternative $R^{61}$ and $R^{62}$ may form a cyclic structure together with the two adjacent carbon atoms to which they are bound. In such preferred definition $C_3$-$C_{20}$-cycloalkyl then encompasses, for example, cyclopropyl, cyclobutyl, cyclopentyl, cyclohexyl, cycloheptyl and cyclooctyl, $C_1$-$C_{12}$-alkyl can be, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, n-heptyl, n-octyl, n-decyl or n-dodecyl and $C_6$-$C_{24}$-aryl radical is an aromatic radical having from 6 to 24 skeletal carbon atoms, more preferably a monocyclic, bicyclic or tricyclic carbocyclic aromatic radical having from 6 to 10 skeletal carbon atoms, most preferably phenyl, biphenyl, naphthyl, phenanthrenyl or anthracenyl.

In the general formula (A6) $R^1$ is hydrogen or an alkyl, alkenyl, alkynyl or aryl radical. $R^1$ is preferably hydrogen or a $C_1$-$C_{30}$-alkyl radical, a $C_2$-$C_{20}$-alkenyl radical, a $C_2$-$C_{20}$-alkynyl radical or a $C_6$-$C_{24}$-aryl radical. $R^1$ is particularly preferably hydrogen.

In the catalyst of general formula (A6) $R^2$, $R^3$, $R^4$ and $R^5$ are identical or different and can be H, organic or inorganic substituents. In a preferred embodiment, $R^2$, $R^3$, $R^4$, $R^5$ are identical or different and are each H, halogen, nitro, $CF_3$, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsuiphonyl or alkylsulphinyl, each of which may optionally be substituted by one or more alkyl, alkoxy, halogen, aryl or heteroaryl substituents. More preferably $R^2$, $R^3$, $R^4$, $R^5$ are identical or different and are H, halogen, preferably chlorine or bromine, nitro, $CF_3$, $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl, each of which may optionally be substituted by one or more $C_1$-$C_{30}$-alkyl, $C_1$-$C_{20}$-alkoxy, halogen, $C_6$-$C_{24}$-aryl or heteroaryl substituents. In a particularly preferred embodiment, $R^2$, $R^3$, $R^4$, $R^5$ are identical or different and are each nitro, a straight-chain or branched $C_1$-$C_{12}$-alkyl or $C_6$-$C_{20}$-cycloalkyl radical, a straight-chain or branched $C_1$-$C_{20}$-alkoxy radical or a $C_6$-$C_{24}$-aryl radical, most preferably phenyl or naphthyl. The $C_1$-$C_{12}$-alkyl and $C_1$-$C_{20}$-alkoxy groups may optionally be interrupted by one or more double or triple bonds or one or more heteroatoms, preferably oxygen or nitrogen.

Furthermore, two or more of $R^2$, $R^3$, $R^4$ or $R^5$ can be bridged via aliphatic or aromatic structures. For example, $R^3$ and $R^4$ can, with inclusion of the carbon atoms to which they are bound in the phenyl ring of the formula (Q), form a fused-on phenyl ring so that overall a naphthyl structure results.

Particular preference is given to catalysts of the general formula (A6) in which
M is ruthenium,
Y is oxygen (O),
Z is oxygen (O),
$X^1$ and $X^2$ are both halogen, in particular, both chlorine,
$R^1$ is hydrogen,
$R^2$, $R^3$, $R^4$, $R^5$ have the general, preferred and more preferred meanings given for the general formula (A6),
$R^{61}$, $R^{61}$ have the general, preferred and more preferred meanings given for the general formula (A6) and
L has the general, preferred and more preferred meanings given for the general formula (A6).

Very particular preference is given to catalysts of the general formula (A6) in which
M is ruthenium,
Y is oxygen (O),
Z is oxygen (O),
$X^1$ and $X^2$ are both chlorine,
$R^1$ is hydrogen,
$R^2$, $R^3$, $R^4$, $R^5$ are all hydrogen,
$R^{61}$ is methyl,
$R^{62}$ is methyl and
L is a substituted or unsubstituted imidazoline or imidazolidine ligand of general formulae (IIa), (IIb), (IIIa) to (IIIu) as defined for general formula (A)

A very particularly preferred catalyst which comes under the general structural formula (A6) has the following structure and is also referred to as "Arlt catalyst".

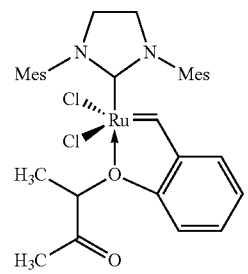

Further suitable catalysts which come under the general formula (A6) have the formulae depicted below where Mes is in each case a 2,4,6-trimethylphenyl. Even in case this is not shown in the below formulae the double bonded oxygen may also coordinate (back-bite) to the central metal of the complex catalyst

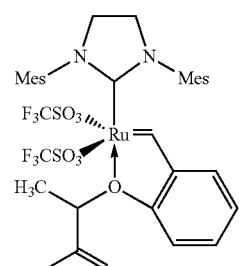 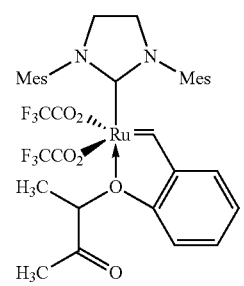

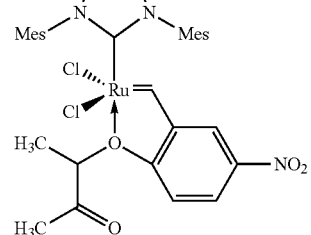

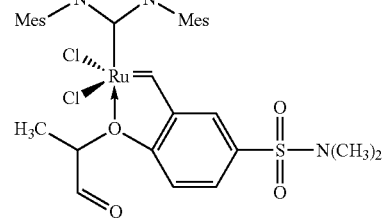

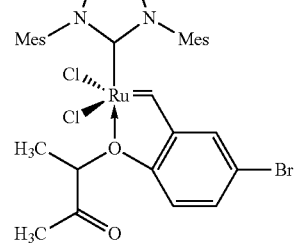

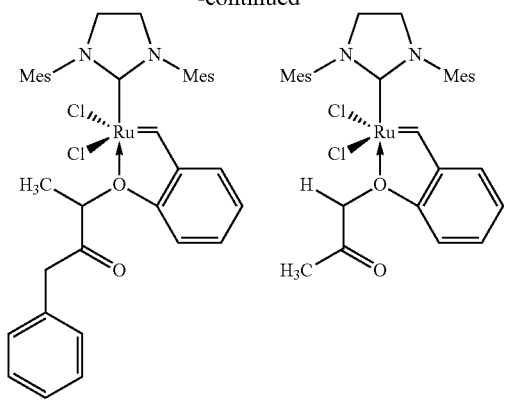
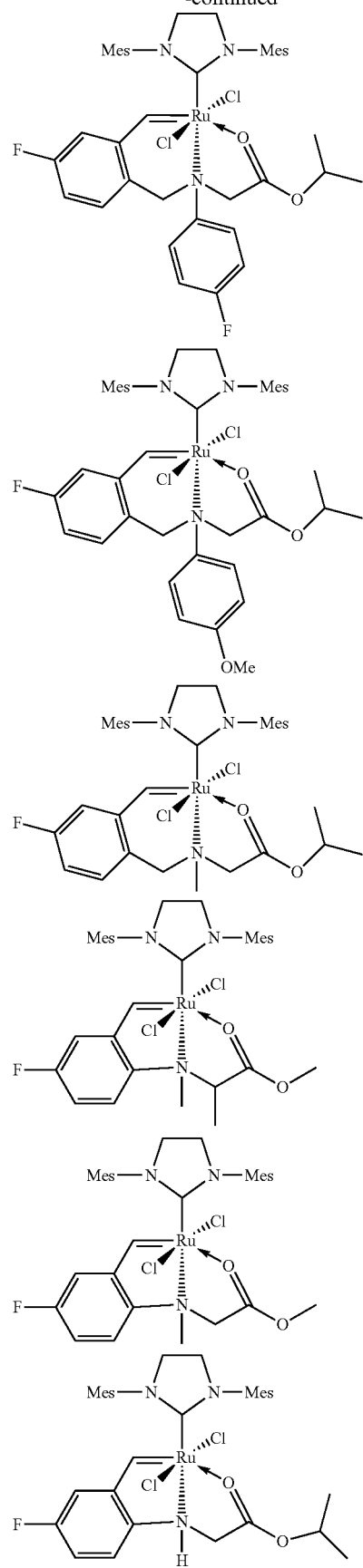

-continued

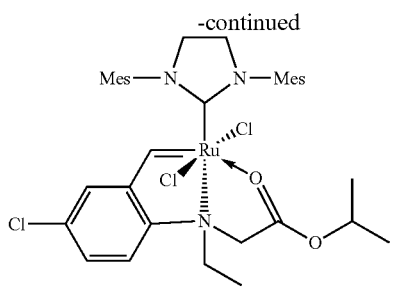

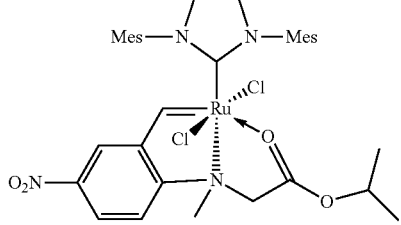

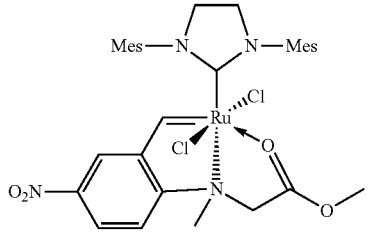

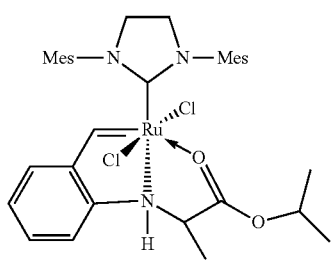

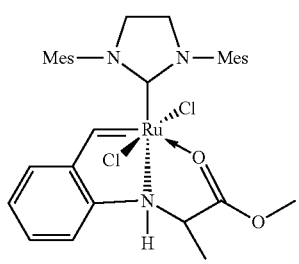

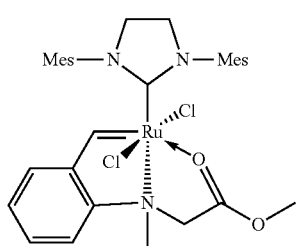

In a further embodiment catalysts of general formula (A7) can be used to prepare the novel catalyst compositions

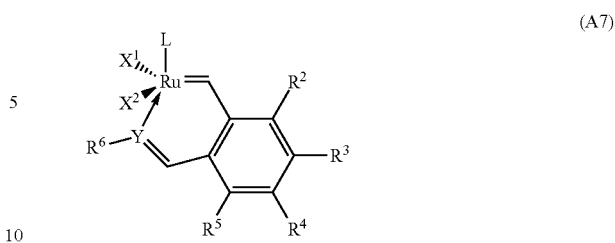

(A7)

wherein $X^1$ and $X^1$ are identical or different and shall mean hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthiol, $C_6$-$C_{24}$-arylthiol, $C_1$-$C_{20}$-alkylsulfonyl or $C_1$-$C_{20}$-alkylsulfinyl, L is an electron donating ligand, which can be linked or not linked with $X^1$ to form a cyclic structure, Y is NR or PR, preferably NR, $R^3$ is chloro, fluoro, bromo, —C(=O)R, —C(=O)OR, —OC(=O)R, —C(=O)N(R)$_2$, —C(=S)R, —C(=S)SR, —C(=S)OR, —C(=S)N(R)$_2$, —S(=O)$_2$N(R)$_2$, —S(=O)$_2$R, or —S(=O)R, $R^4$ is H, halogen, nitro, cyano, $C_1$-$C_{20}$ alkyl, $C_1$-$C_{20}$ alkoxy, $C_1$-$C_{20}$ alkylthio, —Si(R)$_3$, —O—Si(R)$_3$, $C_6$-$C_{20}$ aryl, $C_6$-$C_{20}$ aryloxy, $C_2$-$C_{20}$ heterocyclic, $C_2$-$C_{20}$ heteroaryl, —C(O)R, —C(=O)OR, —C(=O)N(R)$_2$, —C(=S)R, —C(=S)SR, —C(=S)OR, —C(=S)N(R)$_2$, —S(=O)$_2$N(R)$_2$, —S(=O)$_2$R or —S(=O)R, $R^2$ and $R^5$ are each H, bromo (Br), iodo (I), $C_1$-$C_{20}$ alkyl, $C_1$-$C_{20}$ alkoxy, $C_1$-$C_{20}$ alkylthio, —Si(R)$_3$, —O—Si(R)$_3$, $C_6$-$C_{20}$ aryloxy, $C_6$-$C_{20}$ aryl, $C_2$-$C_{20}$ heterocyclic, $C_2$-$C_{20}$ heteroaryl, —C(=O)OR, —C(=O)N(R)$_2$, or —SO$_2$N(R)$_2$, $R^6$ is H, $C_1$-$C_{20}$ alkyl, $C_6$-$C_{20}$ aryl, $C_2$-$C_{20}$ heterocyclic, $C_2$-$C_{20}$ heteroaryl, —C(=O)R, —C(=O)OR, —C(=O)N(R)$_2$, —SO$_2$N(R)$_2$, —N(SO$_2$—R)$_2$, —S(=O)R, or —S(=O)$_2$R, and wherein in all above occurrences in formula (A7)

R is identical or different and shall mean H, $C_1$-$C_{20}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_2$-$C_{24}$-heteroaryl, or if two substituents R are bound to the same atom, such two substituents R may also form a saturated or unsaturated cyclic structure together with the atoms to which they are bound.

The following catalysts fall under general formula (A7) and can be used to prepare the novel catalyst compositions:

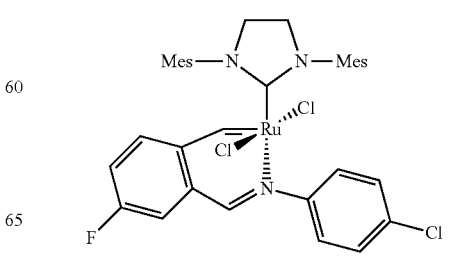

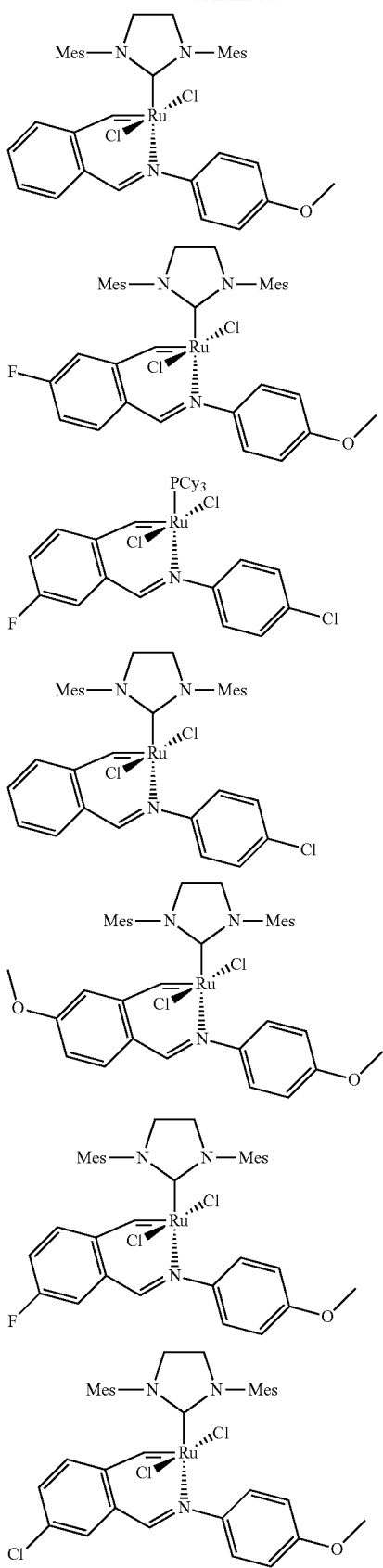

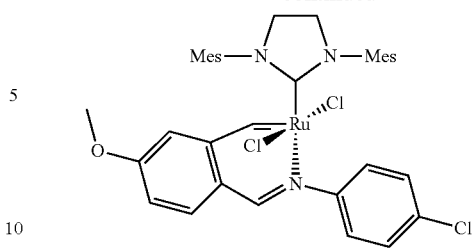

In a further alternative embodiment all catalysts according to general formula (A) can be used in immobilized form. The immobilization favourably occurs via a chemical bond of the complex catalyst to the surface of a support material. Suited are e.g. complex catalysts having the general formulae (support-1), (support-2), (support-3), or (support-4) as depicted below, wherein M, Y, L, $X^1$, $X^2$, $R^1$, $R^2$, $R^3$, $R^4$, $R^5$, $R^6$, n and E may have all general, preferred, more preferred, particularly preferred and most preferred meanings listed above in this application for general formula (A) and wherein "supp" stands for the support material. Preferably the support material represents a macromolecular material, or silica gels. As macromolecular material synthetic polymers or resins may be used, with polyethylene glycol, polystyrenes or cross-linked polystyrenes (e.g. poly(styrene-divinylbenzene) copolymers (PS-DVB)) being even more preferred. Such support material comprises functional groups on its surface which are able to form covalent bonds to one of the ligands or substituents of the complex catalyst, like e.g. to the ligand L or $X^1$ or to the substituents $R^3$ or $R^4$ as shown in the below depicted formulae.

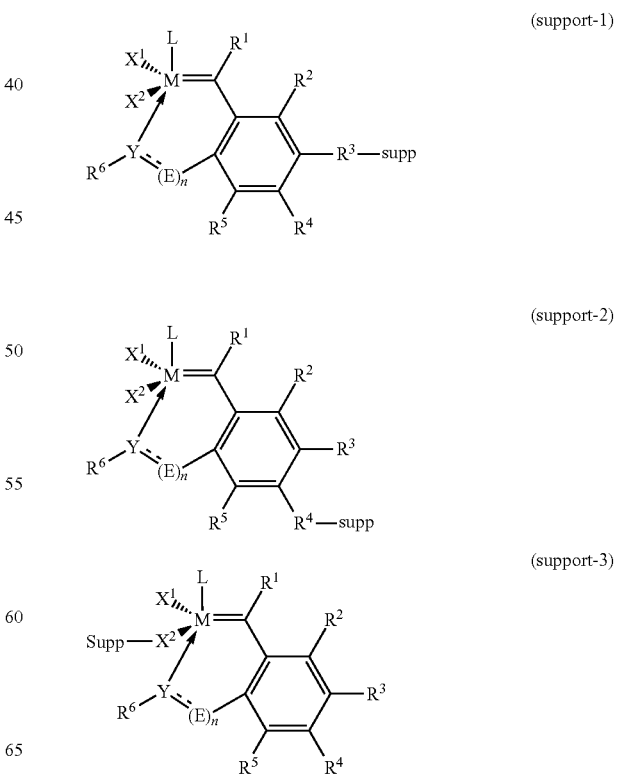

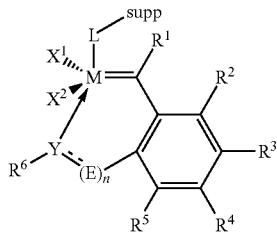
(support-4)

In analogy the preferred catalysts of general formulae (A1), (A2), (A3), (A4), (A5), (A6) and (A7) can also be used in immobilized form, too.

In the immobilized catalysts of general formulae formulae (support-1), (support-2), (support-3) or (support-4) "supp" stands more preferably for a polymeric support, a resin, polyethyleneglycole, or silica gels having one or more functional groups "$X^3$" on their surface which are able to form a covalent bond to one of the ligands, like e.g. the L, $R^1$ or $X^1$ as shown in the above formulae.

Suitable functional groups "$X^3$" on the surface are hydroxyl, amino, thiol, carboxyl, $C_1$-$C_{20}$ alkoxy, $C_1$-$C_{20}$ alkylthio, —Si(R)$_3$, —O—Si(R)$_3$, $C_6$-$C_{14}$ aryloxy, $C_2$-$C_{14}$ heterocyclic, —C(=O)R, —C(=O)OR, —C(=O)N(R)$_2$, —SO$_2$N(R)$_2$, —S(=O)$_2$R, or —S(=O)R wherein in all above occurrences of R in $X^3$ is identical or different and shall mean H, $C_1$-$C_6$-alkyl, $C_5$-$C_6$-cycloalkyl, $C_2$-$C_6$-alkenyl, $C_2$-$C_6$-alkynyl, phenyl, imidazolyl, triazolyl, or pyridinyl moieties.

Polystyrene or cross-linked polystyrene is the preferred support material, even more preferably with hydroxyl groups on the surface to allow an easy coupling to the catalyst.

In a specific embodiment a catalyst can be used having the following formula

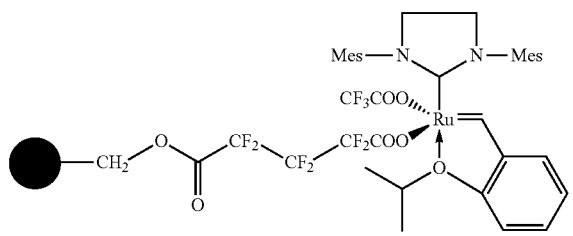

where the symbol ● represents a support, preferably a poly(styrene-divinylbenzene) copolymer. Catalysts of such type are known in principle from Chem. Eur. J. 2004 10, 777-784 and can be obtained by the preparative methods described there.

Step a) of the Process According to the Present Invention:

The preparation of the catalyst composition in step a) of the present process is performed at a temperature in the range of from 75° C. to 200° C., preferably in the range of from 80° C. to 200° C., and more preferably in the range of from 80° C. to 160° C. and with an appropriate hydrogen pressure ranging from 0.5 MPa to 35 MPa and preferably from 3 MPa to 11 MPa. The suitable time for the preparation of the catalyst composition ranges from 1 minute to 24 hours, preferably from 4 hours to 20 hours.

The preparation of the catalyst composition is typically carried out in a suitable solvent which does not deactivate the catalyst used and also does not have an adverse effect on the reaction in any other way. Preferably an organic solvent is used, more preferably dichloromethane, benzene, toluene, methyl ethyl ketone, acetone, tetrahydrofuran, tetrahydropyran, dioxane, cyclohexane or chlorobenzene. The particularly preferred solvents are chlorobenzene and methyl ethyl ketone.

The formation of the catalyst composition shall be performed in the absence of the nitrile rubber which only in the second step will be brought into contact with the catalyst composition and then hydrogenated.

The formation of the catalyst composition can be performed in any appropriate equipment suited for applying the respective hydrogen pressure. In particular autoclaves are used. After formation of the catalyst composition the reaction mixture containing the catalyst composition in the solvent is typically cooled to an ambient temperature, preferably to a temperature in the range of from 20° C. and 25° C. and the hydrogen released.

Step b) of the Process According to the Present Invention:

Thereafter the hydrogenation of the nitrile rubber is carried out by bringing the nitrile rubber into contact with hydrogen and the catalyst composition formed in step a). Typically the nitrile rubber is solved in a solvent, degassed and added to the autoclave containing the catalyst composition. Then hydrogen is added to the reaction system. In such step b) typically the same solvents are used as defined above for the performance of step a).

The hydrogenation is typically performed at a temperature in the range of from 60° C. to 200° C., preferably from 80° C. to 180° C., most preferably from 100° C. to 160° C. and at a hydrogen pressure in the range of 0.5 MPa to 35 MPa, more preferably of 3.0 MPa to 10 MPa.

Preferably, the hydrogenation time of the nitrile rubber is from 10 minutes to 24 hours, preferably from 15 minutes to 20 hours, more preferably from 30 minutes to 14 hours, even more preferably from 1 hour to 12 hours.

The amount of the catalyst composition which is present in the hydrogenation step b) based on the nitrile rubber can be chosen in a broad range, preferably so that from 1 to 1000 ppm of ruthenium or osmium, preferably from 2 to 500 ppm, in particular from 5 to 250 ppm, are present based on the nitrile rubber used.

One major advantage of the process according to the present invention resides in the high activity of the catalyst composition, so that the catalyst residue in the final HNBR products are low enough to make the catalyst metal removal or recycle step alleviated or even unnecessary. However, if desired, the catalyst used for hydrogenation may be removed, e.g. by using ion-exchange resins as described in EP-A-2 072 532 A1 and EP-A-2 072 533 A1. The reaction mixture obtained after the hydrogenation reaction can be taken and treated with such ion-exchange resin at e.g. 100° C. for 48 hours under nitrogen and can then be precipitated in cold methanol Nitrile Rubber:

The nitrile rubber used in the process of the present invention is a copolymer or terpolymer of at least one α,β-unsaturated nitrile, at least one conjugated diene and, if desired, one or more further copolymerizable monomers.

The conjugated diene can be of any nature. Preference is given to using ($C_4$-$C_6$) conjugated dienes. Particular preference is given to 1,3-butadiene, isoprene, 2,3-dimethylbutadiene, piperylene or mixtures thereof. Very particular preference is given to 1,3-butadiene and isoprene or mixtures thereof. Especial preference is given to 1,3-butadiene.

As α,β-unsaturated nitrile, it is possible to use any known α,β-unsaturated nitrile, preferably a ($C_3$-$C_5$) α,β-unsaturated nitrile such as acrylonitrile, methacrylonitrile, ethacrylonitrile or mixtures thereof. Particular preference is given to acrylonitrile.

A particularly preferred nitrile rubber used in the process of this invention is thus a copolymer having repeating units derived from acrylonitrile and 1,3-butadiene.

Apart from the conjugated diene and the α,β-unsaturated nitrile, the hydrogenated nitrile rubber may comprise repeating units of one or more further copolymerizable monomers known in the art, e.g. α,β-unsaturated (preferably mono-unsaturated) monocarboxylic acids, their esters and amides, α,β-unsaturated (preferably mono-unsaturated) dicarboxylic acids, their mono-oder diesters, as well as the respective anhydrides or amides of said α,β-unsaturated dicarboxylic acids.

As α,β-unsaturated monocarboxylic acids acrylic acid and methacrylic acid are preferably used.

Esters of α,β-unsaturated monocarboxylic acids may also be used, in particular alkyl esters, alkoxyalkyl esters, aryl esters, cycloalkylesters, cyanoalkyl esters, hydroxyalkyl esters, and fluoroalkyl esters.

As alkyl esters $C_1$-$C_{18}$ alkyl esters of the α,β-unsaturated monocarboxylic acids are preferably used, more preferably $C_1$-$C_{18}$ alkyl esters of acrylic acid or methacrylic acid, such as methylacrylate, ethylacrylate, propylacrylate, n-butylacrylate, tert.-butylacrylate, 2-ethyl-hexylacrylate, n-dodecylacrylate, methylmethacrylate, ethylmethacrylate, propylmethacrylate, n-butylmethacrylate, tert.-butylmethacrylate and 2-ethylhexyl-methacrylate.

As alkoxyalkyl esters $C_2$-$C_{18}$ alkoxyalkyl esters of α,β-unsaturated monocarboxylic acids are preferably used, more preferably alkoxyalkylester of acrylic acid or methacrylic acid such as methoxy methyl(meth)acrylate, methoxy ethyl(meth)acrylate, ethoxyethyl(meth)acrylate and methoxyethyl(meth)acrylate.

It is also possible to use aryl esters, preferably $C_6$-$C_{14}$-aryl-, more preferably $C_6$-$C_{10}$-aryl esters and most preferably the aforementioned aryl esters of acrylates and methacrylates.

In another embodiment cycloalkyl eaters, preferably $C_5$-$C_{12}$-, more preferably $C_6$-$C_{12}$-cyclo-alkyl and most preferably the aforementioned cycloalkyl acrylates and methacrylates are used.

It is also possible to use cyanoalkyl esters, in particular cyanoalkyl acrylates or cyanoalkyl methacrylates, with 2 to 12 C atoms in the cyanoalkyl group, preferably α-cyanoethyl acrylate, β-cyanoethyl acrylate or cyanobutyl methacrylate.

In another embodiment hydroxyalkyl esters are used, in particular hydroxyalkyl acrylates and hydroxyalkyl methacrylates with 1 to 12 C-atoms in the hydroxylalkyl group, preferably 2-hydroxyethyl acrylate, 2-hydroxyethyl methacrylate or 3-hydroxypropyl acrylate.

It is also possible to use fluorobenzyl esters, in particular fluorobenzyl acrylates or fluorobenzyl methacrylates, preferably trifluoroethyl acrylate and tetrafluoropropyl methacrylate. Substituted amino group containing acrylates and methacrylates may also be used like dimethylaminomethyl acrylate and diethylaminoethylacrylate.

Various other esters of the α,β-unsaturated carboxylic acids may also be used, like e.g. poly-ethyleneglycol(meth)acrylate, polypropyleneglycole(meth)acrylate, glycidyl (meth)acrylate, epoxy(meth)acrylate, N-(2-hydroxyethyl) acrylamide, N-(2-hydroxymethyl)acrylamide or urethane (meth)acrylate.

It is also possible to use mixture of all aforementioned esters of α,β-unsaturated carboxylic acids.

Furthon α,β-unsaturated dicarboxylic acids may be used, preferably maleic acid, fumaric acid, crotonic acid, itaconic acid, citraconic acid and mesaconic acid.

In another embodiment anhydrides of α,β-unsaturated dicarboxylitec acids are used, preferably maleic anhydride, itaconic anhydride, itaconic anhydride, citraconic anhydride and mesaconic anhydride.

In a further embodiment mono- or diesters of α,β-unsaturated dicarboxylic acids can be used. Suitable alkyl esters are e.g. $C_1$-$C_{10}$-alkyl, preferably ethyl-, n-propyl-, iso-propyl, n-butyl-, tert.-butyl, n-pentyl-oder n-hexyl mono- or diesters. Suitable alkoxyalkyl esters are e.g. $C_1$-$C_{12}$ alkoxyalkyl-, preferably $C_3$-$C_8$-alkoxyalkyl mono- or diesters. Suitable hydroxyalkyl esters are e.g. $C_1$-$C_{12}$ hydroxyalkyl-, preferably $C_2$-$C_8$-hydroxyalkyl mono- or diesters. Suitable cycloalkyl esters are e.g. $C_5$-$C_{12}$-cycloalkyl-, preferably $C_6$-$C_{12}$-cycloalkyl mono- or diesters. Suitable alkylcycloalkyl esters are e.g. $C_6$-$C_{12}$-alkylcycloalkyl-, preferably $C_7$-$C_{10}$-alkylcycloalkyl mono- or diesters. Suitable aryl esters are e.g. $C_6$-$C_{14}$-aryl, preferably $C_6$-$C_{10}$-aryl mono- or diesters.

Explicit examples of the α,β-ethylenically unsaturated dicarboxylic acid monoester monomers include
  maleic acid monoalkyl esters, preferably monomethyl maleate, monoethyl maleate, monopropyl maleate, and mono n-butyl maleate;
  maleic acid monocycloalkyl esters, preferably monocyclopentyl maleate, monocyclohexyl maleate, and monocycloheptyl maleate;
  maleic acid monoalkylcycloalkyl esters, preferably monomethylcyclopentyl maleate, and monoethylcyclohexyl maleate;
  maleic acid monoaryl ester, preferably monophenyl maleate;
  maleic acid mono benzyl ester, preferably monobenzyl maleate;
  fumaric acid monoalkyl esters, preferably monomethyl fumarate, monoethyl fumarate, monopropyl fumarate, and mono n-butyl fumarate;
  fumaric acid monocycloalkyl esters, preferably monocyclopentyl fumarate, monocyclohexyl fumarate, and monocycloheptyl fumarate;
  fumaric acid monoalkylcycloalkyl esters, preferably monomethylcyclopentyl fumarate, and monoethylcyclohexyl fumarate;
  fumaric acid monoaryl ester, preferably monophenyl fumarate;
  fumaric acid mono benzyl ester, preferably monobenzyl fumarate;
  citraconic acid monoalkyl esters, preferably monomethyl citraconate, monoethyl citraconate, monopropyl citraconate, and mono n-butyl citraconate;
  citraconic acid monocycloalkyl esters, preferably monocyclopentyl citraconate, monocyclohexyl citraconate, and monocycloheptyl citraconate;
  citraconic acid monoalkylcycloalkyl esters, preferably monomethylcyclopentyl citraconate, and monoethylcyclohexyl citraconate;
  citraconic acid mono aryl ester, preferably monophenyl citraconate;
  citraconic acid mono benzyl ester, preferably monobenzyl citraconate;
  itaconic acid mono alkyl esters, preferably monomethyl itaconate, monoethyl itaconate, monopropyl itaconate, and mono n-butyl itaconate;

itaconic acid monocycloalkyl esters, preferably monocyclopentyl itaconate, monocyclohexyl itaconate, and monocycloheptyl itaconate;

itaconic acid monoalkylcycloalkyl esters, preferably monomethylcyclopentyl itaconate, and monoethylcyclohexyl itaconate;

itaconic acid mono aryl ester, preferably monophenyl itaconate;

itaconic acid mono benzyl ester, preferably monobenzyl itaconate.

As α,β-ethylenically unsaturated dicarboxylic acid diester monomers the analogous diesters based on the above explicitly mentioned mono ester monomers may be used, wherein, however, the two organic groups linked to the C=O group via the oxygen atom may be identical or different.

As further termonomers vinyl aromatic monomers like styrol, α-methylstyrol and vinylpyridine, as well as non-conjugated dienes like 4-cyanocyclohexene and 4-vinylcyclohexene, as well as alkines like 1- or 2-butine may be used.

Particularly preferred are termonomers chosen from the below depicted formulae:

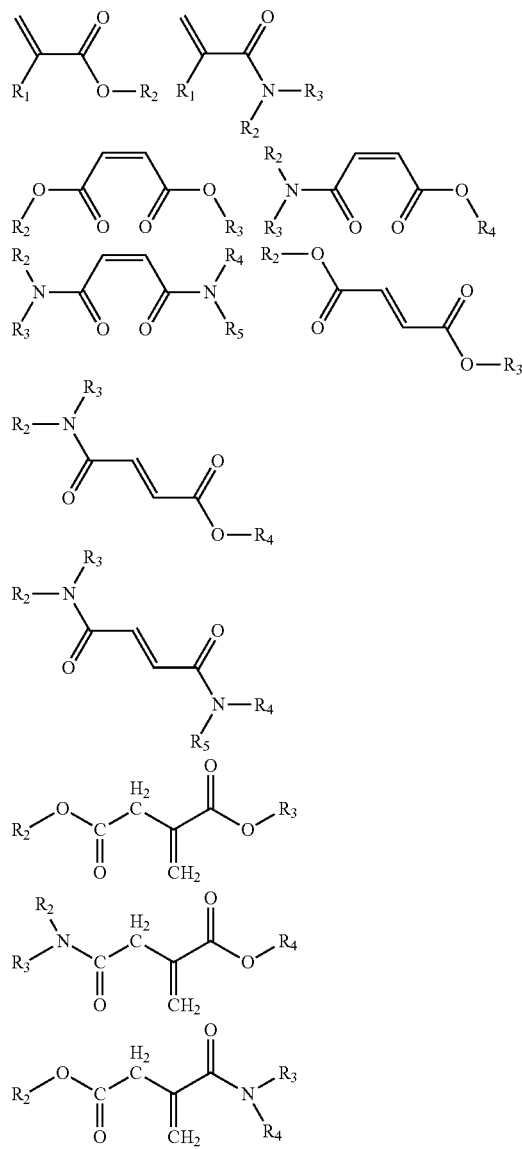
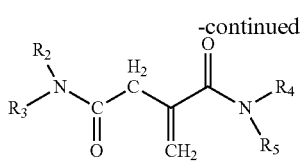

where
$R^1$ is hydrogen or methyl group, and
$R^2$, $R^3$, $R^4$, $R^5$ are identical or different and may represent H, $C_1$-$C_{12}$ alkyl, cycloalkyl, alkoxyalkyl, hydroxyalkyl, expoxyalkyl, aryl, heteroaryl.

The proportions of conjugated diene and n, n-unsaturated nitrile in the NBR polymers to be used can vary within wide ranges. The proportion of the conjugated diene or the sum of conjugated dienes is usually in the range from 40 to 90% by weight, preferably in the range from 60 to 85% by weight, based on the total polymer. The proportion of α,β-unsaturated nitrile or the sum of α,β-unsaturated nitriles is usually from 10 to 60% by weight, preferably from 15 to 40% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or the α,β-unsaturated nitrile or nitriles are replaced by proportions of the additional monomers, with the proportions of all monomers in each case adding up to 100% by weight.

The preparation of the nitrite rubbers by polymerization of the abovementioned monomers is adequately known to those skilled in the art and is comprehensively described in the literature. Nitrile rubbers which can be used for the purposes of the invention are also commercially available, e.g. as products from the product range of the Perbunan® and Krynac® grades of Lanxess Deutschland GmbH.

The nitrile rubbers to be hydrogenated have a Mooney viscosity (ML1+4 at 100° C.), measured in accordance with ASTM standard D 1646, in the range from 1 to 75, and preferably from 5 to 50. The weight average molecular weight Mw is in the range 2,000-400,000 g/mol, preferably in the range 20,000-300,000. The nitrile rubbers have a polydispersity PDI=Mw/Mn, where Mw is the weight average molecular weight and Mn is the number average molecular weight, in the range 1-5. The determination of the Mooney viscosity is carried out in accordance with ASTM Standard D 1646.

As the metathesis activity of the ruthenium- or osmium-based catalyst used to prepare the catalyst composition according to this invention is not existing in the catalyst composition of the present invention the molecular weight of the hydrogenated nitrile rubber obtained after the hydrogenation is comparable to the original NBR feedstock and not further reduced during hydrogenation.

Hence, a hydrogenated nitrile rubber with a weight average molecular weight Mw in the range 2,000-400,000 g/mol, preferably in the range 20,000-300,000 is obtained. The Mooney viscosity (ML1+4 at 100° C.), measured in accordance with ASTM standard D 1646, of the hydrogenated nitrile rubbers is in the range from 1 to 150, preferably from 10 to 100. The polydispersity PDI-Mw/Mn, where Mw is the weight average molecular weight and Mn is the number average molecular weight, in the range 1-5 and preferably in the range 1.5-4.

For the purposes of the present invention, hydrogenation is a reaction of the double bonds present in the starting nitrile rubber to an extent of at least 50%, preferably 70-100%, more preferably 80-100%; even more preferably 90-100%

The invention is further illustrated but is not intended to be limited by the following examples in which all parts and percentages are by weight unless otherwise specified.

EXAMPLES

Catalysts Used in the Examples

Catalysts (1) and (2) were purchased from Sigma Aldrich and Catalyst (3) was purchased from Xi'an Kaili Co. (China).

The structures of these catalysts are shown below:

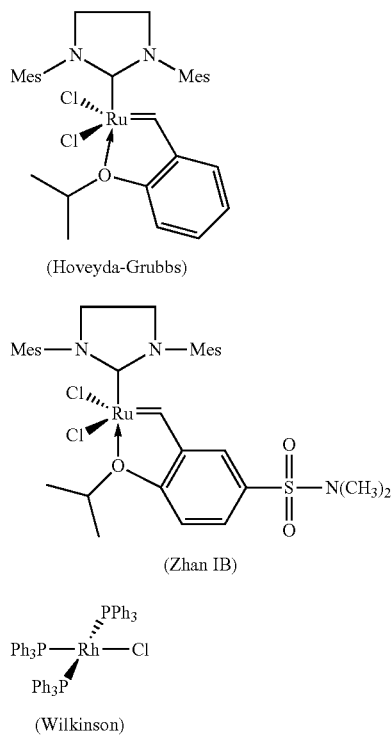

(Catalyst 1) (Hoveyda-Grubbs)

(Catalyst 2) (Zhan IB)

(Catalyst 3) (Wilkinson)

These catalysts have the following molecular weights:

| catalyst | molecular weight [g/mol] |
|---|---|
| (1) | 626.62 |
| (2) | 733.75 |
| (3) | 925.22 |

NBR Feedstock:

Perbunan® 3431 VP (product of LANXESS Deutschland GmbH) was used as NBR feedstock.

The characteristic features of the NBR feedstock are shown in the table:

| NBR feedstock | ACN % | ML(1 + 4) 100° C. | Mn | Mw | PDI |
|---|---|---|---|---|---|
| Perbunan 3431 VP | 34% | 29 | 77101 | 255395 | 3.31 |

Analytical Tests:

GPC Test: The apparent molecular weight Mn and Mw were determined by a Waters GPC system equipped with a Waters 1515 high performance liquid chromatography pump, a Waters 717 plus autosampler, a PL gel 10 μm mixed B column and a Waters 2414 RI detector. The GPC test was carried out at 40° C. at 1 mL/min of flow rate with THF as the eluent, and the GPC column was calibrated with narrow PS standard samples.

FT-IR Test: The spectrum of nitrile rubber before, during and after the hydrogenation reaction was recorded on a Perkin Elmer spectrum 100 FT-IR spectrometer. The solution of the nitrile butadiene rubber in MCB was cast onto a KBr disk and dried to form a film for the test. The hydrogenation conversion is determined by the FT-IR analysis according to the ASTM D 5670-95 method.

ABBREVIATIONS phr: per hundred rubber (weight)
rpm: revolution per minute
Mn: number-average molecular weight
Mw: weight-average molecular weight
PDI: polydispersity index, defined as Mw/Mn
PPh$_3$: triphenylphosphine
MCB: monochlorobenzene
RT: room temperature (22+/−2° C.)

In all below Tables the comparison examples are marked with an asterisk "*"

Example 1

Comparison Example, Using Catalyst (3)

A solution of 18 g Perbunan® 3431VP in 282 g MCB (Perbunan® 3431VP concentration of 6 wt %) was bubbled with nitrogen in a 600 mL Parr autoclave for 30 minutes, and then heated to 120° C. Wilkinson's catalyst (15 mg) and PPh$_3$ (18 mg) was dissolved in another 20 mL of degassed MCB and then shot into the reactor. Hydrogenation was conducted under 600 psi of hydrogen pressure and 800 rpm of agitation speed. Samples were taken from the reactor at intervals for IR analysis to determine the hydrogenation degree. After 5 hours of hydrogenation, the hydrogenation degree reached 90.3%, the reactor was cooled to room temperature and the pressure was released. The final molecular weight and the distribution were: Mn=76,286, Mw=260,572, PDI=3.42.

Example 2

Comparison Example, Using Catalyst (2) without Hydrogen Pretreatment

A solution of 9 g Perbunan® 3431VP in 291 g MCB (Perbunan® 3431VP concentration of 3 wt %) was bubbled with nitrogen in a 600 mL Parr autoclave for 30 minutes, and then heated to 120° C. Zhan 1B (9 mg) was dissolved in another 20 mL of degassed MCB and then shot into the reactor. Hydrogenation was conducted under 600 psi of hydrogen pressure and 800 rpm of agitation speed. Samples were taken from the reactor at intervals for IR analysis to determine the hydrogenation degree. After 4 hours of hydrogenation, the hydrogenation degree reached 98.6%. The final molecular weight and the distribution were: Mn=5,560, Mw=14,407, PDI=2.59. The obtained HNBR has a much lower molecular weight than the original NBR feedstock

Example 3

Comparison Example, Using Catalyst (2) without Hydrogen Pretreatment

A solution of 18 g Perbunan® 3431VP in 282 g MCB (Perbunan® 3431VP concentration of 6 wt %) was bubbled with nitrogen in a 600 mL Parr autoclave for 30 minutes, and then heated to 120° C. Zhan 1B (18 mg) was dissolved in another 20 mL of degassed MCB and then shot into the reactor. Hydrogenation was conducted under 600 psi of hydrogen pressure and 800 rpm of agitation speed. Samples were taken from the reactor at intervals for IR analysis to determine the hydrogenation degree. After 18 hours of hydrogenation, the hydrogenation degree reached 92.6%. The final molecular weight and the distribution were: Mn=10,103, Mw=19,964, PDI=1.98. The obtained HNBR has a much lower molecular weight than the original NBR feedstock.

The conditions and the results for Example 1-3 are shown in Table 1 and Table 2

TABLE 1

Comparison Examples 1-3: The conditions for the NBR hydrogenation without catalyst pretreatment

| Ex. | Perbunan 3431VP | MCB | Catalyst | hydrogenation time |
|---|---|---|---|---|
| 1* | 18 g | 282 g | RhCl(PPh$_3$)$_3$ (15 mg) and PPh$_3$ (18 mg) in 20 mL of MCB | 5 hrs |
| 2* | 9 g | 291 g | Zhan 1B (9 mg) in 20 mL of MCB | 4 hrs |
| 3* | 18 g | 282 g | Zhan 1B (18 mg) in 20 mL of MCB | 18 hrs |

Condition: 600 psi H$_2$ pressure, 800 rpm agitation speed, 120° C.

TABLE 2

Comparison Examples 1-3: The results of the NBR hydrogenation without catalyst pretreatment

| Example | HNBR | | | Hydrogenation degree |
|---|---|---|---|---|
| | Mn | Mw | PDI | |
| 1* | 76,286 | 260,572 | 3.42 | 90.3% |
| 2* | 5,560 | 14,407 | 2.59 | 98.6% |
| 3* | 10,103 | 19,964 | 1.98 | 92.6% |
| Perbunan 3431VP | 77,101 | 255,395 | 3.31 | — |

Example 4

Comparison Example; Catalyst (2) with H$_2$ Pretreatment at 70° C.

Zhan 1B (48 mg) was dissolved in 20 mL MCB in a stainless steel bomb. After three vacuum-nitrogen flushing circles, hydrogen was introduced into the bomb. Then the bomb was put into a shaker at 70° C. and shaken for 12 hours.

A solution of 18 g Perbunan 3431VP in 282 g MCB (Perbunan 3431VP concentration of 6 wt %) was bubbled with nitrogen in a 600 mL Parr autoclave for 30 minutes, and then heated to 120° C. The catalyst solution in the bomb was shot into the reactor via hydrogen. Hydrogenation was conducted under 600 psi of hydrogen pressure and 800 rpm of agitation speed. Samples were taken from the reactor at intervals for IR analysis to determine the hydrogenation degree. After 4 hours of hydrogenation, the hydrogenation degree reached 98.9%. The final molecular weight and the distribution were: Mn=11,742, Mw=24,438, PDI=2.08. The obtained HNBR still has much lower molecular weight than the original NBR feedstock, when the hydrogen pretreatment was not conducted in an appropriate condition.

Example 5

Inventive Example; Catalyst (2) with H$_2$ Pretreatment at 120° C.

Zhan 1B (18 mg) was dissolved in 80 mL MCB in a 600 mL autoclave. After three vacuum-nitrogen flushing circles, hydrogen was introduced into the autoclave. Then the solution was stirred under 600 psi hydrogen pressure at 120° C. for 12 hours.

A solution of 18 g Perbunan 3431VP in 282 g MCB (Perbunan 3431 VP concentration of 6 wt %) was bubbled with nitrogen in a flask for 30 minutes, and then transferred in the autoclave. Hydrogenation was conducted under 600 psi of hydrogen pressure and 800 rpm of agitation speed. Samples were taken from the reactor at intervals for IR analysis to determine the hydrogenation degree. After 4 hours of hydrogenation, the hydrogenation degree reached 99.0%. The final molecular weight and the distribution were: Mn=77,726, Mw=219,136, PDI=2.82.

Example 6

Inventive Example; Catalyst (1) with H$_2$ Pretreatment at 120° C.

Catalyst (1) (36 mg) was dissolved in 160 mL MCB in a 600 mL autoclave. After three vacuum-nitrogen flushing circles, hydrogen was introduced into the autoclave. Then the solution was stirred under 600 psi hydrogen pressure at 100° C. for 12 hours.

A solution of 36 g Perbunan 3431VP in 564 g MCB was bubbled with nitrogen in a flask for 30 minutes, and then transferred in the autoclave. Hydrogenation was conducted under 600 psi of hydrogen pressure and 800 rpm of agitation speed. Samples were taken from the reactor at intervals for IR analysis to determine the hydrogenation degree. After 22 hours of hydrogenation, the hydrogenation degree reached 97.7%. The final molecular weight and the distribution were: Mn=67,546, Mw=175,333, PDI=2.60.

The conditions and the results for Example 4 to 6 are shown in Table 3 and Table 4.

TABLE 3

Example 4 to 6: Reaction conditions for preparation of catalyst composition and NBR hydrogenation

| | | Hydrogenation step* | | |
|---|---|---|---|---|
| Example | Preparation of catalyst composition | Perbunan 3431 VP | MCB | time |
| 4* | Catalyst (2) (48 mg) and MCB (20 mL), $H_2$, 600 psi, 70° C., shaken 12 hours | 18 g | 282 g | 4 hrs |
| 5 | Catalyst (2) (18 mg) and MCB (80 mL), $H_2$, 600 psi, 120° C., stirred 12 hours | 18 g | 282 g | 4 hrs |
| 6 | Catalyst (1) (36 mg) and MCB (160 mL), $H_2$, 600 psi, 100° C., stirred 12 hours | 36 g | 564 g | 22 hrs |

TABLE 4

Example 4 to 6: Results of the NBR hydrogenation

| | HNBR | | | |
|---|---|---|---|---|
| Example | Mn | Mw | PDI | Hydrogenation degree |
| 4* | 11,742 | 24,438 | 2.08 | 98.9% |
| 5 | 77,726 | 219,136 | 2.82 | 99.0% |
| 6 | 67,546 | 175,333 | 2.60 | 97.7% |
| Perbunan 3431VP | 77,101 | 255,395 | 3.31 | |

The Examples show that hydrogenated nitrile rubber can be prepared without simultaneous metathetic degradation and therefore resulting in HNBR with nearly constant molecular weight when a catalyst composition is used for hydrogenation which has been prepared by contacting a ruthenium- or osmium-based metathesis catalyst with hydrogen and thereafter contacting such catalyst composition with a nitrile rubber. The catalyst composition obtained after treating the ruthenium- or osmium-based catalyst with hydrogen does not possess metathesis activity and thus the molecular weight of the hydrogenated nitrile rubber obtained is comparable to the original NBR feedstock and not significantly decreased. Meanwhile the hydrogenation activity of the novel catalyst composition is clearly higher than hydrogenation activity observed when using the complex catalyst without treating it with hydrogen in order to form the catalyst composition (see Example 3 versus Example 5).

What is claimed is:

1. A process of hydrogenating a nitrile rubber, the process comprising:
   a) contacting a complex catalyst with hydrogen in the absence of a nitrile rubber at a temperature 75° C. to 200° C. to form a catalyst composition; and
   b) hydrogenating the nitrile rubber in the presence of the catalyst composition, wherein the complex catalyst has the general formula (A)

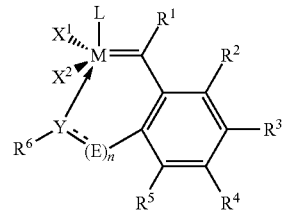

(A)

where
M is ruthenium or osmium,
$X^1$ and $X^2$ are identical or different ligands,
L is an electron donating ligand, which can be linked or not linked with $X^1$ to form a cyclic structure,
$R^1$ is hydrogen, alkyl, cycloalkyl, alkenyl, alkynyl, aryl or heteroaryl and
$R^2$, $R^3$, $R^4$ and $R^5$ are identical or different and are each hydrogen or an organic or inorganic substituent,
$R^6$ is H, alkyl, cycloalkyl, alkenyl, alkynyl, aryl, heteroaryl, —C(=O)R, —C(=O)OR, —C(=O)N$(R)_2$, —C(=S)R, —C(=S)SR, —C(=S)OR, —C(=S)N$(R)_2$, —S(=O)$_2$N$(R)_2$, —S(=O)$_2$R, —S(=O)R or a group containing either a C=O or a C=S structural element adjacent to a carbon atom which is bound to Y,
n is 0 or 1,
wherein if n=1, then the element $Y = (E)_n$ shall mean that Y and $(E)_n$ are linked either by a single bond or by a double bond, wherein
   (i) if Y and $(E)_n$ are linked by a single bond, then Y is oxygen (O), sulphur (S), N—R or P—R, and
   E is $CH_2$, or
   (ii) if Y and $(E)_n$ are linked by a double bond, then Y is N or P, and
   E is CH
wherein if n=0, then
   Y is oxygen (O), sulphur (S), N—R or P—R and directly linked by a single bond to the phenyl moiety depicted above in formula (A), and
wherein R is hydrogen or alkyl, cycloalkyl, alkenyl, alkynyl, aryl or heteroaryl.

2. The process according to claim 1, wherein in step a) the complex catalyst is selected from the group consisting of
   (i) catalysts of general formula (A1),

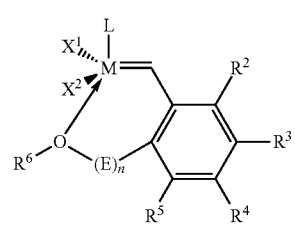

(A1)

wherein M, L, $X^1$, $X^2$, $R^2$, $R^3$, $R^4$, $R^5$, $R^6$, n and E have the meanings mentioned for the general formula (A) in claim 1, (ii) catalysts of general formula (A2),

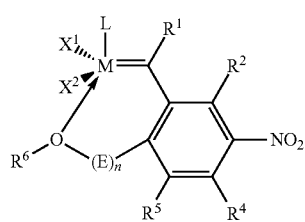
(A2)

wherein M, L, $X^1$, $X^2$, $R^1$, $R^2$, $R^4$, $R^5$, $R^6$, n and E have the meanings mentioned for the formula (A) in claim 1, (iii) catalysts of general formula (A3)

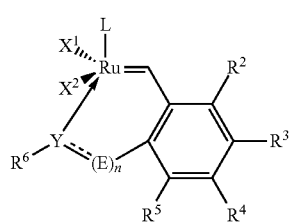
(A3)

where
$X^1$ and $X^2$ are identical or different and shall mean hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate $C_6$-$C_{24}$-aryldiketonate $C_1$-$C_{20}$-carboxylate, $C_1$-$C_{20}$-alkylsulfonate, C6-$C_2$4-arylsulfonate, $C_1$-$C_{20}$-alkylthiol, $C_6$-$C_{24}$-aryl thiol, $C_1$-$C_{20}$-alkylsulfonyl or $C_1$-$C_{20}$-alkylsulfinyl, L is an electron donating ligand, which can be linked or not linked with $X^1$ to form a cyclic structure, $R^3$ is chloro, fluoro, bromo, —C(=O)R, —C(=O)OR, —OC(=O)R, —C(=O)N(R)$_2$, —C(=S)R, —C(=S)SR, —C(=S)OR, —C(=S)N(R)$_2$, —S(=O)$_2$N(R)$_2$, —S(=O)$_2$R, or —S(=O)R, $R^4$ is H, halogen, nitro, cyano, $C_1$-$C_{20}$ alkyl, $C_1$-$C_{20}$ alkoxy, $C_1$-$C_{20}$ alkylthio, —Si(R)$_3$, —O—Si(R)$_3$, $C_6$-$C_{20}$ aryl, $C_6$-$C_{20}$ aryloxy, $C_2$-$C_{20}$ heterocyclic, $C_2$-$C_{20}$ heteroaryl, —C(=O)R, —C(=O)OR, —C(=O)N(R)$_2$, —C(=S)R, —C(=S)SR, —C(=S)OR, —C(=S)N(R)$_2$, —S(=O)$_2$N(R)$_2$, —S(=O)$_2$R or —S(=O)R, $R^2$ and $R^5$ are each H, bromo (Br), iodo (I), $C_1$-$C_{20}$ alkyl, $C_1$-$C_{20}$ alkoxy, $C_1$-$C_{20}$ alkylthio, —Si(R)$_3$, —O—Si(R)$_3$, $C_6$-$C_{20}$ aryloxy, $C_6$-$C_{20}$ aryl, $C_2$-$C_{20}$ heterocyclic, $C_2$-$C_{20}$ heteroaryl, —C(=O)OR, —C(=O)N(R)$_2$, or —SO$_2$N(R)$_2$, $R^6$ is H, $C_1$-$C_{20}$ alkyl, $C_5$-$C_{20}$ aryl, $C_2$-$C_{20}$ heterocyclic, $C_2$-$C_{20}$ heteroaryl, —C(=O)R, —C(=O)OR, —C(=O)N(R)$_2$, —SO$_2$N(R)$_2$ or —N(SO$_2$—R)$_2$, —S(=O)R, or —S(=O)$_2$R, n is 0 or 1,
wherein if n=1, then the element Y═(E)$_n$ shall mean that Y and (E)$_n$ are linked either by a single bond or by a double bond, wherein
(i) if Y and (E)$_n$ are linked by a single bond, then Y is oxygen (O), sulfur (S), N—R or P—R and E is CH$_2$, or
(ii) if Y and (E)$_n$ are linked by a double bond, then Y is N or P
E is CH,
wherein if n=0, then
Y is oxygen (O), sulfur (S), N—R or P—R and directly linked by a single bond to the phenyl moiety depicted above in formula (A5), and
wherein in all above occurrences in formula (A3), R is identical or different and shall mean H, $C_1$-$C_{20}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_2$-$C_{24}$-heteroaryl, or if two substituents R are bound to the same R atom, such two substituents A may also form a saturated or unsaturated cyclic structure together with the atoms to which they are bound, (iv) catalysts of general formula (A4)

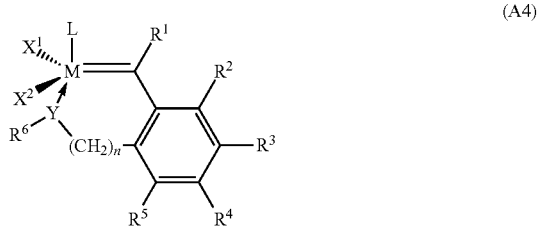
(A4)

wherein M, L, Y, $X^1$, $X^2$, $R^1$, $R^2$, $R^3$, $R^4$, $R^5$, $R^6$ and n have the meanings given for general formula (A), (v) catalysts of general formula (A5)

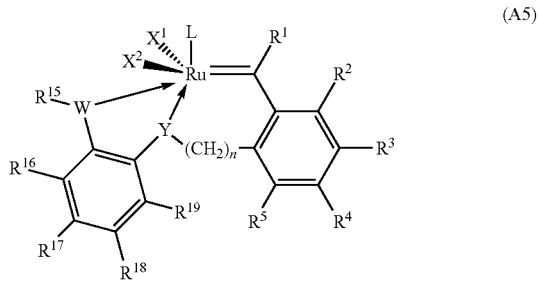
(A5)

where
Y is oxygen (O) or —NR with R representing hydrogen, alkyl, cycloalkyl, alkenyl, alkynyl, aryl or heteroaryl,
W is oxygen (O) or MR$^7$ with R$^7$ being hydrogen or straight chain or branched $C_1$-$C_{20}$ alkyl, $R^{15}$ represents straight chain or branched alkyl, $R^{16}$, $R^{17}$, $R^{18}$ and $R^{19}$ are identical or different and represent hydrogen, halogen, alkyl, cycloalkyl, alkoxy, alkenyl, alkynyl, aryl or heteroaryl, and L, $R^1$, $R^2$, $R^3$, $R^4$, $R^5$ and n shall have the meanings given for general formula A, (vi) catalysts of general formula (A6)

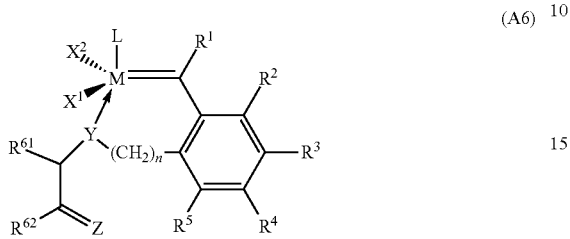

(A6)

where

M is ruthenium or osmium,

Z is oxygen (O) or sulfur (S),

Y is oxygen (O), sulfur (S), N—$R^7$ or P—$R^7$, where $R^7$ has the meanings indicated below, $X^1$ and $X^2$ are identical or different ligands, $R^1$ is H, alkyl, alkenyl, alkynyl or aryl, $R^2$, $R^3$, $R^4$ and $R^5$ are identical or different and are each hydrogen, organic or inorganic substituents, $R^{61}$ is H, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl, each of which may optionally be substituted by one or more alkyl, halogen, alkoxy, aryl or heteroaryl substituents, $R^{62}$ is alkyl, cycloalkyl, alkenyl, alkynyl, aryl, alkoxy, alkenyloxy, alkynyloxy, aryloxy, alkoxy carbonyl, alkylamino, alkylthio, arylthio, alkylsulphonyl or alkyl sulphonyl, each of which may optionally be substituted by one or more alkyl, halogen, alkoxy, aryl or heteroaryl substituents, or where in the alternative $R^{61}$ and $R^{52}$ may form a cyclic structure together with the two adjacent carbon atoms to which they are bound, L is a ligand, $R^7$ is alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl which may each be optionally substituted by one or more alkyl, halogen, alkoxy, aryl or heteroaryl substituents, and n is 0 or 1, and (vii) catalysts of general formula (A7)

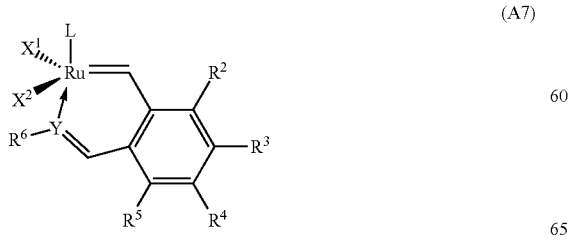

(A7)

where $X^1$ and $X^2$ are identical or different and shall mean hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthiol, $C_6$-$C_{24}$-arylthiol, $C_1$-$C_{20}$-alkylsulfonyl or $C_1$-$C_{20}$-alkylsulfinyl, L is an electron donating ligand, which can be linked or not linked with $X^1$ to form a cyclic structure, Y is NR or PR, $R^3$ is chloro, fluoro, bromo, —C(=O)R, —C(=O)OR, —OC(O)R, —C(=O)N(R)$_2$, —C(=S)R, —C(=S)SR, —C(=S)OR, —C(=S)N(R)$_2$, —S(=O)$_2$N(R)$_2$, —S(=O)$_2$R, or —S(=O)R, $R^4$ is H, halogen, nitro, cyano, $C_1$-$C_{20}$ alkyl, $C_1$-$C_{20}$ alkoxy, $C_1$-$C_{20}$ alkylthio, —Si(R)$_3$, —O—Si(R)$_3$, $C_6$-$C_{20}$ aryl, $C_6$-$C_{20}$ aryloxy, $C_2$-$C_{20}$ heterocyclic, $C_2$-$C_{20}$ heteroaryl, —C(=O)R, —C(=O)OR, —C(=O)N(R)$_2$, —C(=S)R, —C(=S)SR, —C(=S)OR, —C(=S)N(R)$_2$, —S(=O)$_2$N(R)$_2$, —S(=O)$_2$R or —S(=O)R, $R^2$ and $R^5$ are each H, bromo (Br), iodo (I), $C_1$-$C_{20}$ alkyl, $C_1$-$C_{20}$ alkoxy, $C_1$-$C_{20}$ alkylthio, —Si(R)$_3$, —O—Si(R)$_3$, $C_6$-$C_{20}$ aryloxy, $C_6$-$C_{20}$ aryl, $C_2$-$C_{20}$ heterocyclic, $C_2$-$C_{20}$ heteroaryl, —C(=O)OR, —C(=O)N(R)$_2$, or —SO$_2$N(R)$_2$, $R^6$ is H, $C_1$-$C_{20}$ alkyl, $C_6$-$C_{20}$ aryl, $C_2$-$C_{20}$ heterocyclic, $C_2$-$C_{20}$ heteroaryl, —C(=O)R, —C(=O)OR, —C(=O)N(R)$_2$, —SO$_2$N(R)$_2$, —N(SO$_2$—R)$_2$, —S(=O)R, or —S(=O)$_2$R, and wherein in all above occurrences in formula (A7), R is identical or different and shall mean H, $C_1$-$C_{20}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_2$-$C_{24}$-heteroaryl, or if two substituents R are bound to the same atom, such two substituents R may also form a saturated or unsaturated cyclic structure together with the atoms to which they are bound.

3. The process according to claim 1, wherein the complex catalyst is selected from the group consisting of the below shown formulae, wherein Mes is in each case 2,4,6-trimethylphenyl, Ph is phenyl,

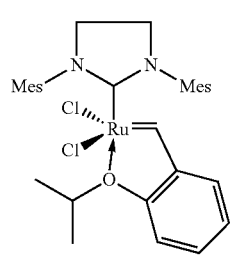

71
-continued
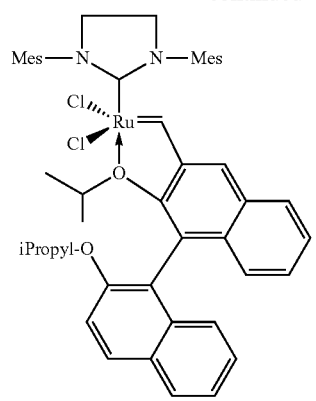
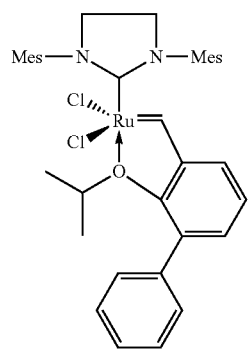
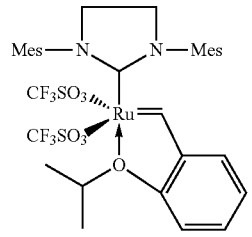
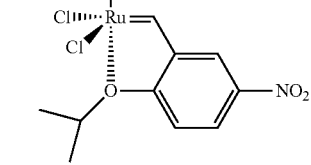
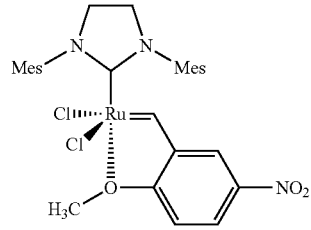
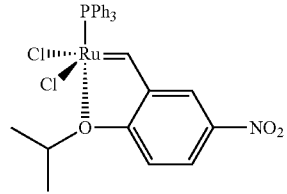
72
-continued
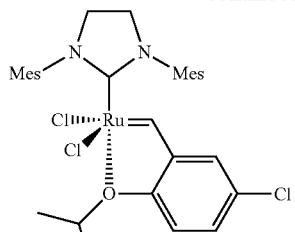
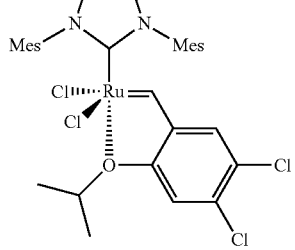
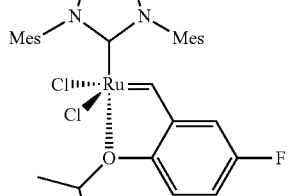
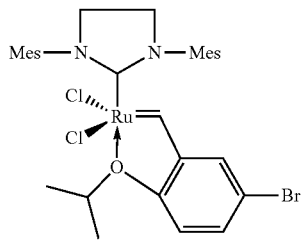
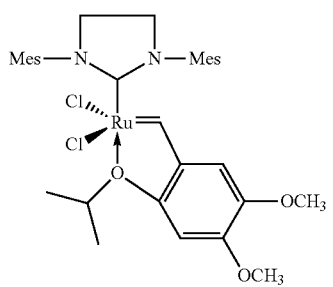
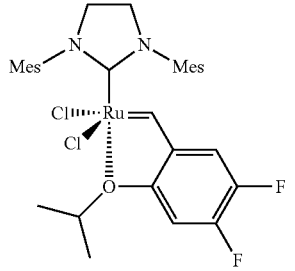

73
-continued
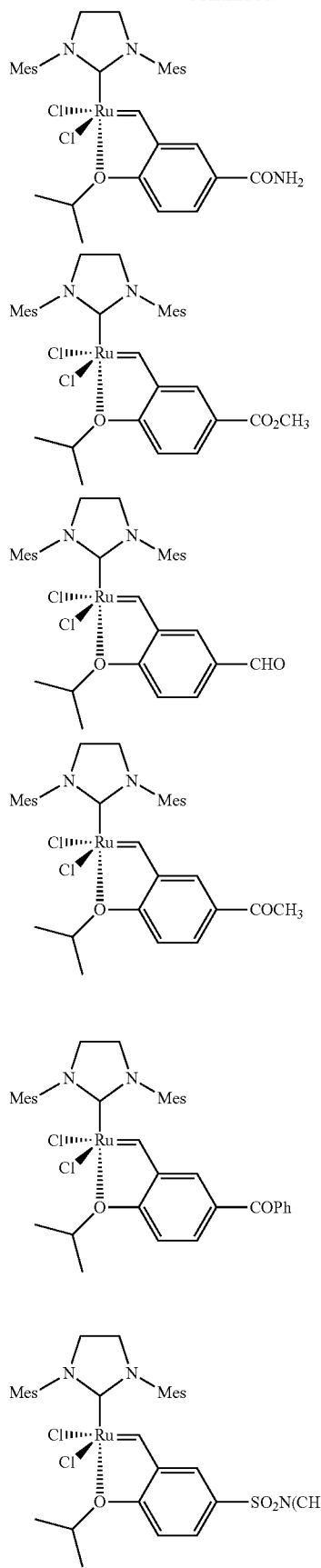
74
-continued
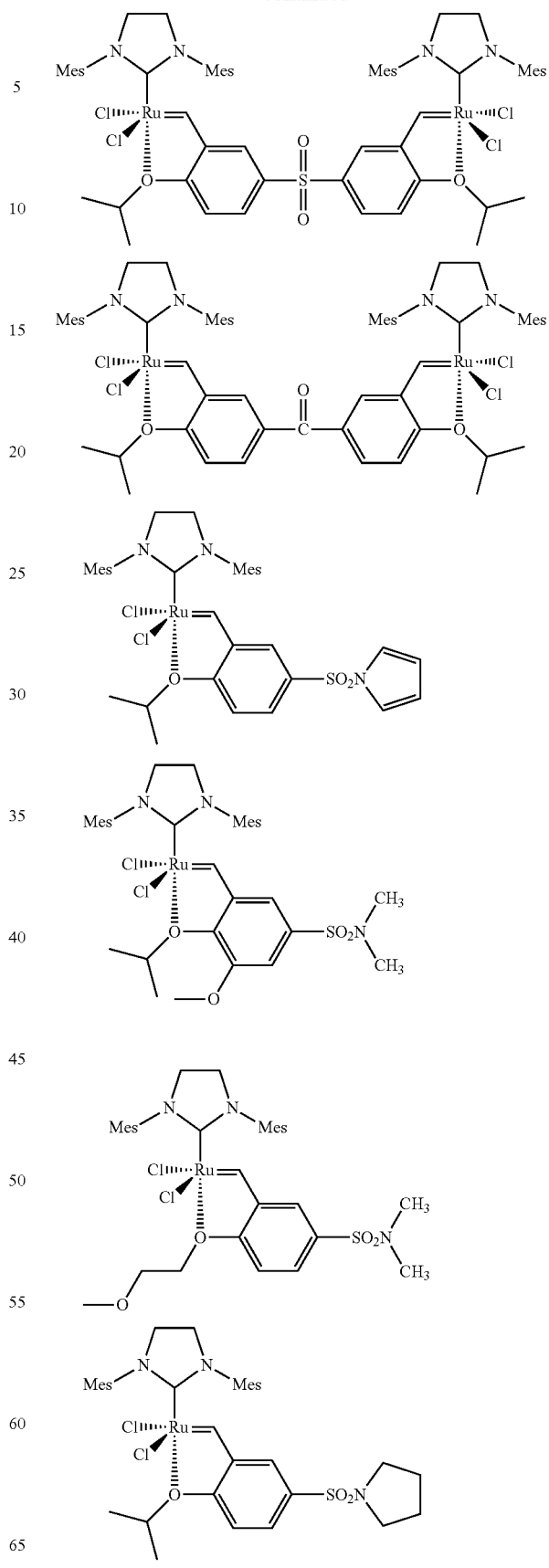

75
-continued
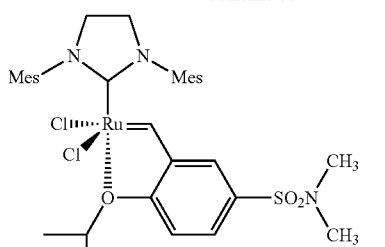
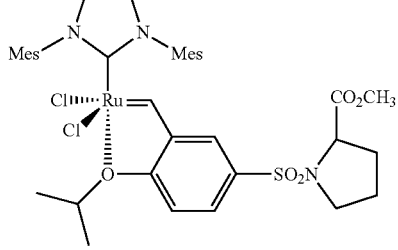
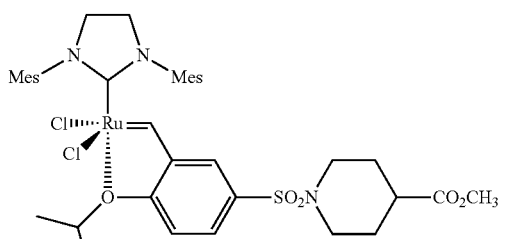
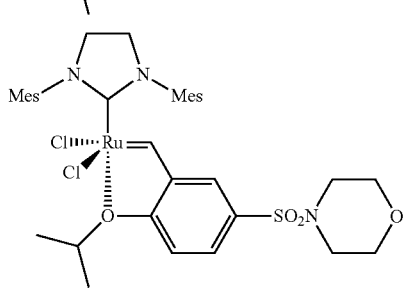
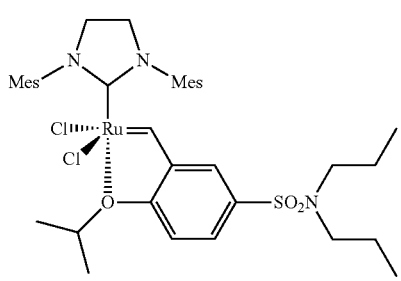
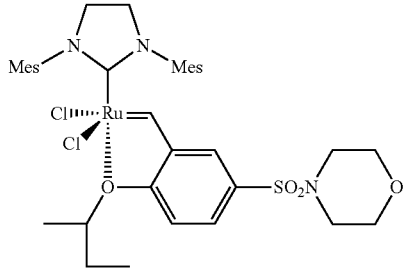
76
-continued
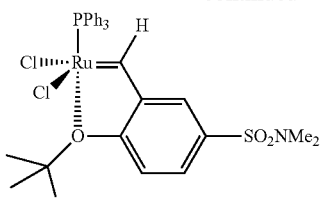
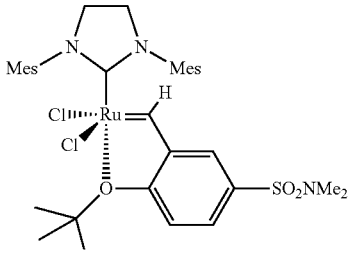
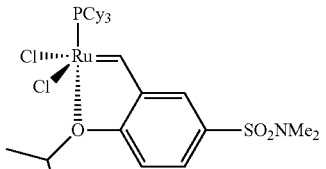
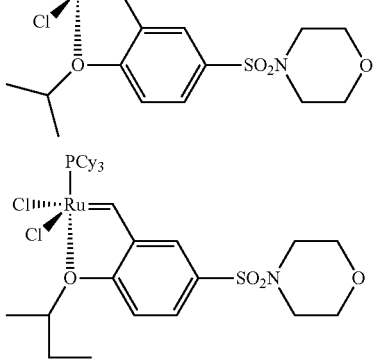
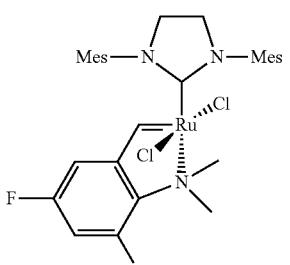
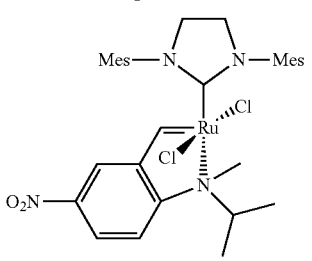

-continued
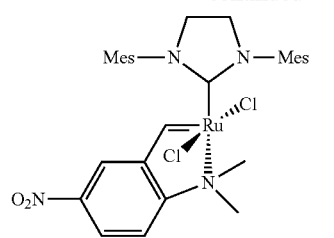
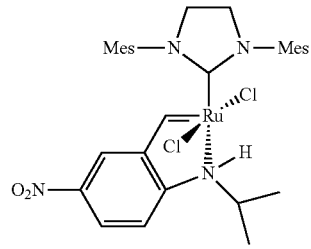
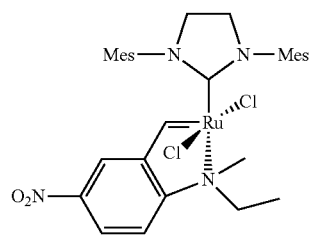
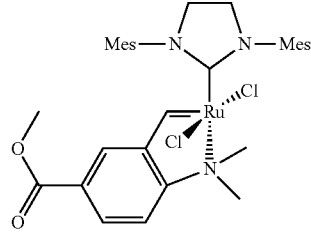
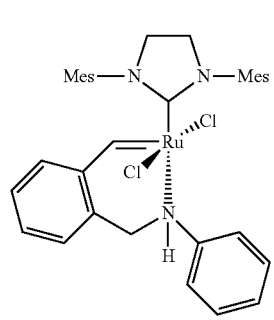
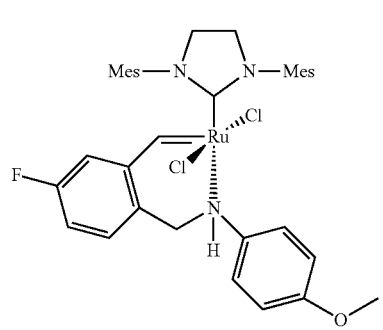
-continued
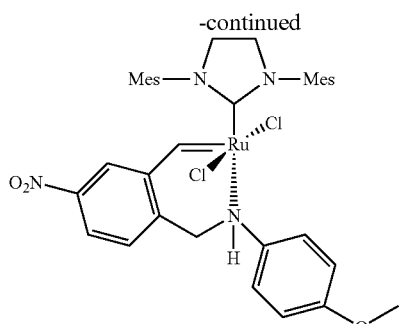
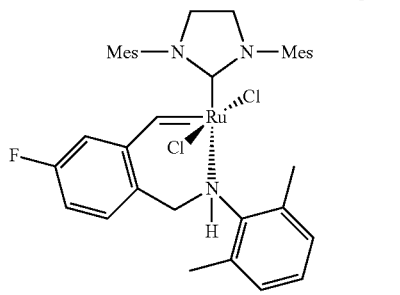
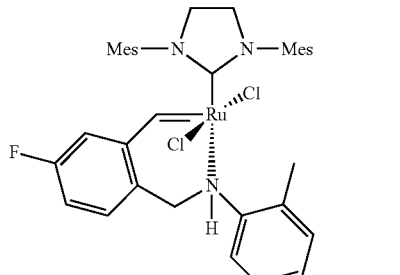
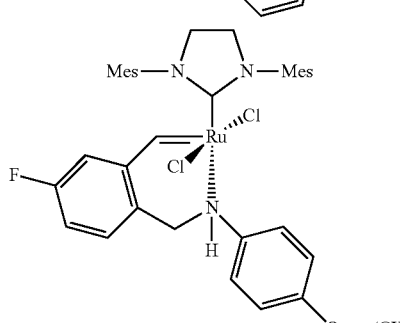
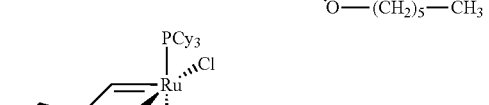
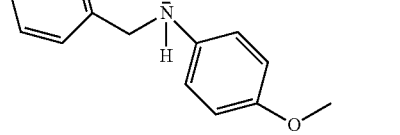
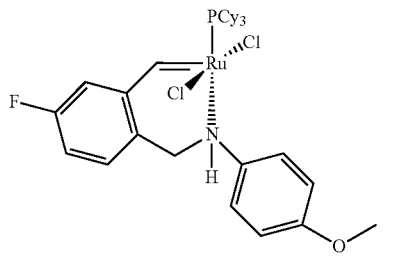

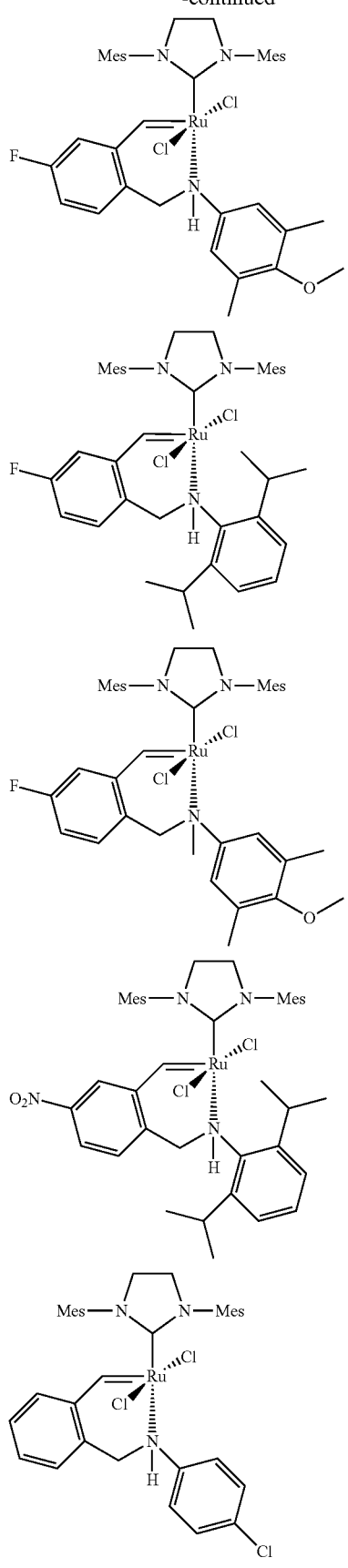
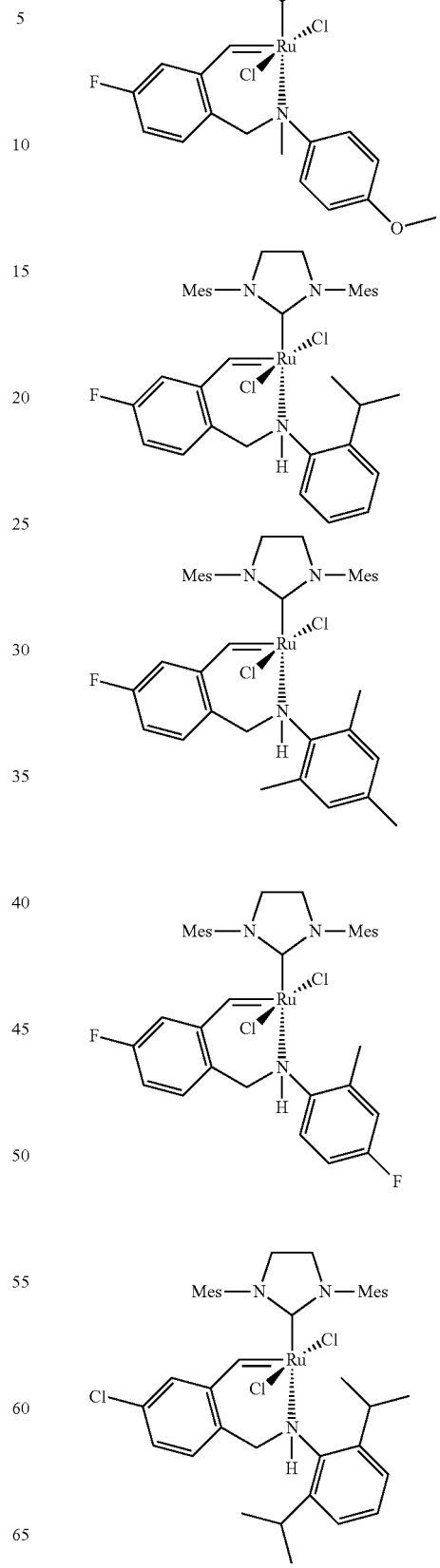

81
-continued
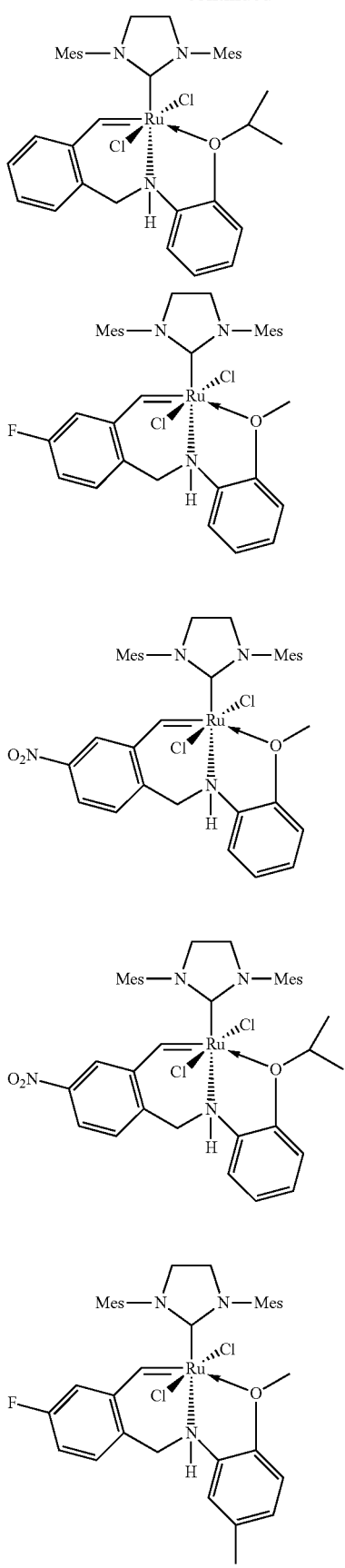
82
-continued
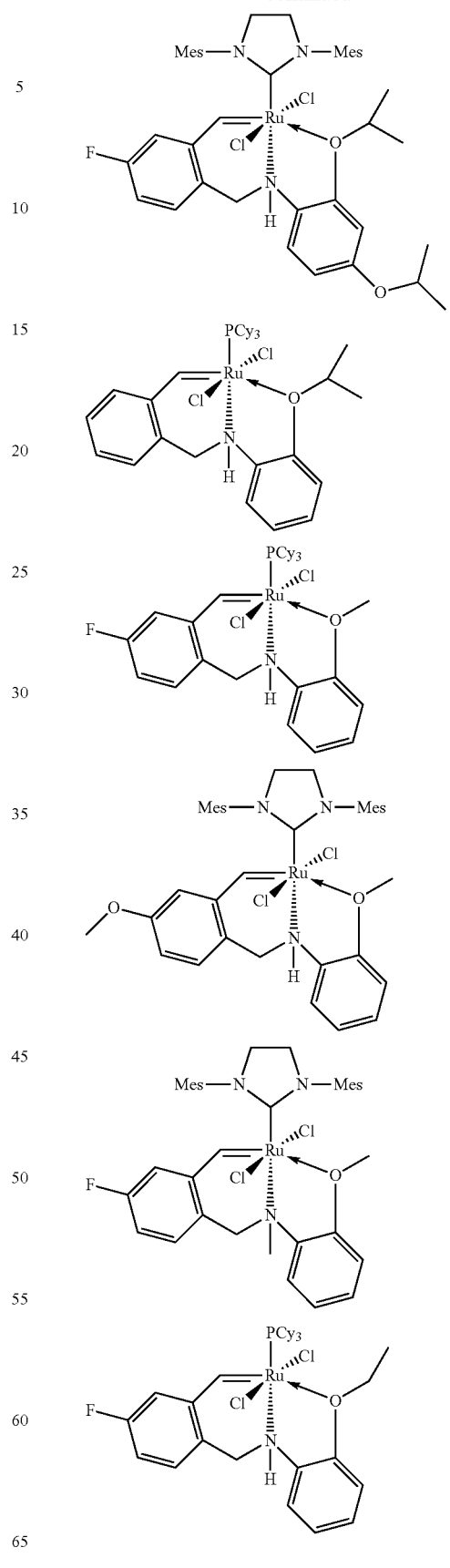

83
-continued
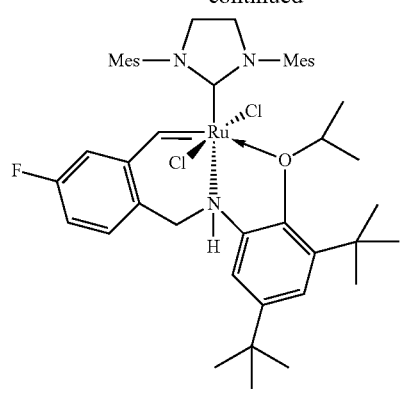
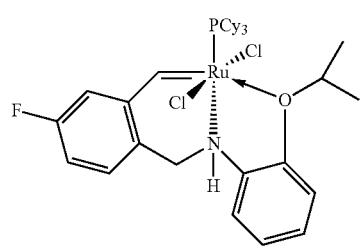
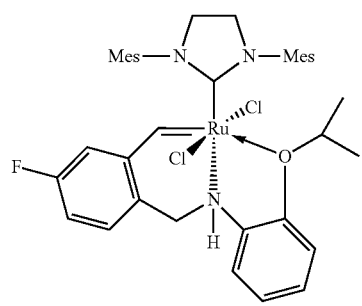
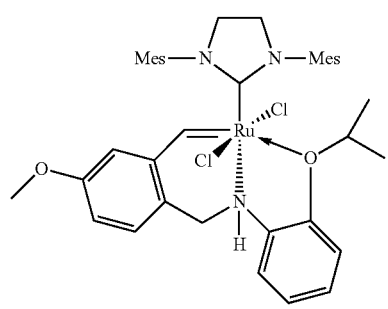
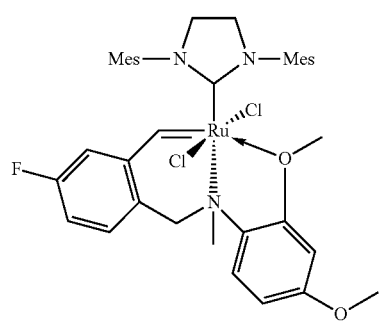
84
-continued
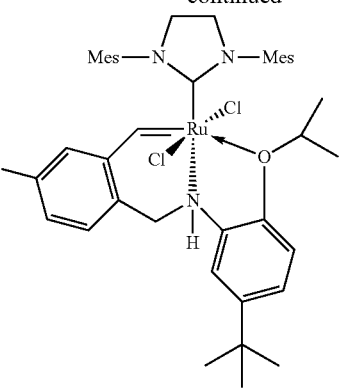
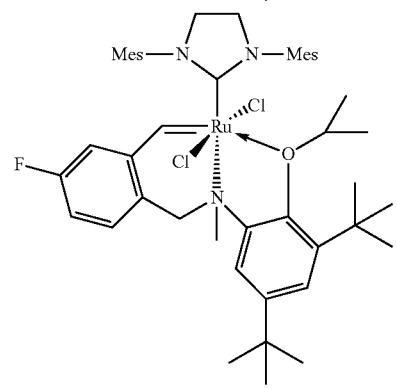
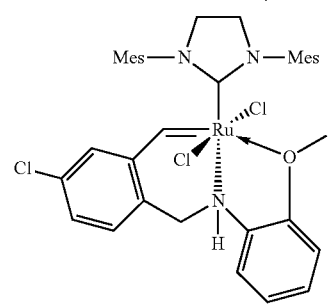
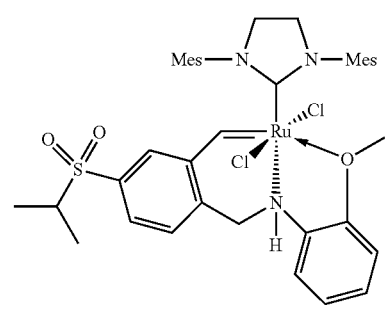
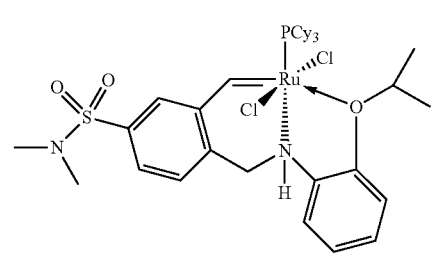

85
-continued
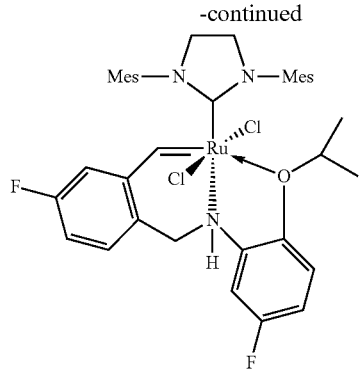
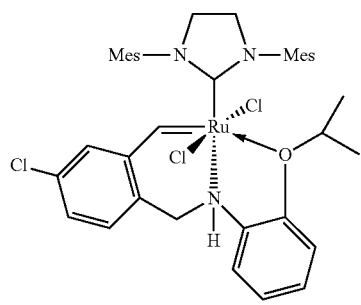
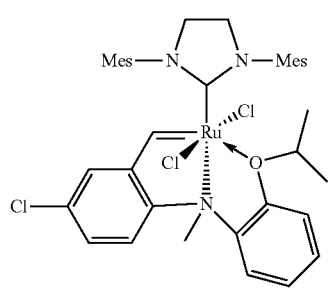
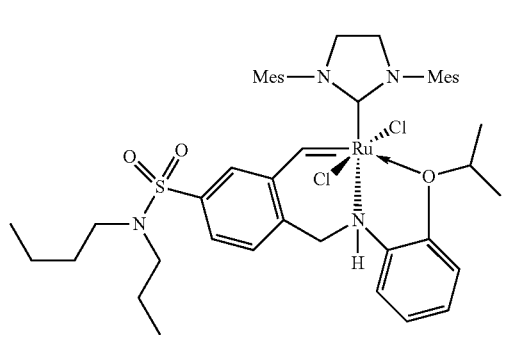
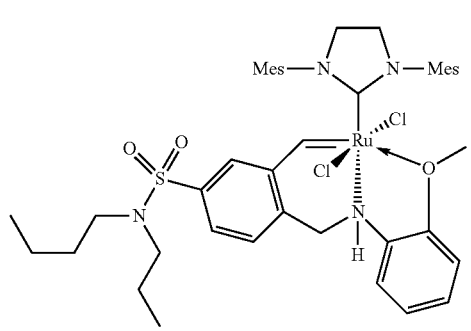
86
-continued
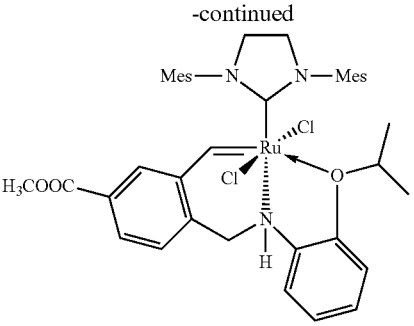
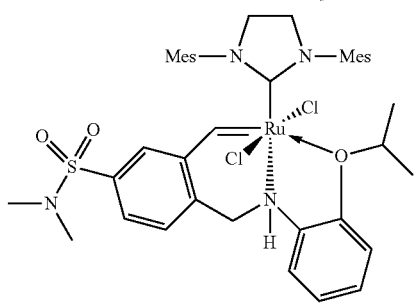
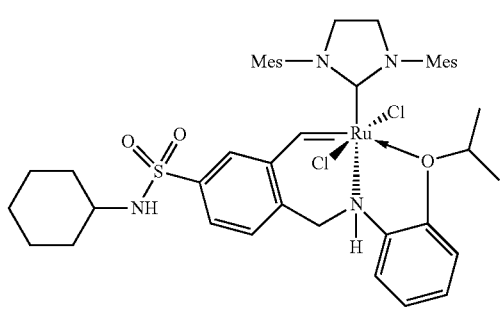
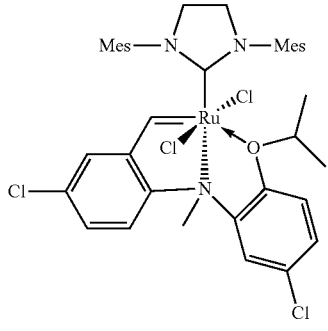
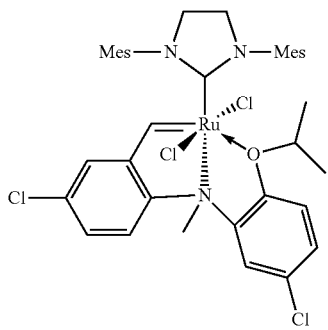

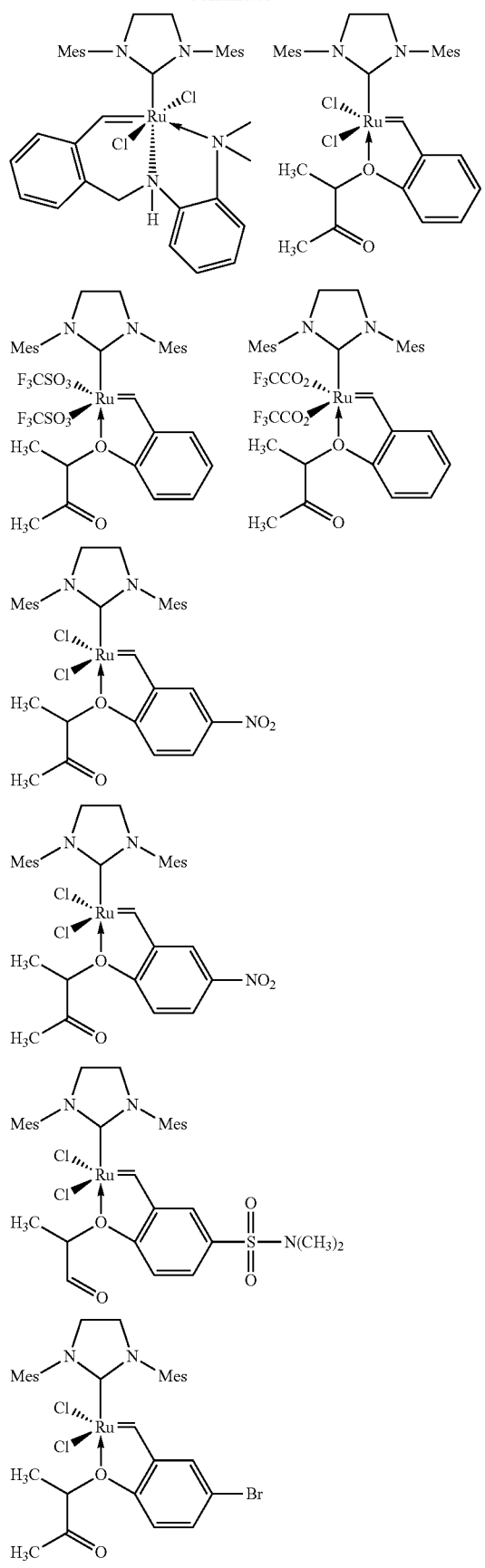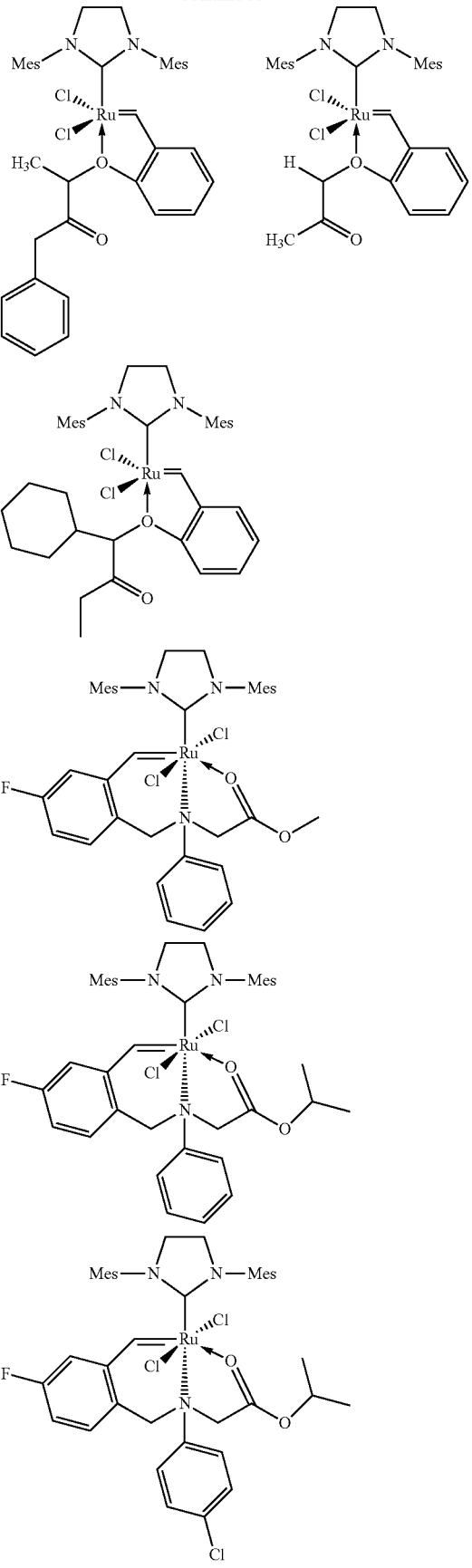

89
-continued
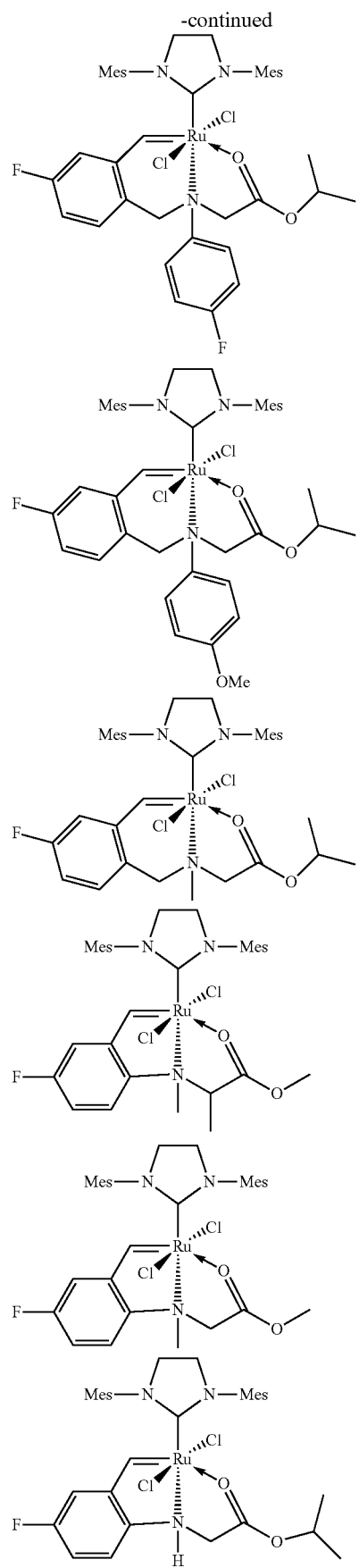
90
-continued
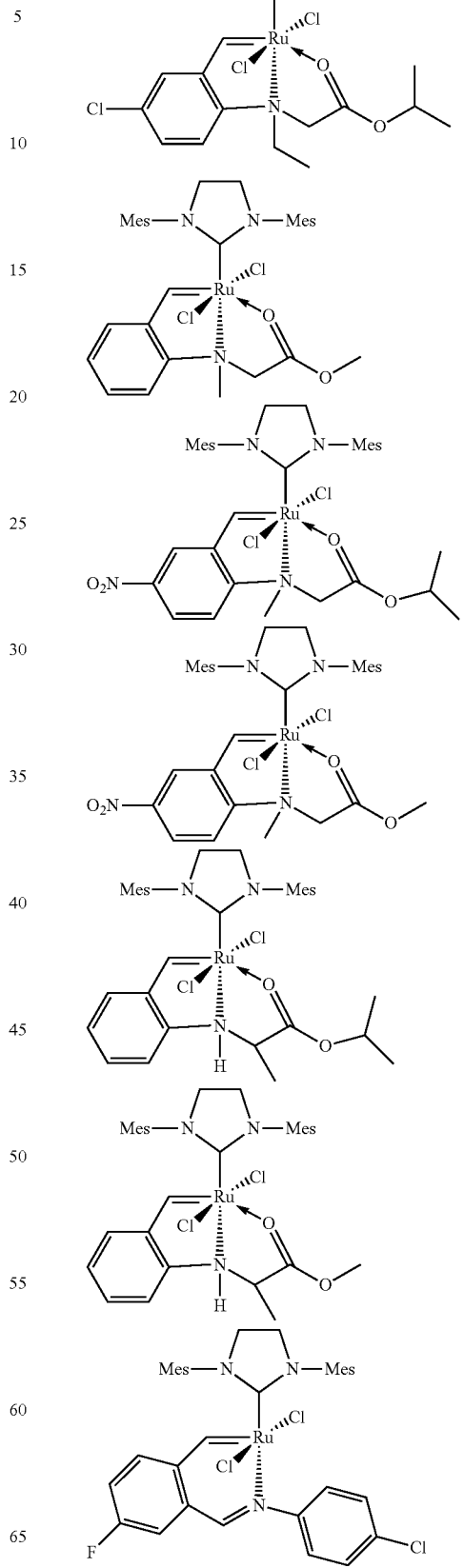

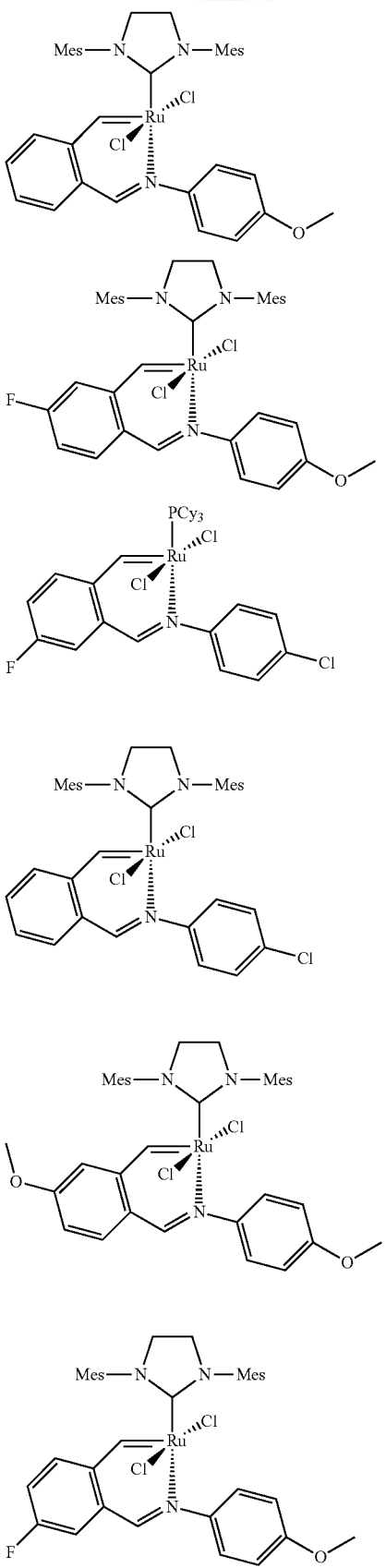

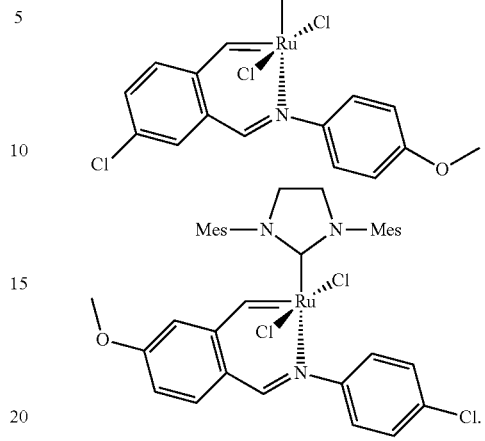

4. The process according to claim 1, wherein the temperature in step a) is 80° C. to 200° C., and the contacting is done at a hydrogen pressure 0.5 MPa to 35 MPa.

5. The process according to claim 1, wherein the hydrogenation in step b) is performed at a temperature 60° C. to 200° C., and at a hydrogen pressure of 0.5 MPa to 35 MPa.

6. The process according to claim 1, wherein the nitrite rubber subjected to hydrogenation is a copolymer of at least one α,β-unsaturated nitrile, and at least one conjugated diene.

7. The process according to claim 1, wherein the nitrile rubber subjected to hydrogenation is a terpolymer of at least one α,β-unsaturated nitrile, at least one conjugated diene, and one or more, further copolymerizable monomers selected from the group consisting of α,β-unsaturated monocarboxylic acids, their esters, their amides, α,β-unsaturated dicarboxylic acids, their mono- or diesters, their anhydrides and their amides.

8. The process according to claim 1, wherein the process is performed in an organic solvent.

9. The process according to claim 8, wherein the organic solvent is selected from the group consisting of dichloromethane, benzene, toluene, methyl ethyl ketone, acetone, tetrahydrofuran, tetrahydropyran, dioxane, cyclohexane and chlorobenzene.

10. The process according to claim 8, wherein the organic solvent is chlorobenzene or methyl ethyl ketone.

11. The process according to claim 1, wherein the complex catalyst is selected from the group consisting of

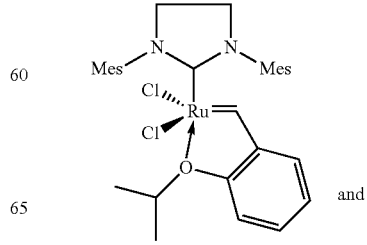

and

-continued

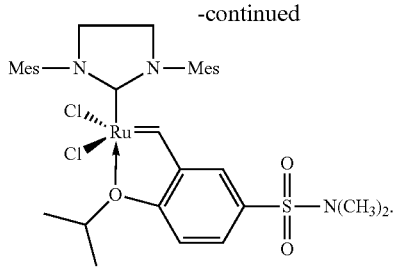

12. The process according to claim 1, wherein the complex catalyst is

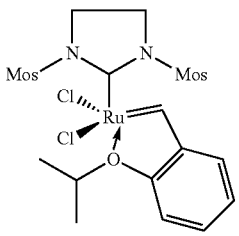

13. The process according to claim 1, wherein:
the temperature in step a) is 80° C. to 200° C., and the contacting is done at a hydrogen pressure of 0.5 MPa to 35 MPa;
the hydrogenation in step b) is performed at a temperature of 60° C. to 200° C., and at a hydrogen pressure of 0.5 MPa to 35 MPa;
the nitrile rubber is one of:
a copolymer of at least one α,β-unsaturated nitrile, and at least one conjugated diene; and
a terpolymer of at least one α,β-unsaturated nitrile, at least one conjugated diene, and one or more, further copolymerizable monomers selected from the group consisting of α,β-unsaturated monocarboxylic acids, their esters, their amides, α,β-unsaturated dicarboxylic acids, their mono- or diesters, their anhydrides and their amides; and
the process is performed in an organic solvent selected from the group consisting of dichloromethane, benzene, toluene, methyl ethyl ketone, acetone, tetrahydrofuran, tetrahydropyran, dioxane, cyclohexane and chlorobenzene.

14. The process according to claim 13, wherein:
the temperature in step a) is 80° C. to 160° C. and the hydrogen pressure is 3 MPa to 11 MPa;
the hydrogenation in step b) is performed at a temperature of 100° C. to 160° C. and at a hydrogen pressure of 3.0 MPa to 10 MPa;
the nitrile rubber is one of:
a copolymer of acrylonitrile and butadiene; and
a terpolymer of acrylonitrile, butadiene and one of the further copolymerizable monomers; and
the organic solvent is chlorobenzene or methyl ethyl ketone.

15. A process of hydrogenating a nitrile rubber without simultaneous metathesis of the nitrile rubber for maintaining the molecular weight of the nitrile rubber, the process comprising:
a) contacting a complex catalyst with hydrogen in the absence of a nitrile rubber at a temperature 75° C. to 200° C. to form a catalyst composition; and
b) hydrogenating the nitrile rubber in the presence of the catalyst composition without metathetic degradation of the nitrile rubber, wherein the complex catalyst has the general formula (A)

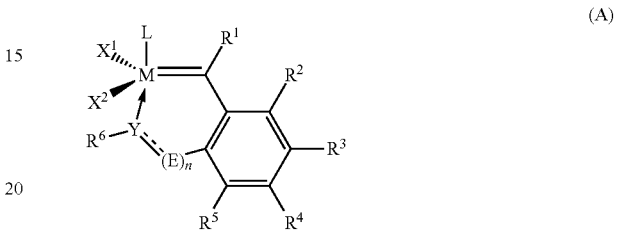

(A)

where
M is ruthenium or osmium,
$X^1$ and $X^2$ are identical or different ligands,
L is an electron donating ligand, which can be linked or not linked with KX to form a cyclic structure,
$R^1$ is hydrogen, alkyl, cycloalkyl, alkenyl, alkynyl, aryl or heteroaryl and
$R^2$, $R^3$, $R^4$ and $R^5$ are identical or different and are each hydrogen or an organic or inorganic substituent,
$R^6$ is H, alkyl, cycloalkyl, alkenyl, alkynyl, aryl, heteroaryl, —C(=O)R, —C(=O)OR, —C(=O)N(R)$_2$, —C(=S)R, —C(=S)SR, —C(=S)OR, —C(=S)N(R)$_2$, —S(=O)$_2$N(R)$_2$, —S(=O)$_2$R, —S(=O)R or a group containing either a C=O or a C=S structural element adjacent to a carbon atom which is bound to Y,
n is 0 or 1,
wherein if n=1, then the element $$Y = (E)_n$$

shall mean that Y and (E)$_n$ are linked either by a single bond or by a double bond, wherein
(i) if Y and (E)$_n$ are linked by a single bond, then Y is oxygen (O), sulphur (S), N—R or P—R, and
E is CH$_2$, or
(ii) if Y and (E)$_n$ are linked by a double bond, then Y is N or P, and
E is CH
wherein if n=0, then
Y is oxygen (O), sulphur (S), N—R or P—R and directly linked by a single bond to the phenyl moiety depicted above in formula (A), and
wherein R is hydrogen or alkyl, cycloalkyl, alkenyl, alkynyl, aryl or heteroaryl.

* * * * *